United States Patent
Hyde et al.

(10) Patent No.: US 8,925,098 B2
(45) Date of Patent: *Dec. 30, 2014

(54) DATA SECURITY AND ACCESS TRACKING IN MEMORY

(71) Applicant: Elwha LLC, a limited liability corporation of the State of Delaware, Bellevue, WA (US)

(72) Inventors: Roderick A. Hyde, Redmond, WA (US); Nicholas F. Pasch, Bellevue, WA (US); Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/738,747

(22) Filed: Jan. 10, 2013

(65) Prior Publication Data

US 2014/0137271 A1 May 15, 2014

Related U.S. Application Data

(63) Continuation-in-part of application No. 13/725,788, filed on Dec. 21, 2012, which is a continuation-in-part of application No. 13/691,448, filed on Nov. 30, 2012, which is a continuation-in-part of application No. 13/687,983, filed on Nov. 28, 2012, which is a continuation-in-part of application No. 13/678,439, filed on Nov. 15, 2012, which is a continuation-in-part of application No. 13/678,430, filed on Nov. 15, 2012.

(51) Int. Cl.
*H04L 9/32* (2006.01)
*G06F 12/02* (2006.01)
*G06F 12/14* (2006.01)
*G11C 16/00* (2006.01)
*G06F 21/00* (2013.01)

(52) U.S. Cl.
CPC ........ *G06F 12/0238* (2013.01); *G06F 12/1425* (2013.01); *G11C 16/00* (2013.01); *G06F 12/1408* (2013.01); *G06F 21/00* (2013.01); *G06F 2212/202* (2013.01)
USPC .................. 726/26; 726/27; 726/30; 713/193

(58) Field of Classification Search
USPC .............. 713/172, 174, 189–194; 726/26–30; 711/100–105, 111
See application file for complete search history.

(56) References Cited

U.S. PATENT DOCUMENTS

| | | | |
|---|---|---|---|
| 5,303,163 A | | 4/1994 | Ebaugh et al. |
| 5,533,123 A | * | 7/1996 | Force et al. .................. 713/189 |
| 6,366,117 B1 | * | 4/2002 | Pang et al. ..................... 326/38 |
| 6,708,273 B1 | * | 3/2004 | Ober et al. .................... 713/189 |
| 7,100,071 B2 | | 8/2006 | Olarig |
| 7,107,388 B2 | | 9/2006 | Zimmer et al. |

(Continued)

OTHER PUBLICATIONS

Chen, Zizhong; Dongarra, Jack; "Numerically Stable Real-Number Codes Based on Random Matrices"; Oct. 24-29, 2004; University of Tennessee.

*Primary Examiner* — Hosuk Song

(57) ABSTRACT

A memory device includes but is not limited to a substrate, a non-volatile memory array integrated on the substrate, and data security logic integrated with the non-volatile memory array on the substrate. The data security logic is operable to perform at least one data security function associated with the non-volatile memory array.

32 Claims, 44 Drawing Sheets

(56) References Cited

U.S. PATENT DOCUMENTS

| | | |
|---|---|---|
| 7,133,498 B2 | 11/2006 | Cacioppo et al. |
| 7,203,842 B2 * | 4/2007 | Kean .......................... 713/189 |
| 7,890,691 B2 | 2/2011 | Jiang |
| 7,996,642 B1 | 8/2011 | Smith |
| 8,015,357 B2 | 9/2011 | Strumper et al. |
| 8,171,204 B2 | 5/2012 | Chow et al. |
| 2004/0039845 A1 | 2/2004 | Feldmeier et al. |
| 2004/0236954 A1 | 11/2004 | Vogt et al. |
| 2005/0199947 A1 | 9/2005 | Forbes |
| 2006/0001080 A1 | 1/2006 | Forbes |
| 2006/0036823 A1 | 2/2006 | Mathews et al. |
| 2006/0221713 A1 | 10/2006 | VanBuskirk et al. |
| 2006/0259848 A1 | 11/2006 | Blevins |
| 2007/0045425 A1 * | 3/2007 | Yoshida et al. ................ 235/492 |
| 2007/0121575 A1 * | 5/2007 | Savry et al. .................... 370/351 |
| 2007/0129812 A1 | 6/2007 | Ferchau |
| 2007/0136534 A1 | 6/2007 | Mesard et al. |
| 2007/0206400 A1 | 9/2007 | Bress et al. |
| 2007/0234323 A1 | 10/2007 | Franaszek et al. |
| 2007/0294494 A1 | 12/2007 | Conti et al. |
| 2008/0062757 A1 | 3/2008 | Forbes |
| 2008/0263301 A1 | 10/2008 | Mathews et al. |
| 2009/0234916 A1 | 9/2009 | Cosentino et al. |
| 2010/0017559 A1 | 1/2010 | Fruin et al. |
| 2010/0049751 A1 | 2/2010 | Giampaolo et al. |
| 2010/0067304 A1 | 3/2010 | Forbes |
| 2010/0148232 A1 | 6/2010 | Ng et al. |
| 2010/0262773 A1 | 10/2010 | Borchers et al. |
| 2011/0022932 A1 | 1/2011 | Radke |
| 2011/0082966 A1 | 4/2011 | Yu et al. |
| 2011/0172498 A1 | 7/2011 | Olsen et al. |
| 2012/0079318 A1 | 3/2012 | Colgrove et al. |
| 2012/0147937 A1 | 6/2012 | Goss et al. |
| 2012/0172085 A1 | 7/2012 | Vuppu et al. |
| 2012/0265923 A1 | 10/2012 | Kuo et al. |
| 2012/0278546 A1 | 11/2012 | Yu et al. |
| 2013/0007374 A1 | 1/2013 | Cain, III et al. |
| 2013/0013864 A1 | 1/2013 | Chung et al. |
| 2013/0332705 A1 | 12/2013 | Martinez et al. |
| 2014/0006898 A1 | 1/2014 | Sharon et al. |
| 2014/0143593 A1 | 5/2014 | Strauss et al. |

* cited by examiner

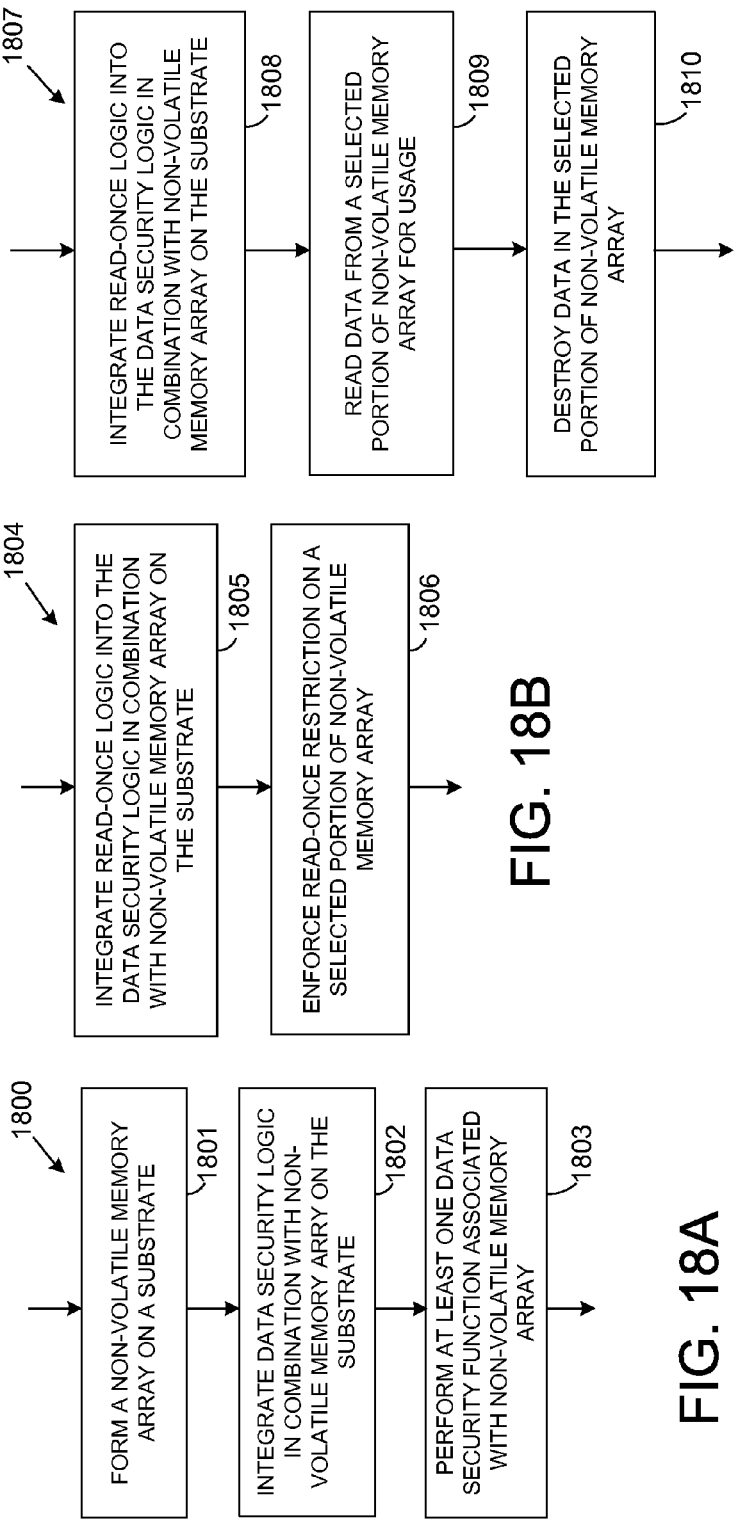

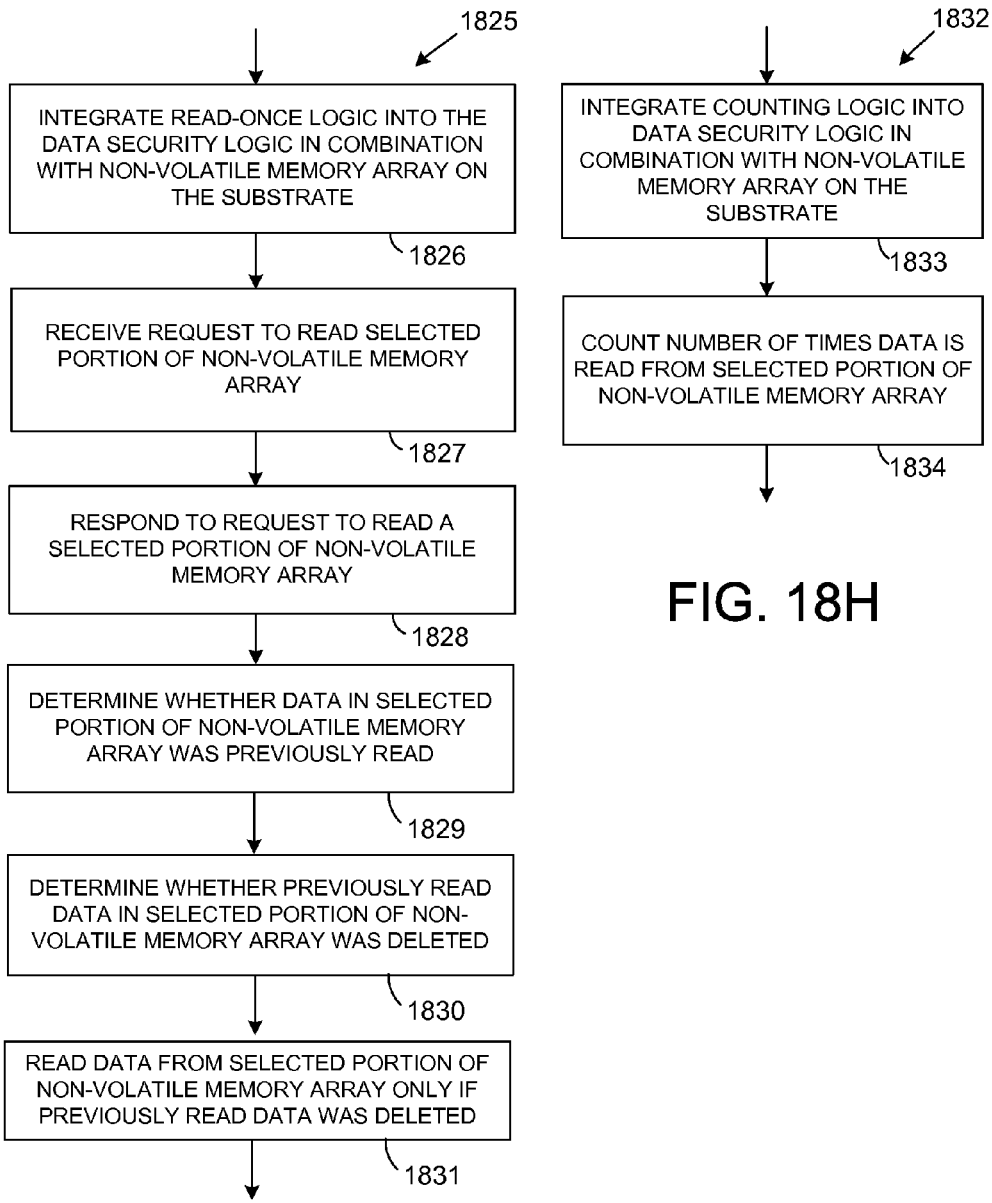

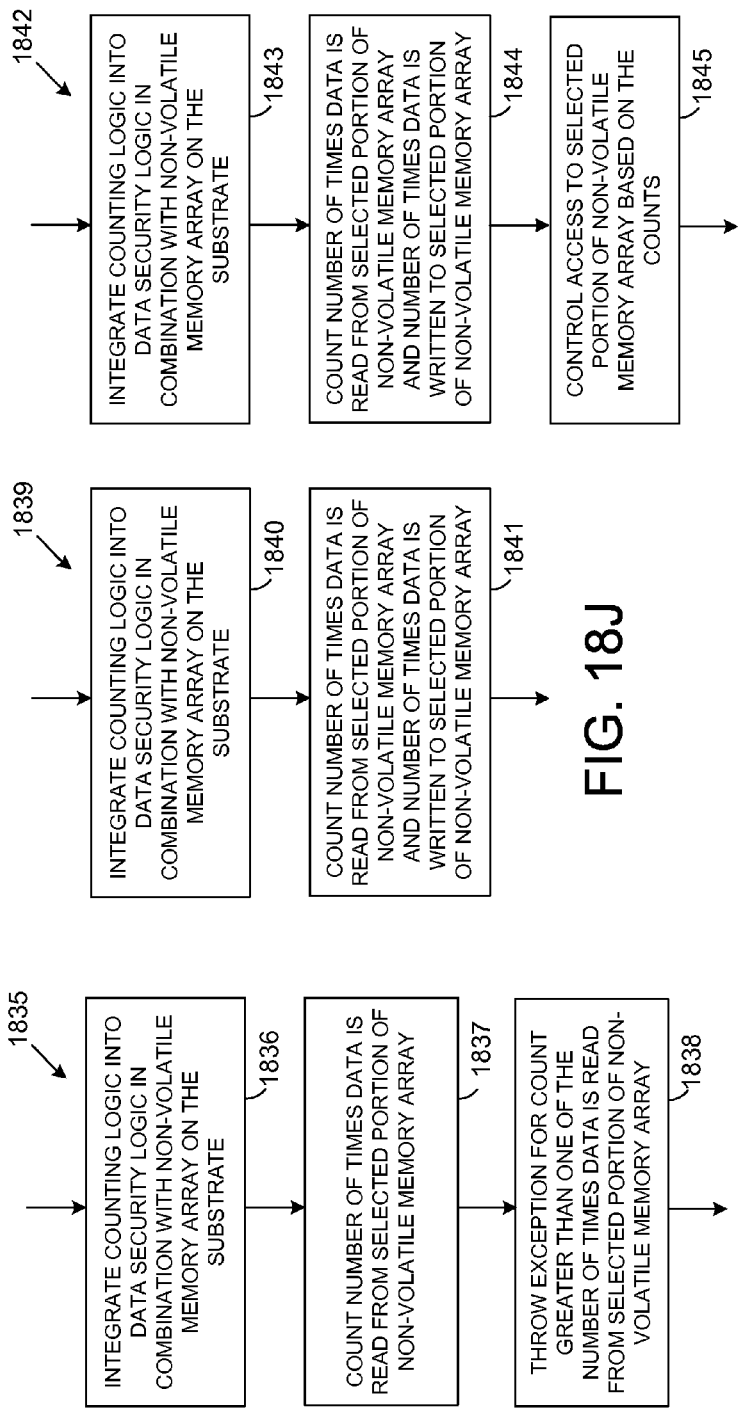

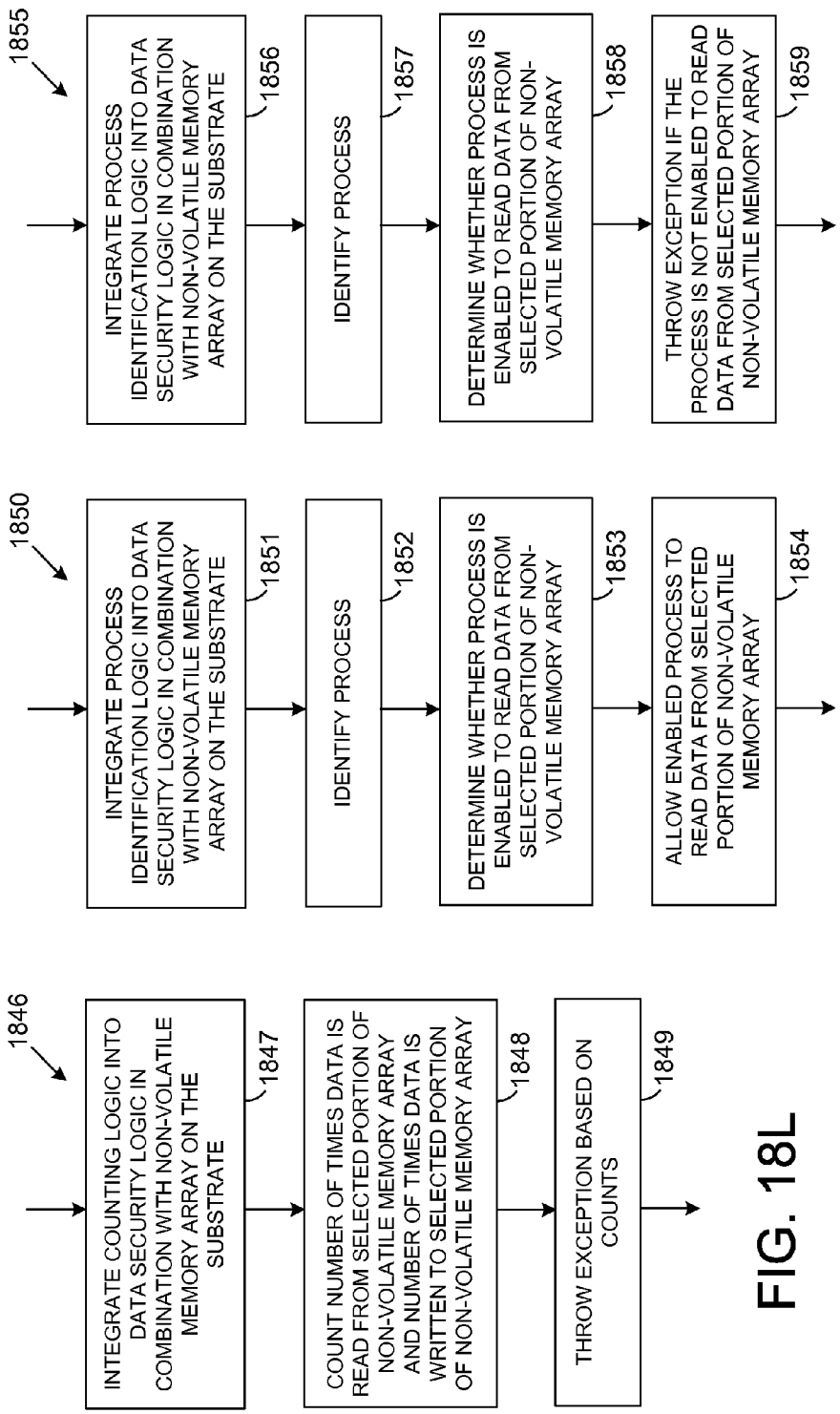

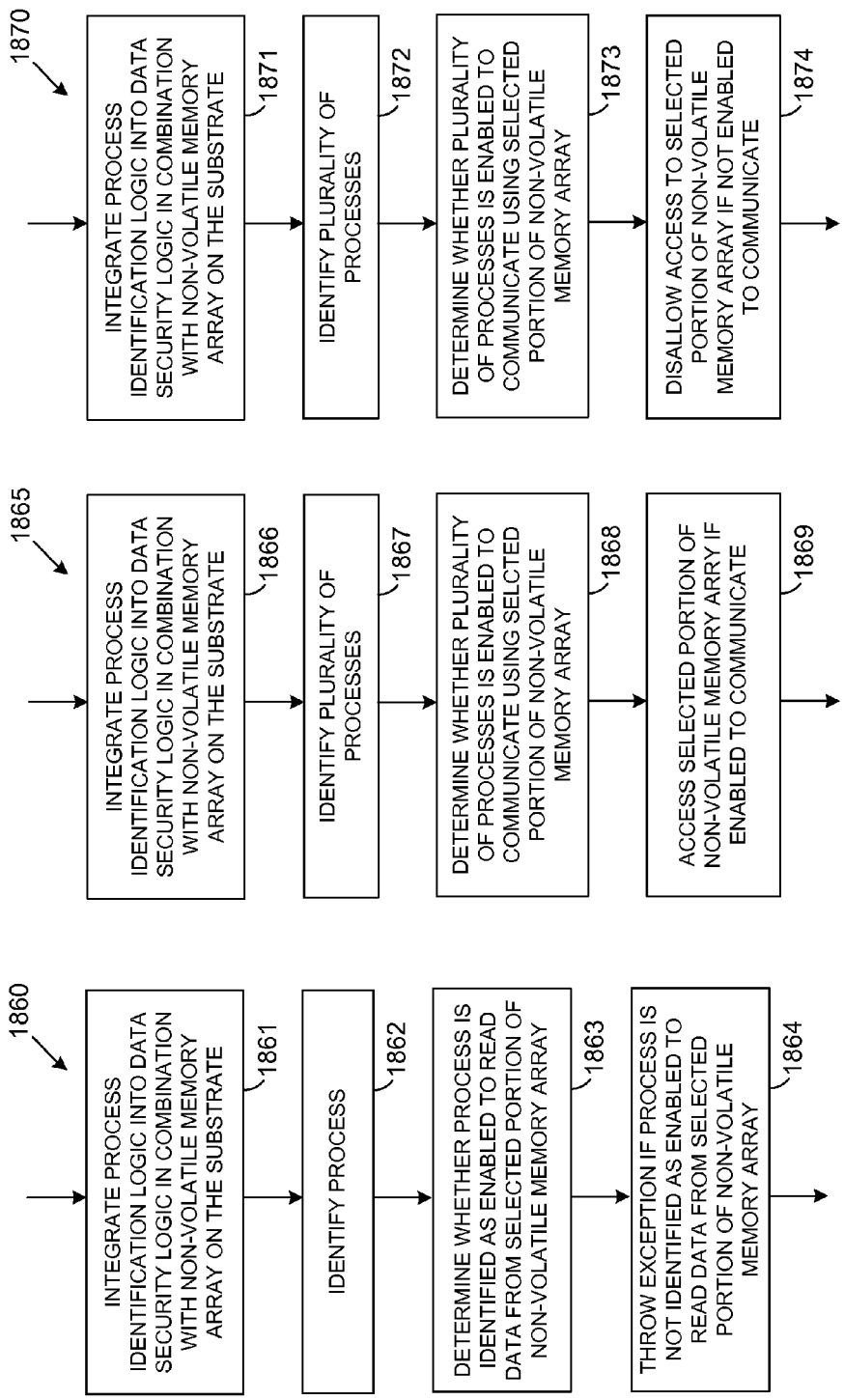

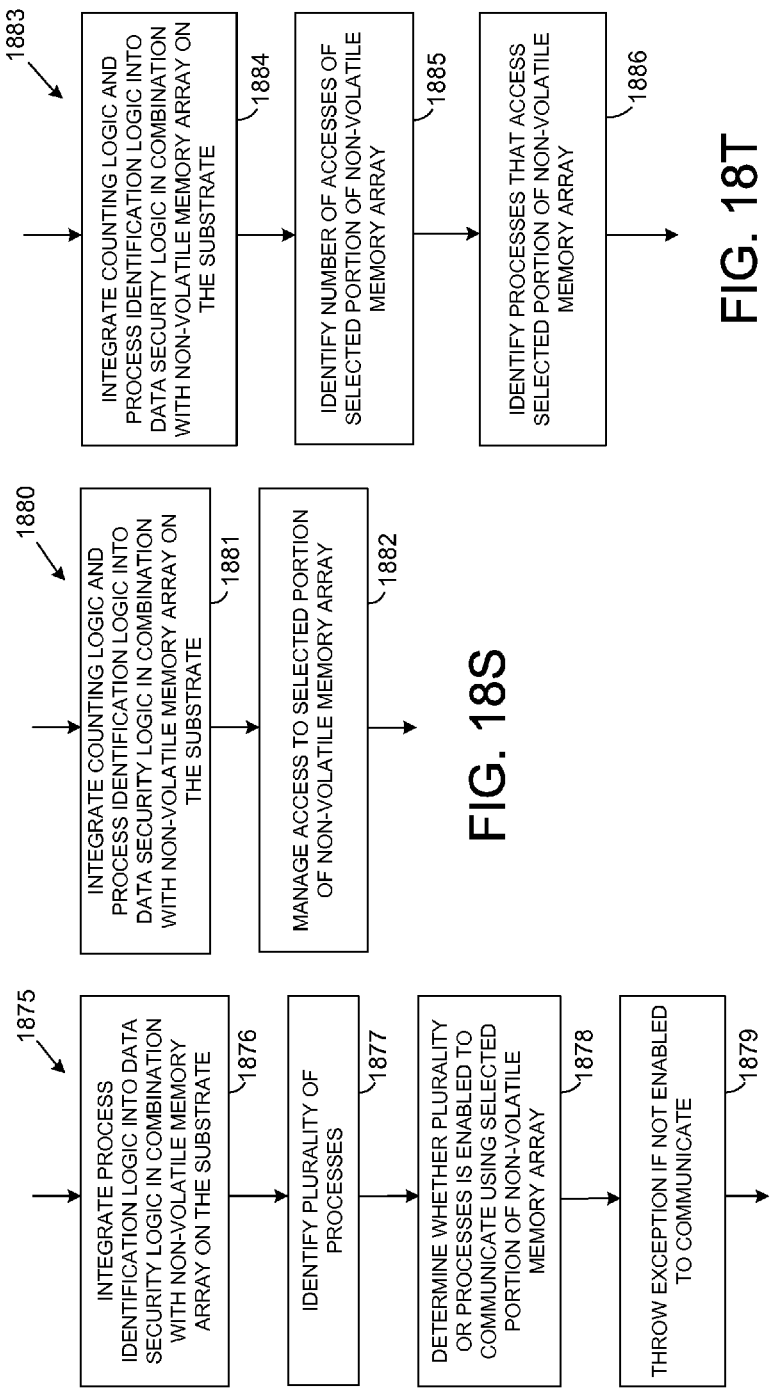

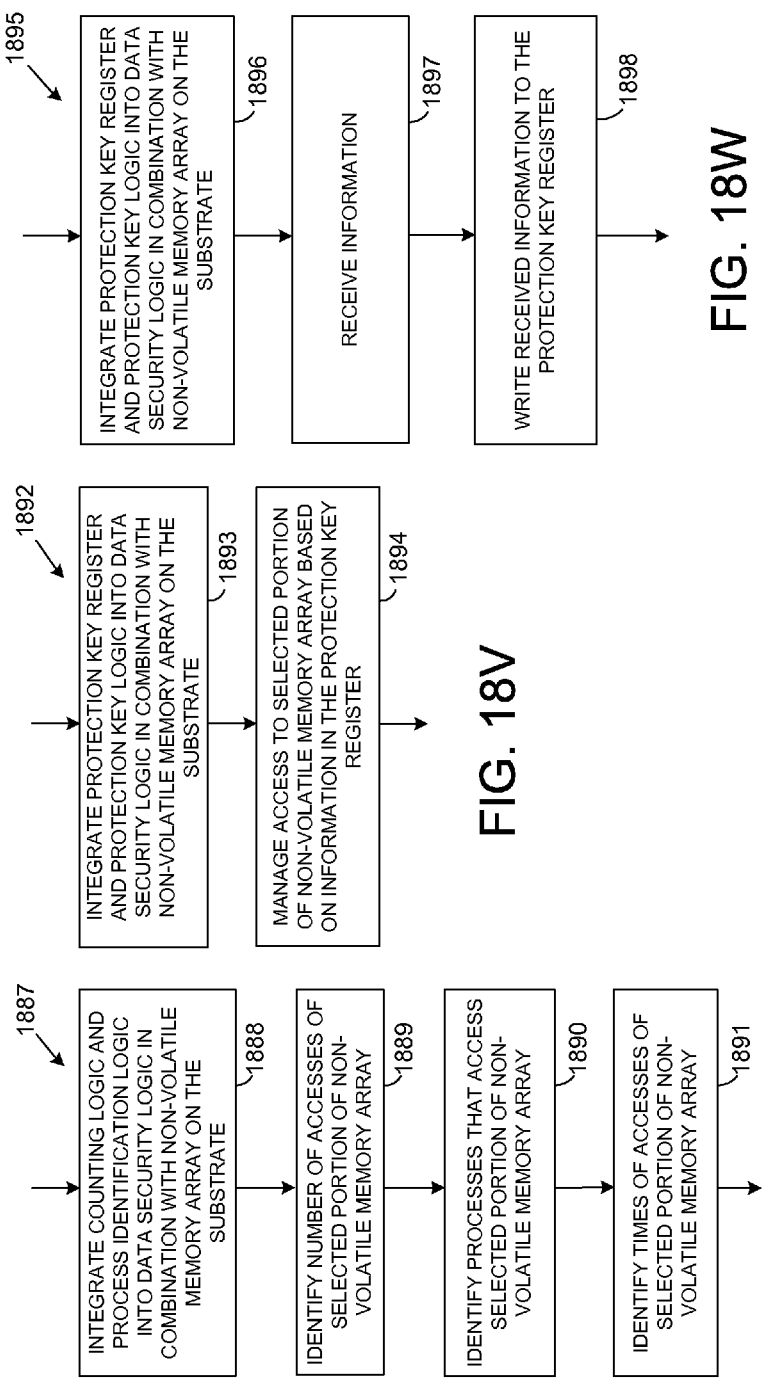

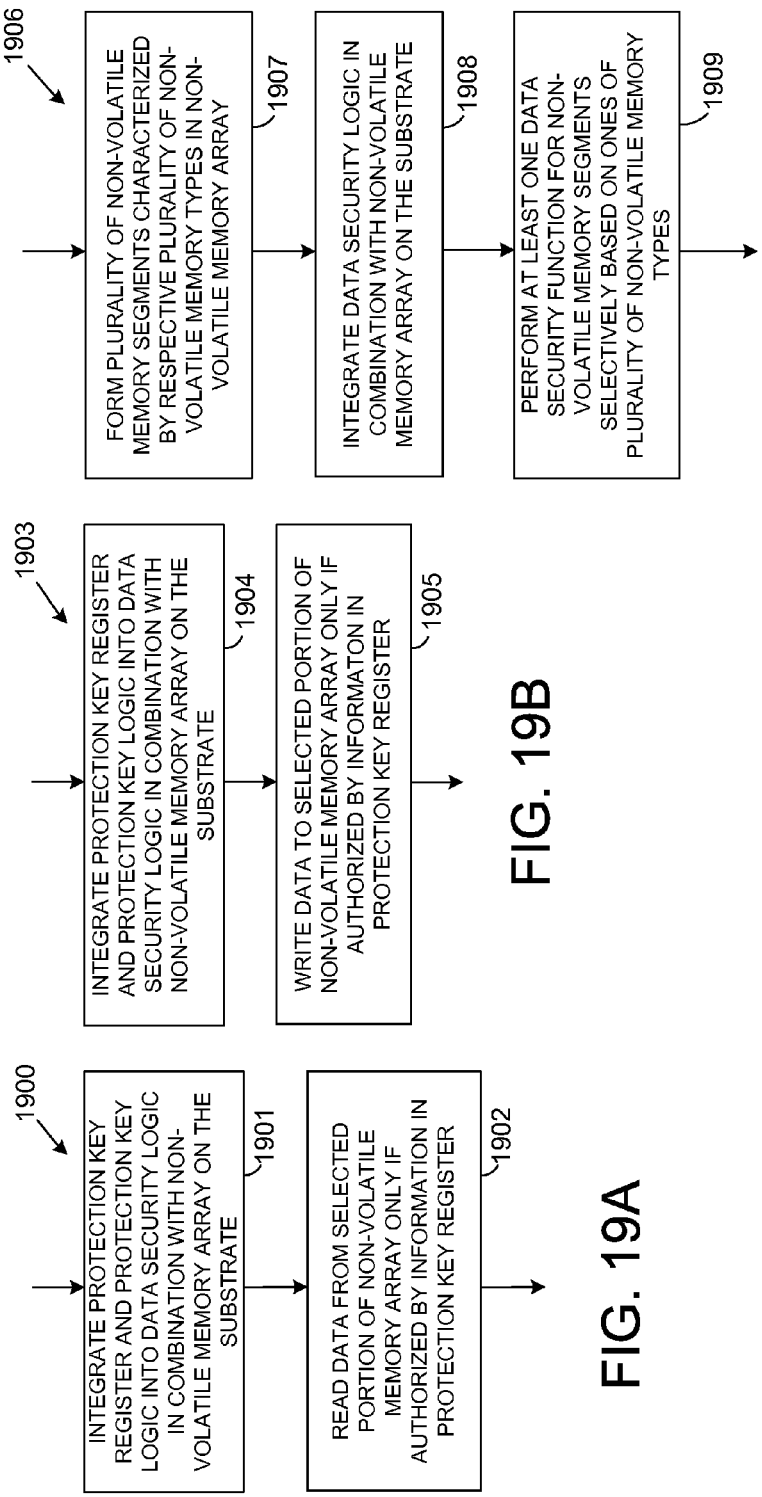

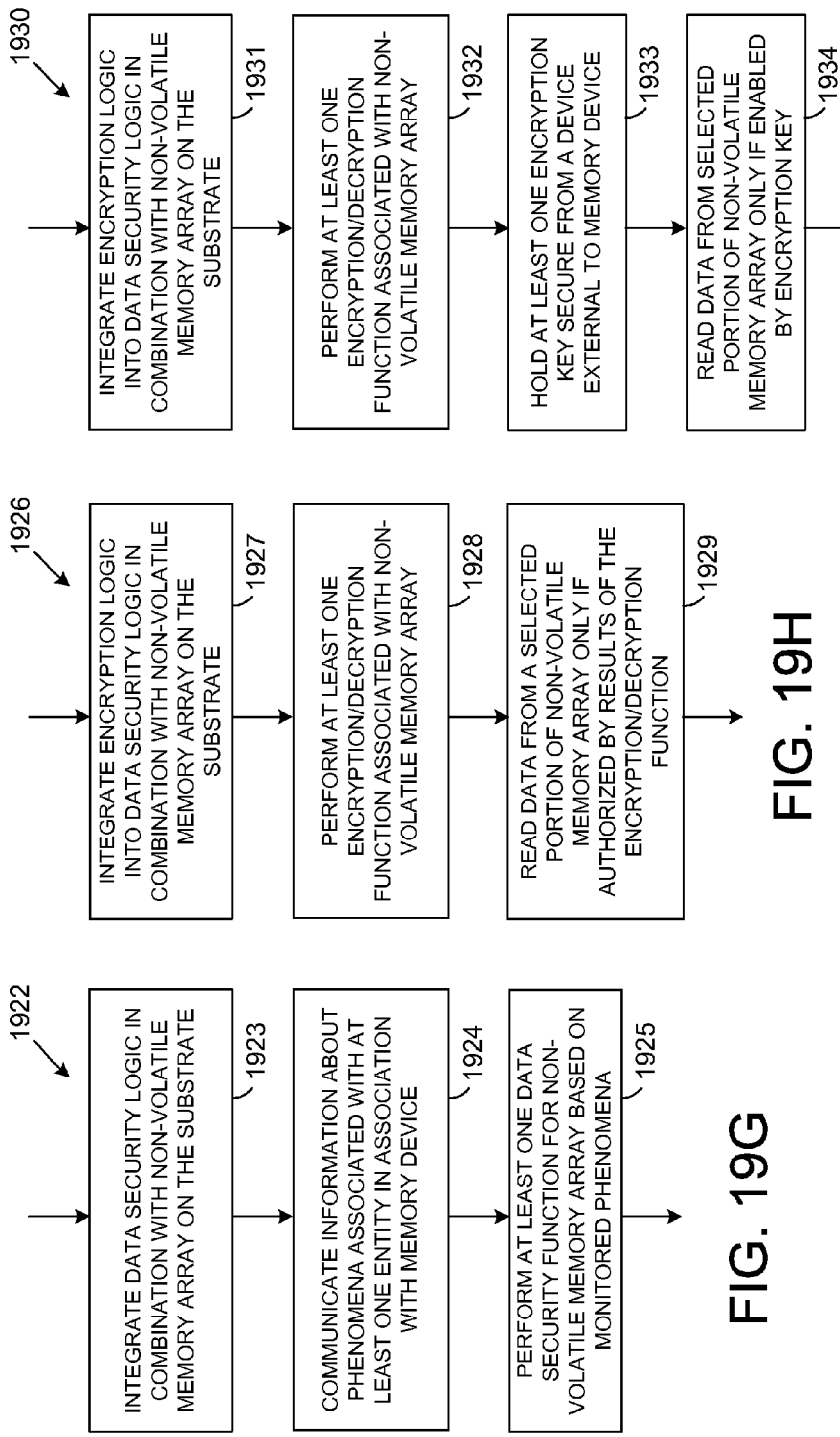

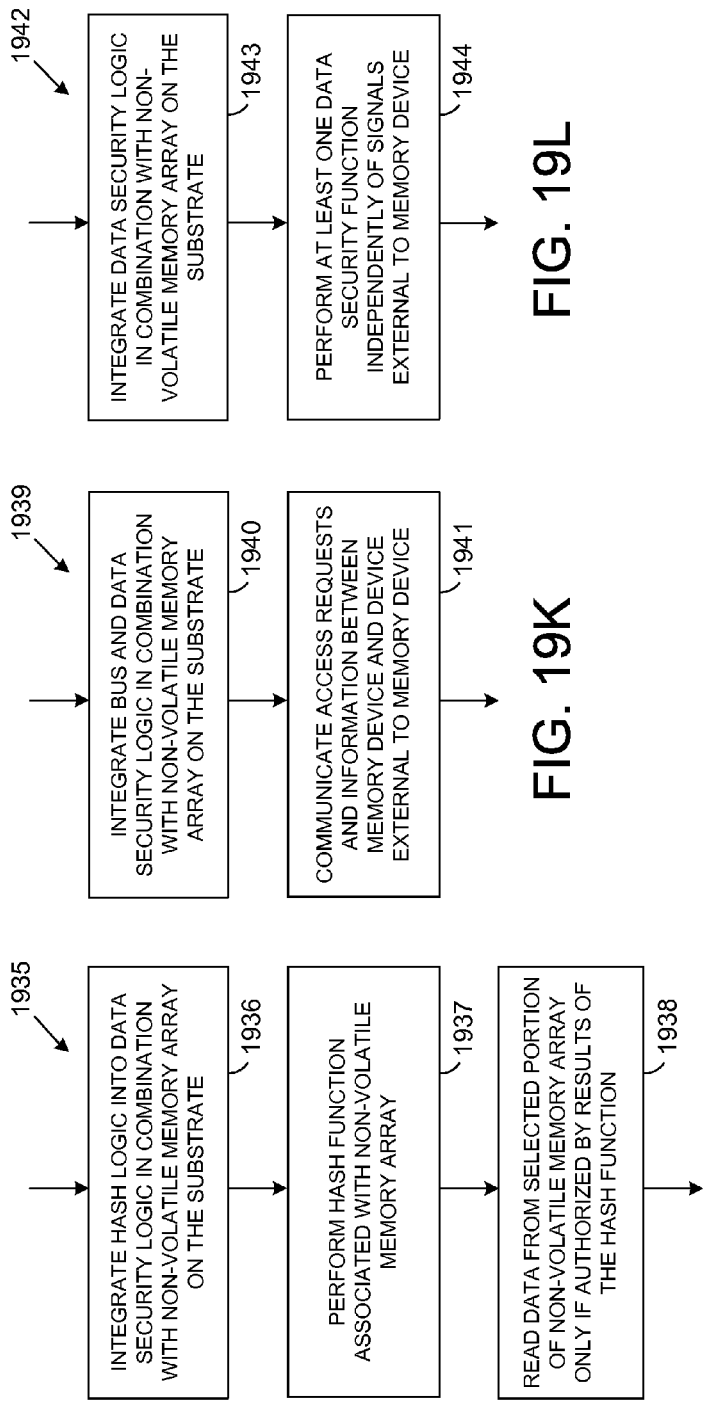

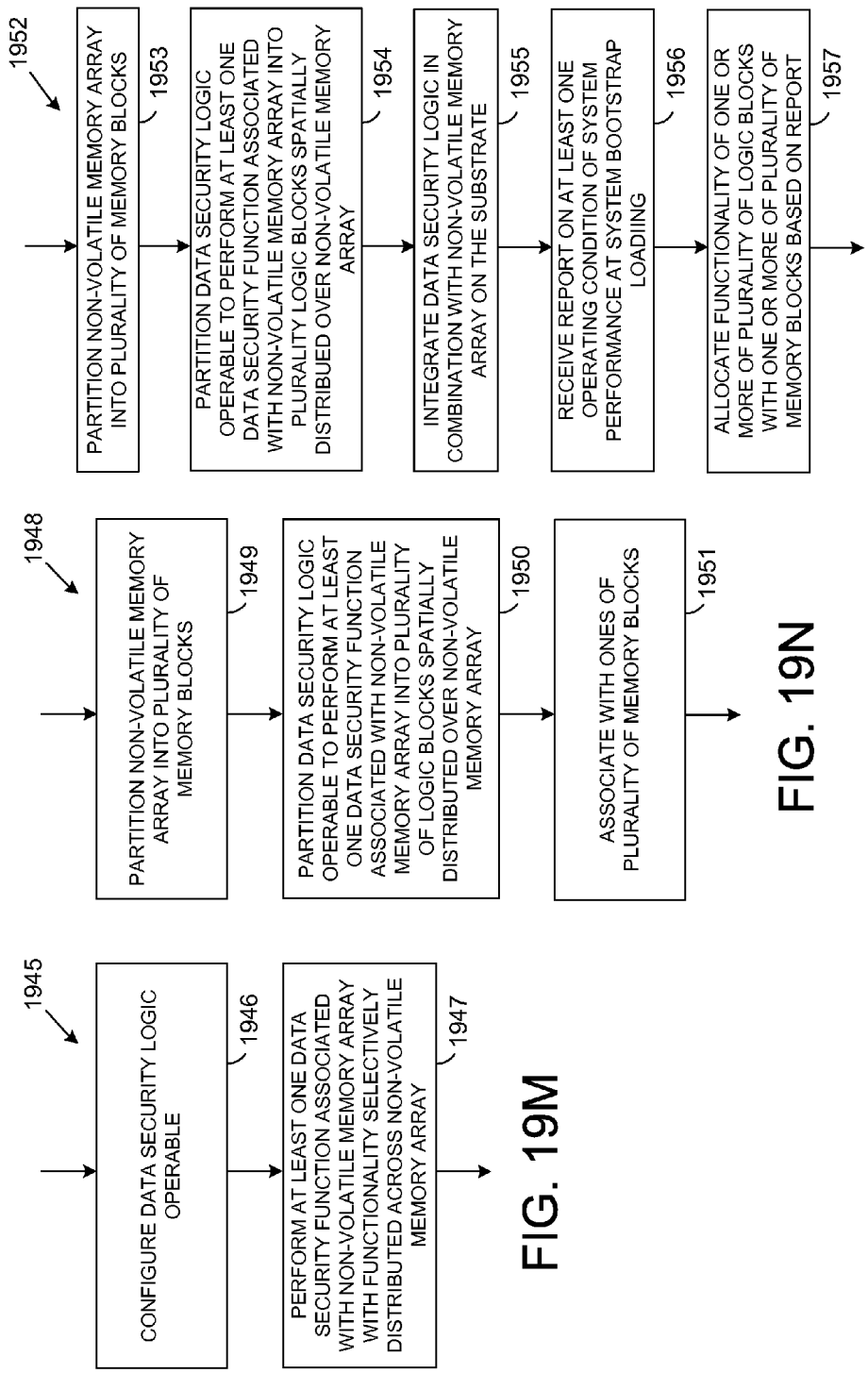

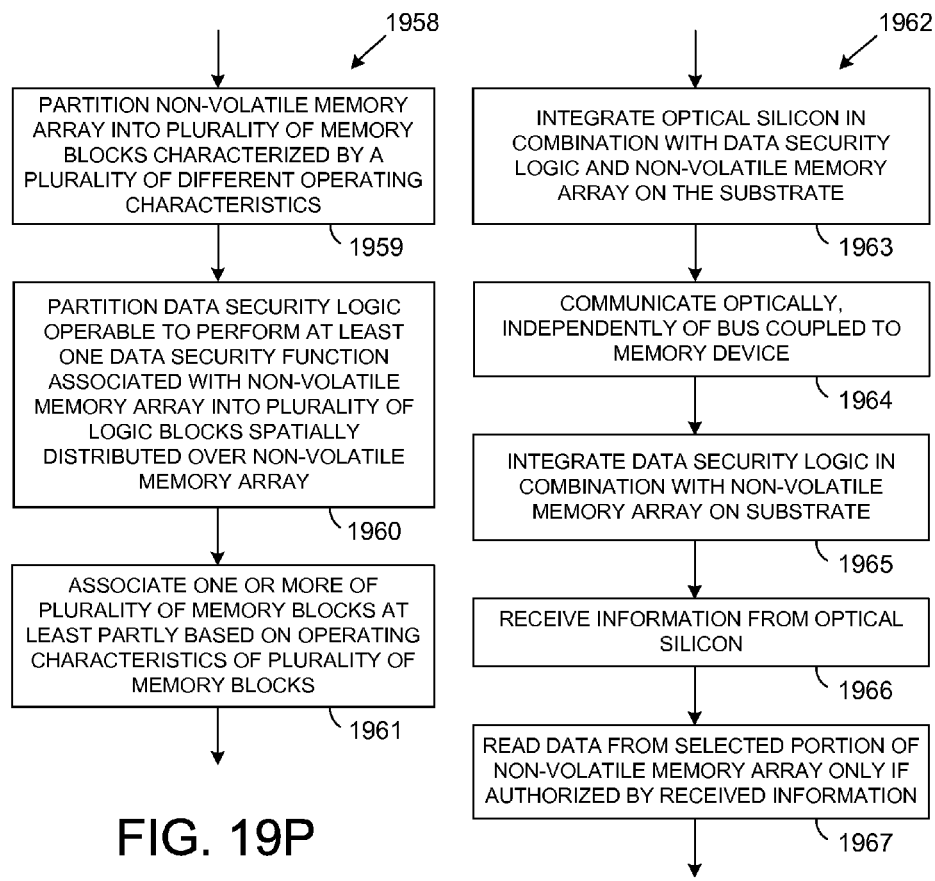

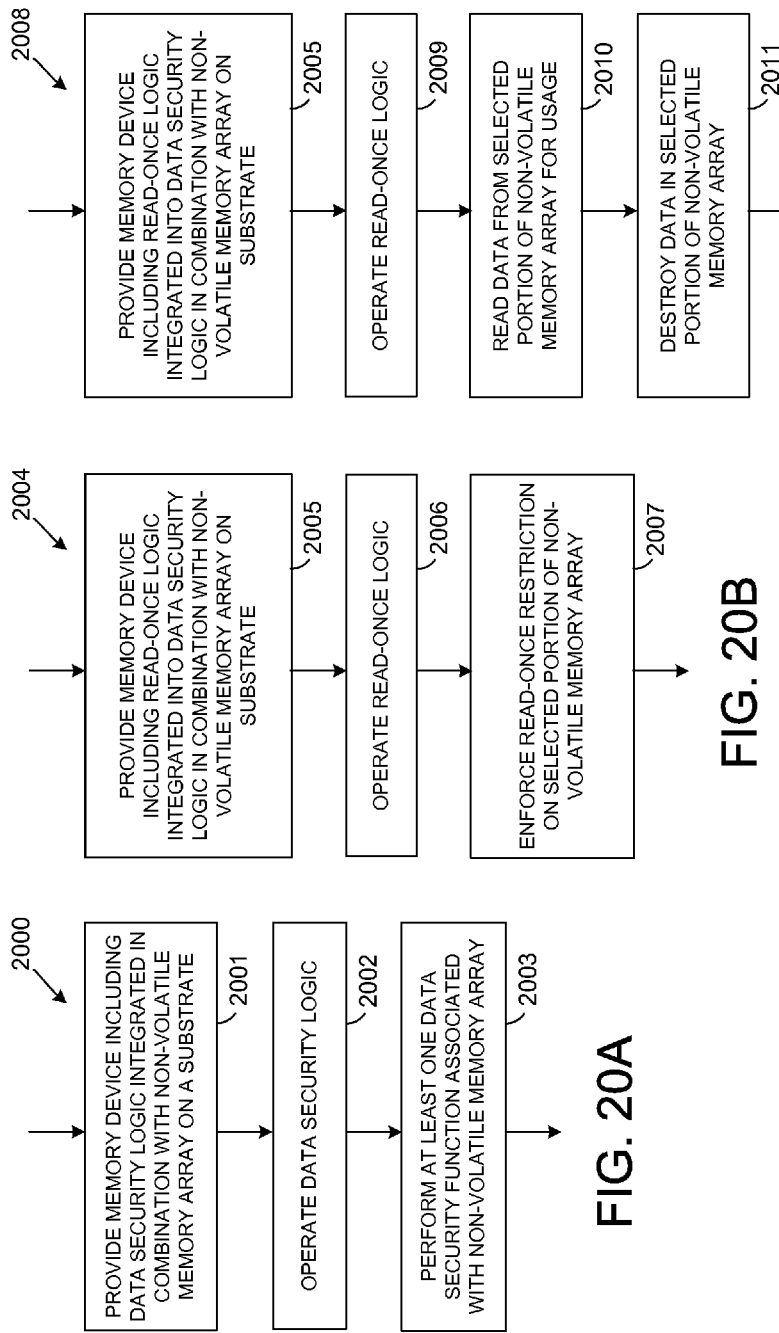

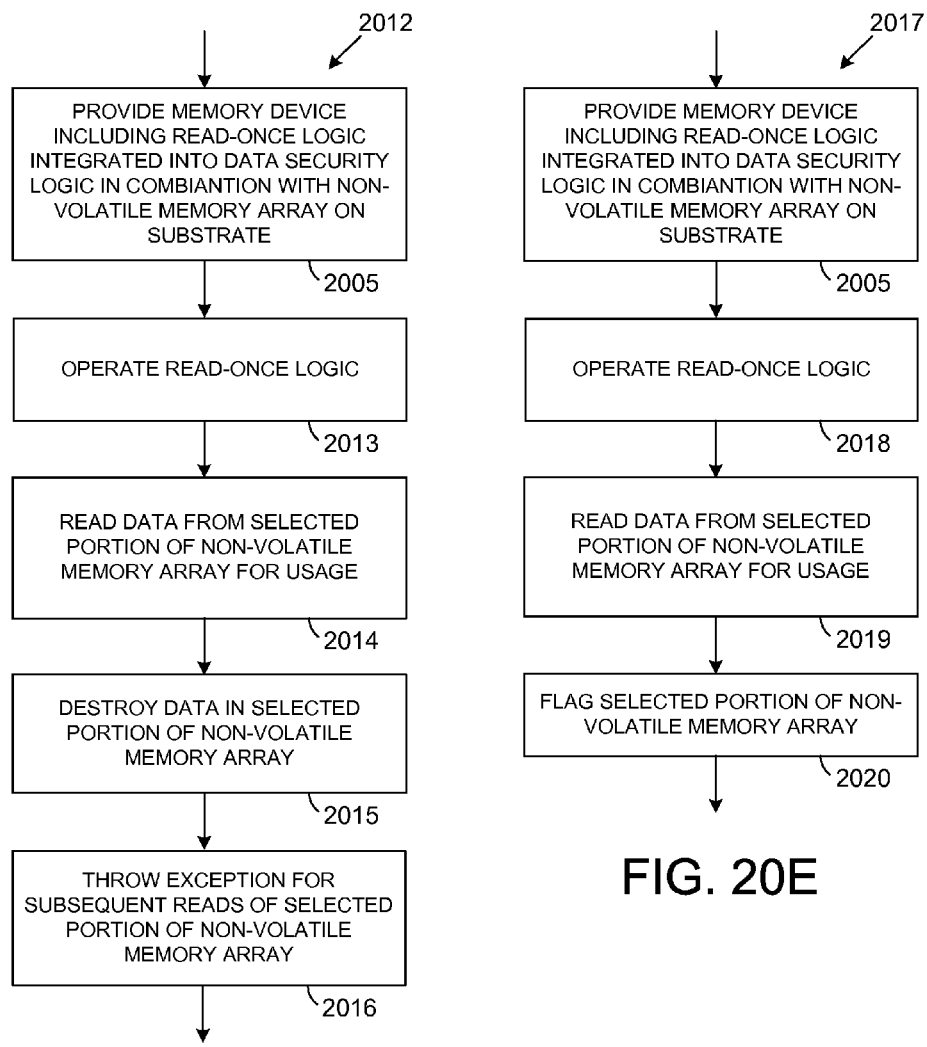

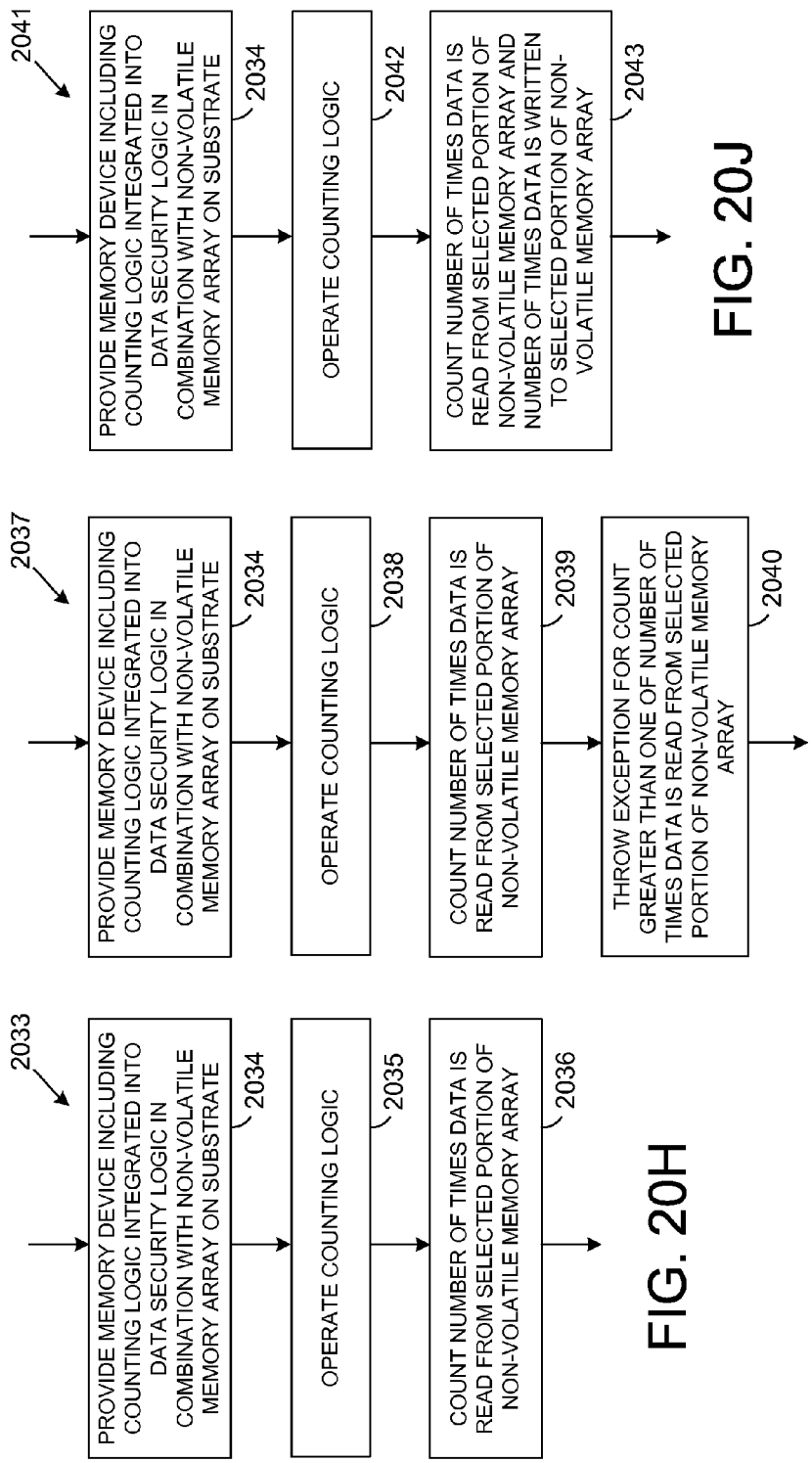

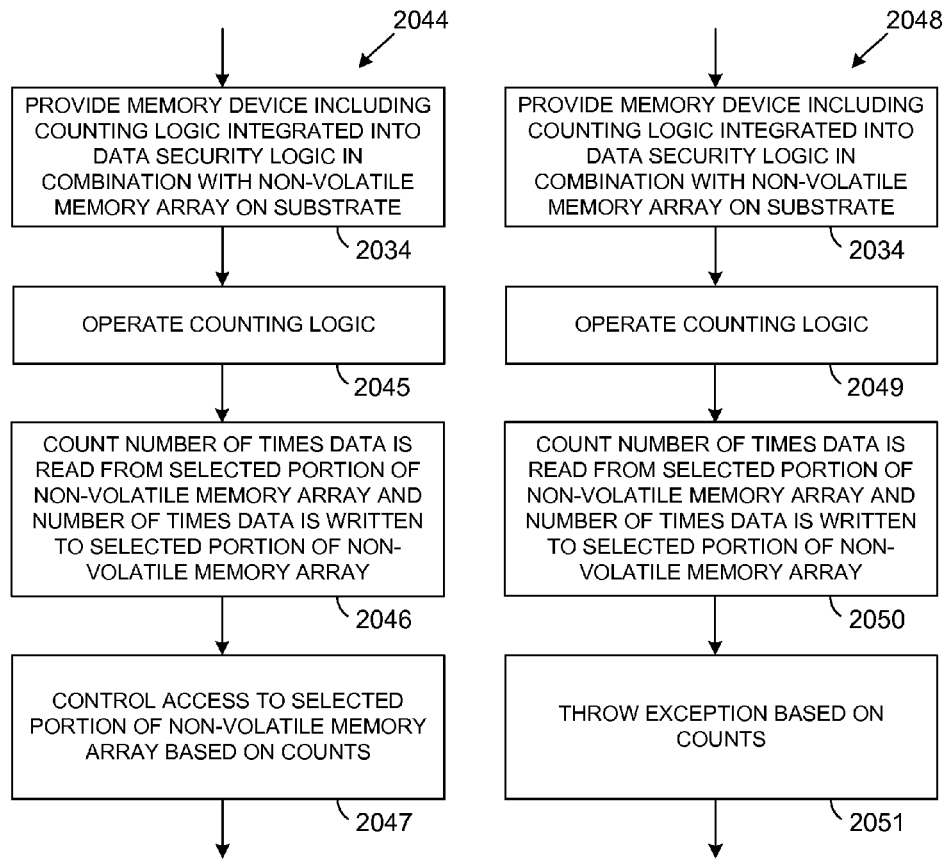

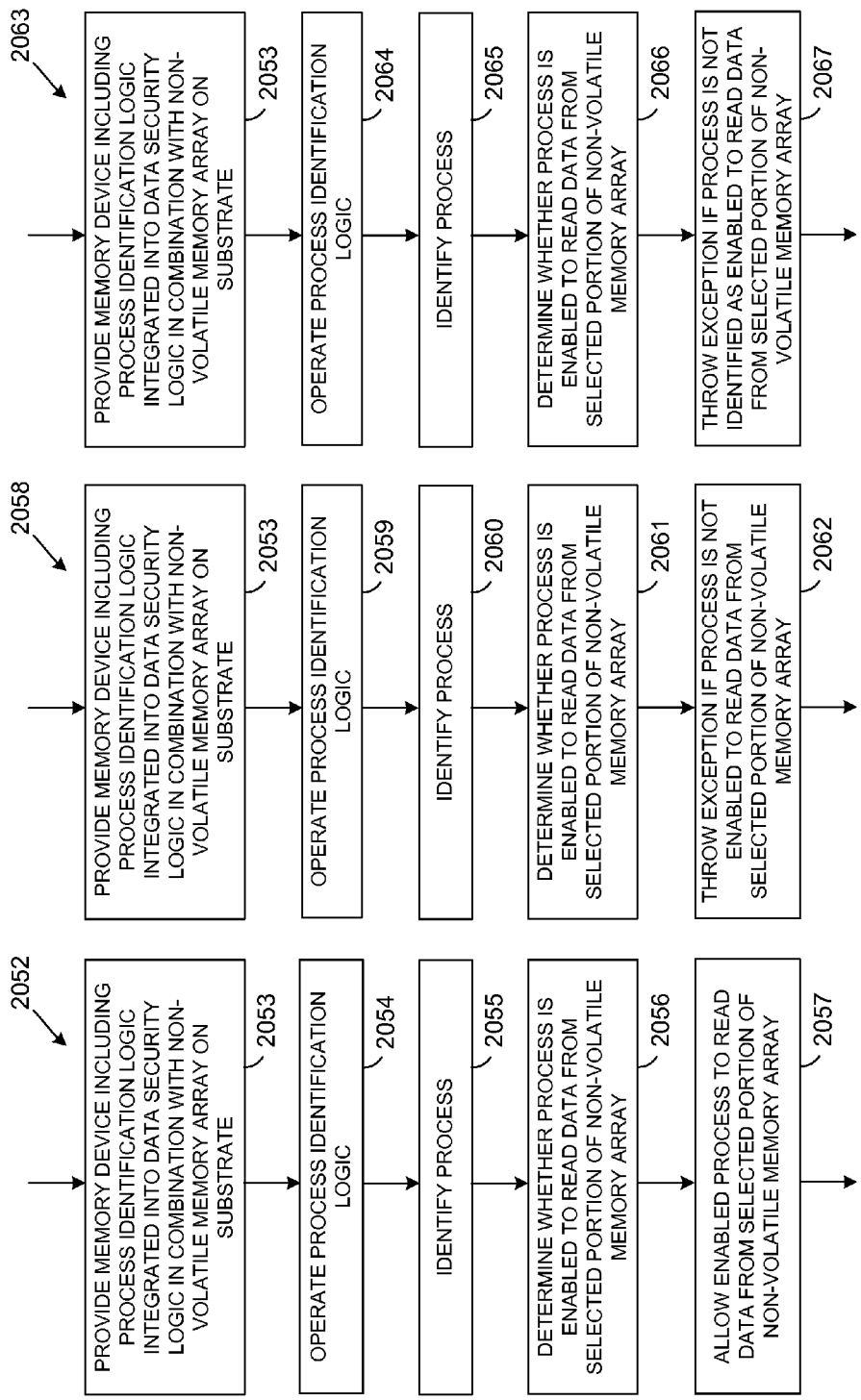

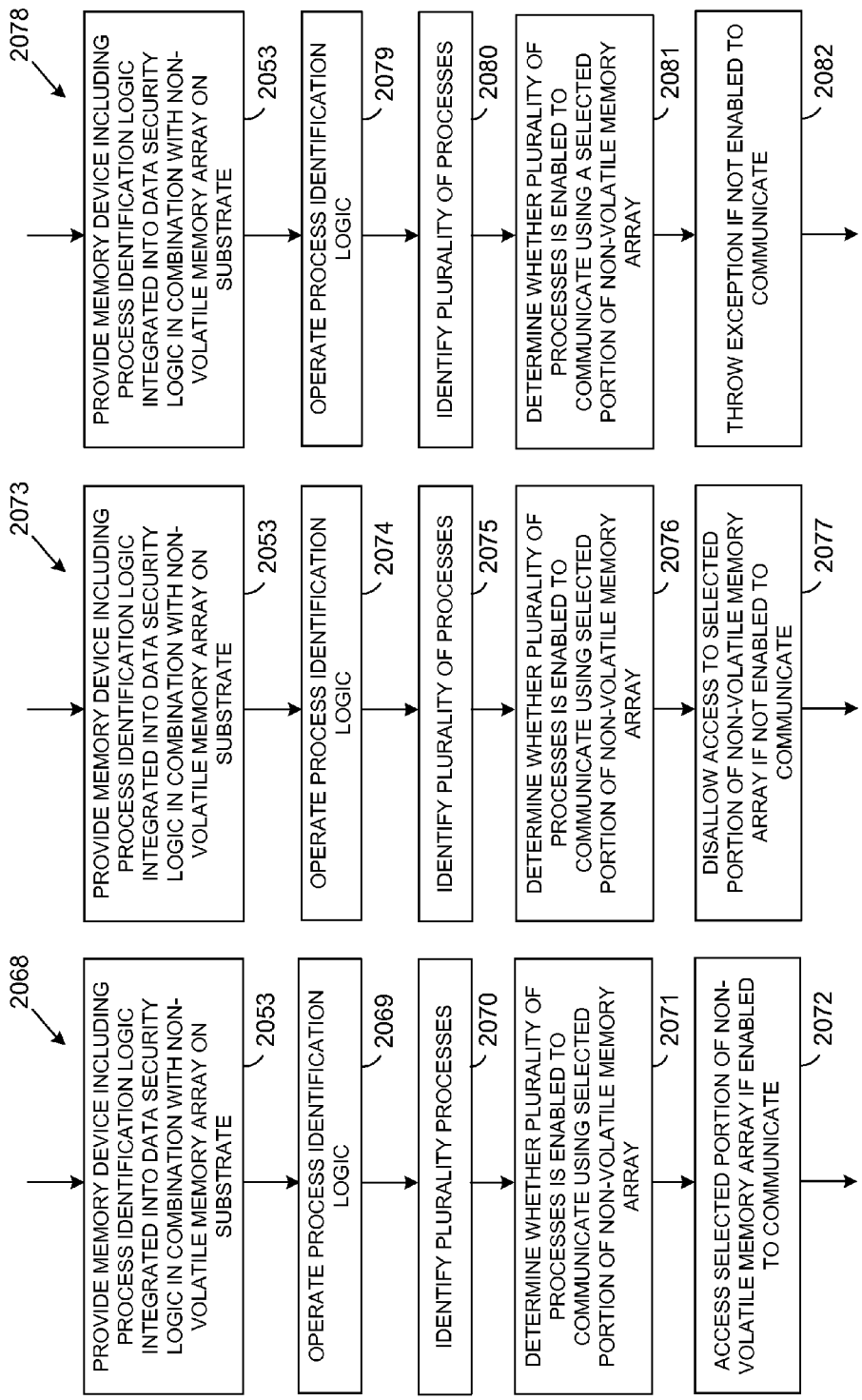

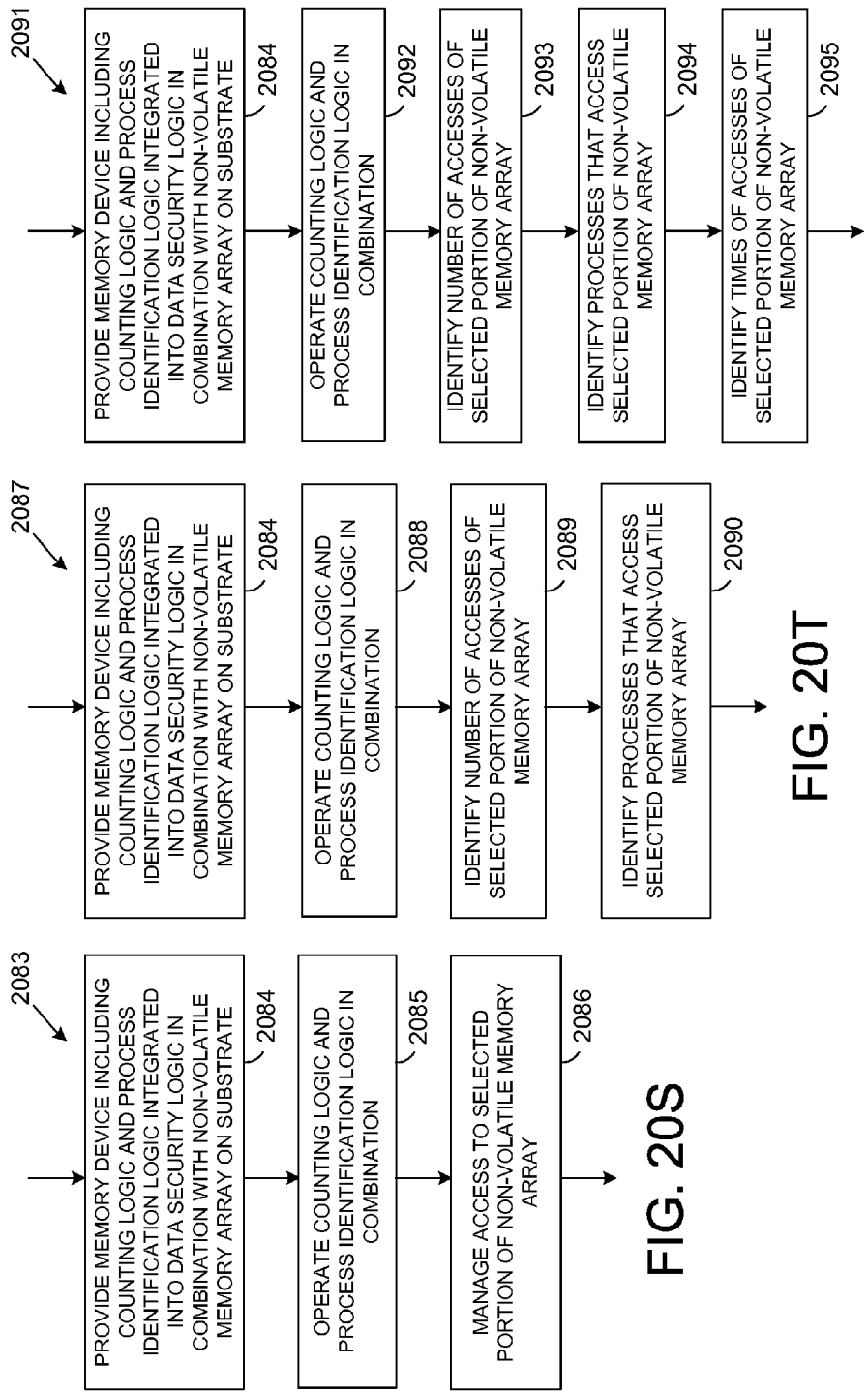

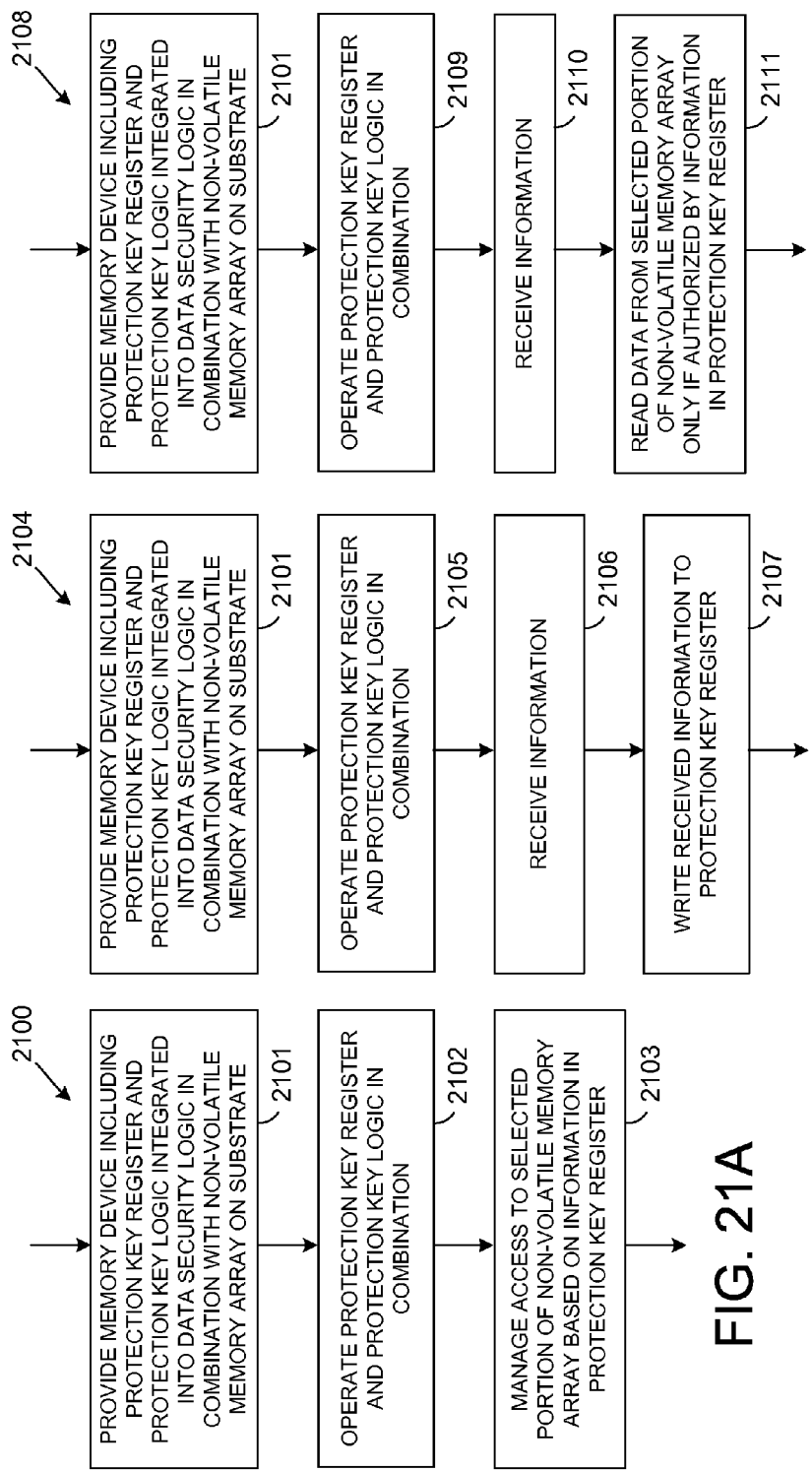

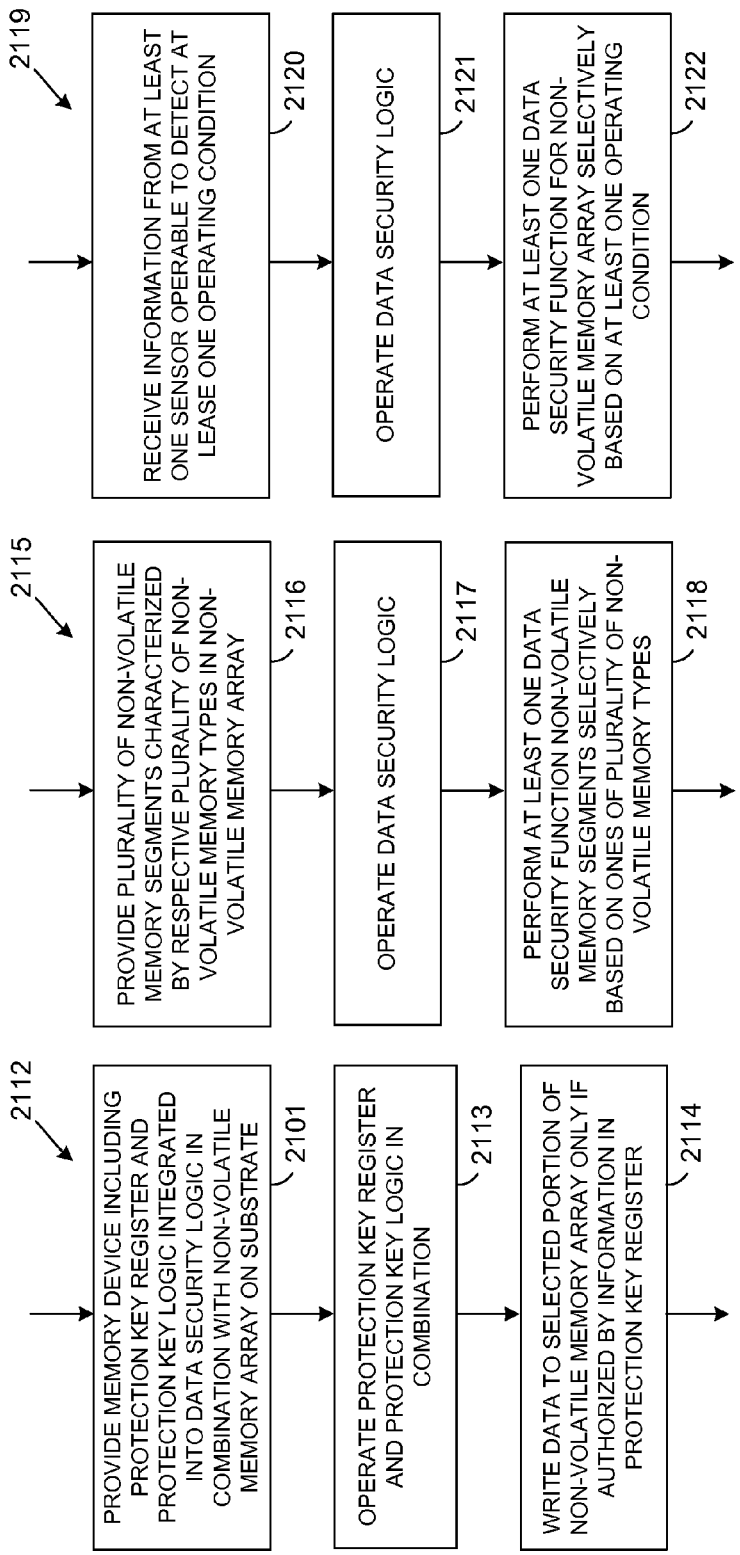

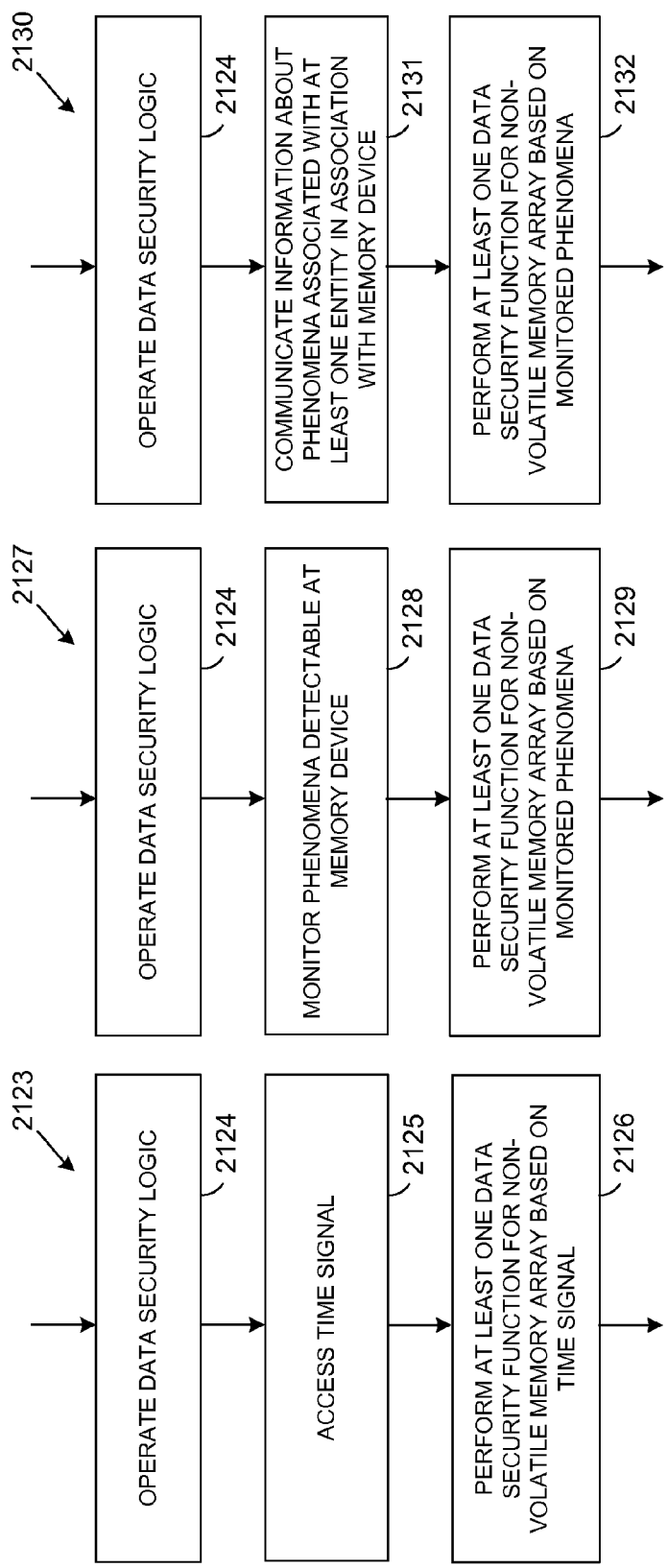

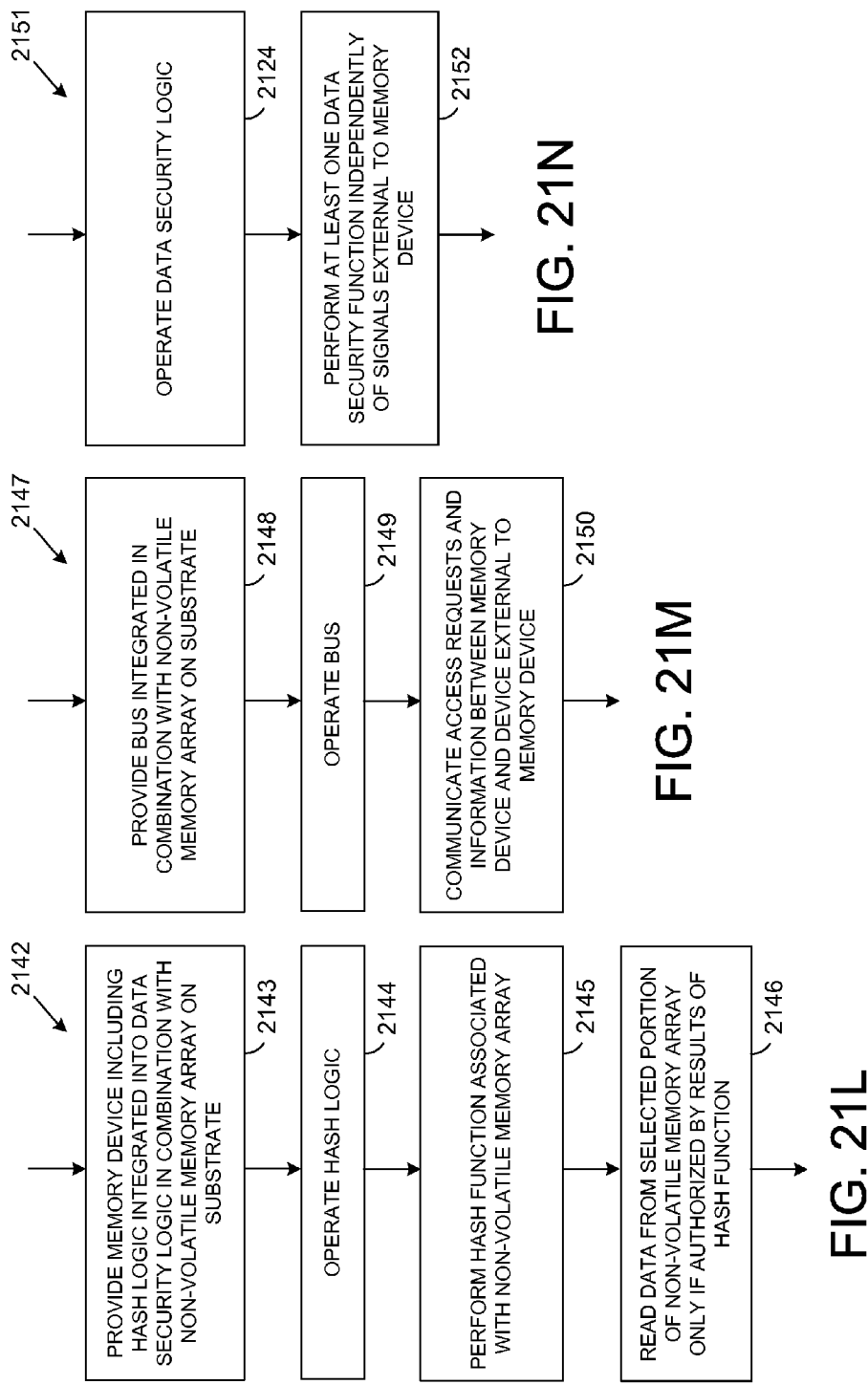

DATA SECURITY AND ACCESS TRACKING IN MEMORY

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

Priority Applications

For purposes of the USPTO extra-statutory requirements, the present application constitutes a continuation-in-part of U.S. patent application Ser. No. 13/678,430 entitled Intelligent Monitoring for Computation in Memory, naming Roderick Hyde, Nicholas Pasch, and Clarence T. Tegreene as inventors, filed 15 Nov. 2012, which is currently co-pending or is an application of which a currently co-pending application is entitled to the benefit of the filing date;

For purposes of the USPTO extra-statutory requirements, the present application constitutes a continuation-in-part of U.S. patent application Ser. No. 13/687,983 entitled Error Correction with Non-Volatile Memory on an Integrated Circuit, naming Roderick Hyde, Nicholas Pasch, and Clarence T. Tegreene as inventors, filed 28 Nov. 2012, which is currently co-pending or is an application of which a currently co-pending application is entitled to the benefit of the filing date; and For purposes of the USPTO extra-statutory requirements, the present application constitutes a continuation-in-part of U.S. patent application Ser. No. 13/678,439 entitled Redundancy for Loss-Tolerant Data in Non-Volatile Memory, naming Roderick Hyde, Nicholas Pasch, and Clarence T. Tegreene as inventors, filed 15 Nov. 2012, which is currently co-pending or is an application of which a currently co-pending application is entitled to the benefit of the filing date;

For purposes of the USPTO extra-statutory requirements, the present application constitutes a continuation-in-part of U.S. patent application Ser. No. 13/691,448 entitled Flexible Processors and Flexible Memory, naming Roderick Hyde, Nicholas Pasch, and Clarence T. Tegreene as inventors, filed 30 Nov. 2012, which is currently co-pending or is an application of which a currently co-pending application is entitled to the benefit of the filing date; and For purposes of the USPTO extra-statutory requirements, the present application constitutes a continuation-in-part of U.S. patent application Ser. No. 13/725,788 entitled Random Number Generator Functions in Memory, naming Roderick Hyde, Nicholas Pasch, and Clarence T. Tegreene as inventors, filed 21 Dec. 2012, which is currently co-pending or is an application of which a currently co-pending application is entitled to the benefit of the filing date.

Related Applications

None.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

TECHNICAL FIELD

The present disclosure relates to electronic memory and systems associated with electronic memory.

SUMMARY

In one aspect, a memory device includes but is not limited to a substrate, a non-volatile memory array integrated on the substrate, and data security logic integrated with the non-volatile memory array on the substrate. The data security logic is operable to perform at least one data security function associated with the non-volatile memory array. In addition to the foregoing, other aspects are described in the claims, drawings, and text forming a part of the present disclosure.

In one aspect, a method of manufacturing a memory device includes but is not limited to forming a non-volatile memory array on a substrate, and integrating data security logic in combination with the non-volatile memory array on the substrate that is operable to perform at least one data security function associated with the non-volatile memory array. In addition to the foregoing, other aspects are described in the claims, drawings, and text forming a part of the present disclosure.

In one aspect, a method of operating a memory device includes but is not limited to providing the memory device including data security logic integrated in combination with non-volatile memory array on a substrate, and operating the data security logic. Operating the data security logic can include performing at least one data security function associated with the non-volatile memory array. In addition to the foregoing, other aspects are described in the claims, drawings, and text forming a part of the present disclosure.

In one aspect, an information processing system includes but is not limited to means for storing information including data security logic integrated in combination with non-volatile memory array integrated on a substrate, and means for performing at least one data security function associated with the non-volatile memory array. In addition to the foregoing, other aspects are described in the claims, drawings, and text forming a part of the present disclosure.

In one aspect, an information processing circuit includes but is not limited to a memory circuit including data security logic integrated with non-volatile memory array on a substrate, and circuitry for performing at least one data security function associated with the non-volatile memory array. In addition to the foregoing, other aspects are described in the claims, drawings, and text forming a part of the present disclosure.

BRIEF DESCRIPTION OF THE DRAWINGS

Embodiments of the invention relating to both structure and method of operation may best be understood by referring to the following description and accompanying drawings.

DETAILED DESCRIPTION

Figure 1A:
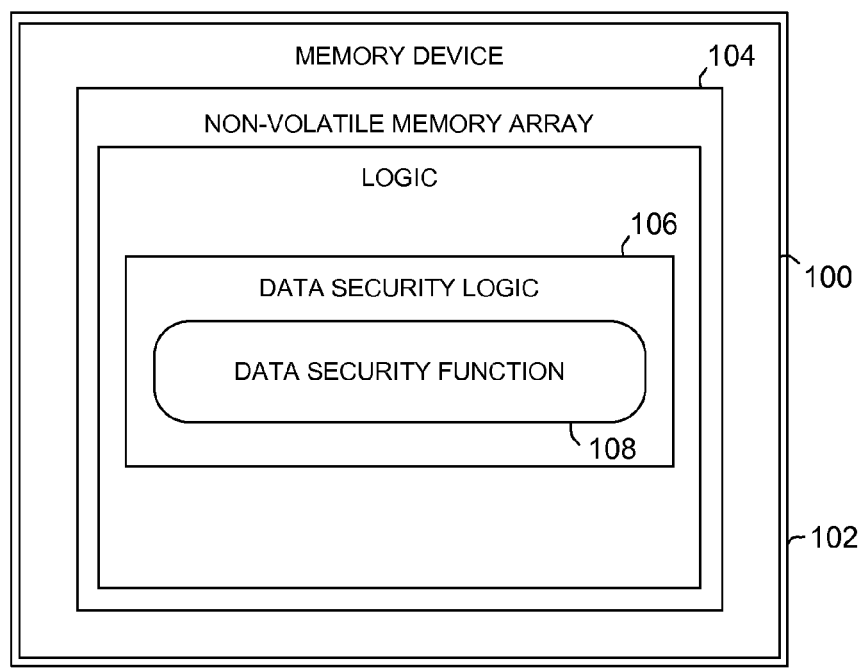
FIGS. 1A and 1B are schematic block diagrams depicting top and side views of embodiments of a memory device that supports data security and access tracking using functionality integrated into memory.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

While various aspects and embodiments have been disclosed herein, other aspects and embodiments will be apparent to those having ordinary skill in the art. The various aspects and embodiments disclosed herein are for purposes of illustration and are not intended to be limiting, with the true scope and spirit being indicated by the following claims.

The various memory systems and devices disclosed herein are expected to be useful in many applications and contexts, and are further anticipated to be particularly useful in cloud computing and mobile contexts. In some configurations, the disclosed memory systems and devices can be used in system-on-a-chip (SOC) applications as processing and memory are distributed in more and more locations and applications throughout our technologically advancing society. The various memory systems and devices can include non-volatile memory including flash memory and electrically erasable programmable read-only memory (EEPROM) for usage in many electronic devices, such as mobile and cell phones, notebook computers, personal digital assistants, medical devices, medical diagnostic systems, digital cameras, audio players, digital televisions, automotive and transportation engine control units, USB flash personal discs, and global positioning systems.

In various applications and contexts, memory systems can include non-volatile memory integrated with a processor or other logic, and a bus or other communications interface. As non-volatile memories and integrated system continue to evolve, their role in overall systems continue to expand to include various aspects of computation that is facilitated, for example, by phase-change memory in which passage of current switches a memory material between two states, crystalline and amorphous, or additional states that further elevate storage capacity.

Figure 1B:
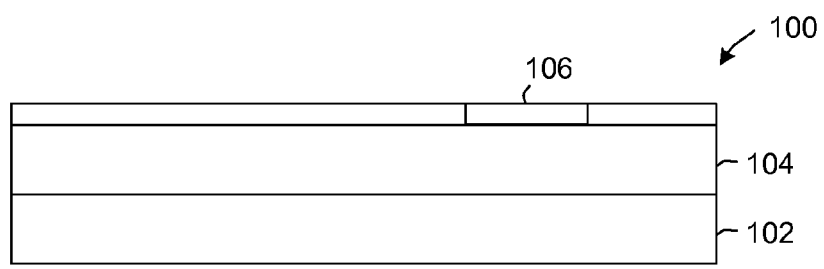

Referring to FIGS. 1A and 1B, schematic block diagrams depict top and side views of embodiments of a memory device that supports data security and access tracking using functionality integrated into memory. In an illustrative embodiment, a memory device 100 includes a substrate 102, a non-volatile memory array 104 integrated on the substrate 102, and data security logic 106 integrated with the non-volatile memory array 104 on the substrate 102. The data security logic 106 is operable to perform at least one data security function 108 associated with the non-volatile memory array 104.

Various techniques may be used for forming an integrated circuit with a combination of the non-volatile memory array and the logic. In one example technique, an integrated circuit for a non-volatile memory cell transistor can be formed by constructing a layer of discrete storage cells over a substrate in two substrate regions, applying a dielectric layer over the layer of discrete storage cells in the two substrate regions, and building a barrier layer over the dielectric layer in the two regions. The barrier layer, dielectric layer, and the layer of discrete storage cells are then removed in one of the two substrate regions, leaving the layers intact in the other of the two substrate regions. An additional barrier layer is then formed over the substrate in the two substrate regions, then removed from the substrate region from which the barrier layer, dielectric layer, and the layer of discrete storage cells were previously removed. Two gates of a memory element are then formed respectively in the two substrate regions with one gate including a portion of the first barrier layer and another gate including a portion of the additional barrier layer. One aspect of fabricating a circuit that integrates the non-volatile memory array and the logic on the system is selection of a suitable annealing process. For example, the illustrative integrated circuit can include a charge storage layer and a barrier layer formed over both a non-volatile memory region and a logic region. The charge storage layer can be formed of one or more layers and can include multiple discrete storage cells for storing charge which are isolated by a dielectric layer of insulating material with a suitably high dielectric constant. The charge storage layer can be constructed by depositing and annealing the discrete storage cells (for example, one or more of a silicon material such as polysilicon, silicon carbide, or the like, or a suitable metal such as germanium) on a dielectric area. The thermal annealing action can be performed by rapid thermal annealing (RTA) or a slower annealing process such as laser spike annealing (LSA). Memory properties can be selected and controlled by optimizing the annealing condition, thereby resulting in an improved reliability, write durability, and failure resistance.

In another example technique for forming an integrated circuit with a combination of the non-volatile memory array and the logic, a non-volatile memory cell with improved charge retention on a substrate common with logic devices using a single-gate logic process in which a silicide-blocking dielectric barrier is formed over a floating gate of a non-volatile memory cell so that silicide cannot be formed over the floating gate but is formed over logic devices, thereby preventing bridging and silicide spiking in the non-volatile memory cell. The silicide-blocking dielectric barrier prevents silicide metal from contacting the floating gate or sidewall spacers while allowing the silicide metal in parts of active regions of the non-volatile memory cell at locations removed from the floating gate and spacers. The silicide regions can be constructed by initially depositing a refractory metal layer over the surface of the non-volatile memory cell, followed by a reactive anneal which causes the metal layer to react with the underlying contacted silicon regions to form silicide regions. A metal strip removed unreacted portions of the metal layer but leaves the silicide regions which are formed by a logic process using metals such as titanium, cobalt, nickel, or the like. A relatively slow annealing process can be used to produce suitable memory performance.

In a further example technique for forming an integrated circuit with a combination of the non-volatile memory array and the logic, a scalable, logic transistor can be constructed with drain and source formed as a pair of doped regions and a gate insulator layer formed over the substrate and between the drain and source. A gate stack can include a gate layer (polysilicon or metal) between two metal nitride layers. A non-volatile memory transistor that is compatible with the logic transistor can be added via a high-K dielectric constant film with an embedded metal nano-dot layer between a tunnel insulator and the gate stack. The drain and source doped regions can be n+ regions doped into a p-type substrate to form an n-channel Field Effect Transistor (FET) device. The diffusion regions can be formed using n+ doped amorphous silicon, followed by an anneal such as a rapid thermal anneal (RTA) to reduce thermal budget and silicidation. A p-channel FET can similarly be formed via p+ diffusion source/drain regions applied over an n-well region. In other embodiments, annealing can be performed using a slow annealing process to improve memory performance and write durability while reducing stress and defects.

In an additional example technique for forming an integrated circuit with a combination of the non-volatile memory array and the logic, non-volatile memory process steps can be added to a processor for forming high-voltage complementary metal-oxide semiconductor (CMOS) devices. The fabrication technique can include formation of isolation areas for the non-volatile memory and the high-voltage CMOS elements, forming high thermal drive process elements of both the memory and CMOS cells, forming mid thermal drive process elements of the logic CMOS cells, and forming low thermal process elements for logic CMOS, non-volatile memory, and high-voltage CMOS cells. Dopants for forming the devices can include masked implantation of boron, phosphorus and other species and subsequent annealing of the dopings, for example, using a slow annealing process to enhance charge retention in the system.

In some applications and/or embodiments, the memory device can include the processing capability a processor or other logic integrated in a distributed manner with non-volatile memory. Accordingly, the memory device 100 can be constructed with the data security logic 106 operable to perform at least one data security function 108 associated with the non-volatile memory array 104 configured with functionality selectively distributed across the non-volatile memory array 104. The memory device that includes logic integrated with non-volatile memory can include data security logic that is closely connected and can be distributed over the memory. Integrating the data security logic with memory enables data security operations immediate to the data stored in memory, increasing efficiency by avoiding delay awaiting transfer of instructions and data over a bus.

In particular applications, the processing capability can be implemented with relatively low speed requirement to enable processors to be available in a variety of relatively low performance operations, possibly in an ubiquitous manner. Accordingly, information can be acquired in a dispersed manner and intercommunicated over vast systems. Thus processors can be inexpensive and memory readily available for various consumer items. Custom versions of memory including non-volatile memory and RAM can be integrated into virtually any product, enabling widespread preprocessing such as security preprocessing in items such as door handles to determine who has accessed a location and how the access was made to allow any type of processing on the information. In applications where unpredictability is highly useful, such as security applications, the data security logic can prevent unauthorized access of protected memory.

The memory device can facilitate intelligent applications including data security functions by virtue of a large distributed area of processing or logic which can be spread over a relatively large area of memory storage. In some embodiments, the processor can be formed of logic that is relatively low capability or relatively low quality, for example to enable a small number of relatively simple operations, thereby reducing the number of layers of silicon in the integrated circuit chip, and possibly reducing power requirements and heat dissipation. The processing logic of such a processor-in-memory (PIM) can be widely distributed over the area of memory storage. The intelligent monitoring memory device can be formed as at least part of a system-on-a-chip (SOC).

In various embodiments, the memory device can include logic integrated with memory that is formed in a limited number of metal layers within the memory logic. To avoid stacking of multiple layers of silicon processing on the memory chip, the logic can be spread laterally across the memory array circuitry. Limited complexity of operations implemented on the memory device circuit enables slower computation speed in comparison to a typical central processing unit (CPU). Such slower computation speeds are suitable since the limiting factor in transfers of data from a processor to memory is the data bus.

The logic, including data security logic, can be configured to reduce the percentage of transistor underutilization, called "dark silicon", by breaking up of the command structure of central blocks. The logic can be further configured to enhance efficiency by performing background operations such as sorting of data within the memory while the system is idle. For example, the logic can access, if available, background information about data characteristics and applications to tailor the memory to the currently-executing application.

In some embodiments, the memory device can be configured with logic with an abbreviated set of specific, basic functions in which simple operations can be off-loaded from a processor external to the memory device and moved onto the memory device. For example, context request blocks can be removed from the processor into the memory device, for example for security purposes since the context request blocks are typically not located in the memory.

Embodiments of the memory device with a reduced-functionality logic can facilitate efficient operation of the memory device while maintaining the integrated circuit simplicity and yield of the memory device. Typically, the number of metal layers in a memory integrated circuit is substantially smaller than that of a processor circuit. Reducing the complexity of the logic can allow fabrication with fewer metal layers.

In various embodiments, functionality logic can be attained by one or more of several techniques. For example, computations can be simplified by implementing relatively simple tasks in the logic or by acknowledging that a particular section of the memory is predominantly subject to a limited number of simple operations which can be implemented in the logic while other operations that rarely are applied to the memory section can be performed by processing external to the memory device. In another example, for operations or applications characterized by a limited or coarse accuracy, such as relatively low-grade video signals, processing can be based on estimation. In a further example, the logic can include support for multiple functions in which circuitry for the different functions can be spread over a distributed area of the non-volatile memory array, forming a large distributed area of simple processing functionality.

Figure 2A:
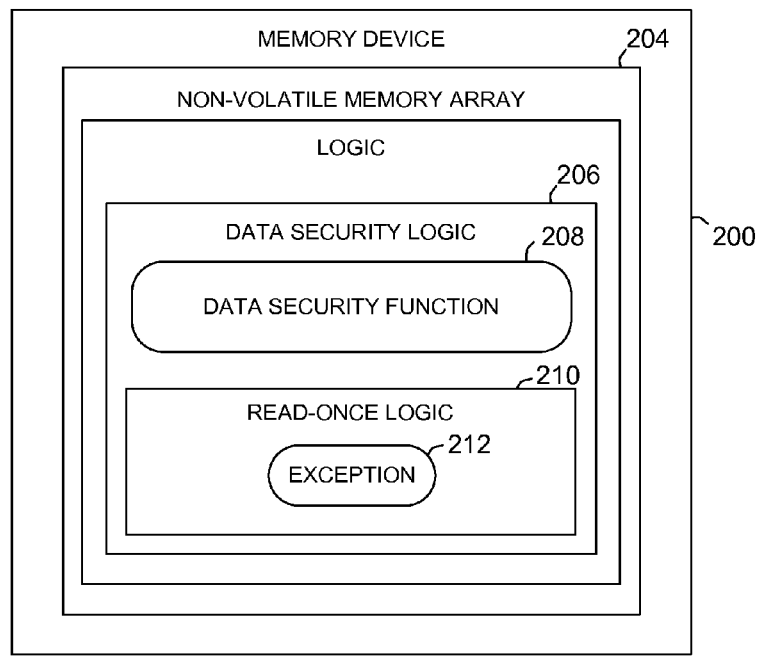
FIGS. 2A and 2B are respective top and side views of schematic block diagrams illustrating embodiments of a memory device that supports data security and access tracking including enforcement of a read-once limit on selected memory using functionality integrated into memory.
Figure 2B:
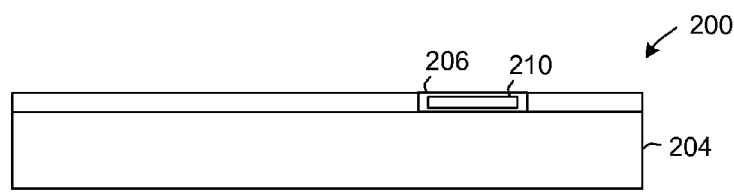

Referring to FIGS. 2A and 2B, respective top and side views of schematic block diagrams illustrate embodiments of a memory device that supports data security and access tracking including enforcement of a read-once limit on selected memory using functionality integrated into memory. In particular embodiments, the memory device 200 can be configured such that the data security logic 206 operable to perform at least one data security function 208 associated with the non-volatile memory array 204 further includes read-once logic 210 operable to enforce a read-once restriction on a selected portion of the non-volatile memory array 204.

To ensure information is processed correctly, the data security logic is integrated into the memory device to make certain that a predetermined portions of memory can be read only once. For example, a process can be executed and read selected data from memory. The data security logic can include read-once logic that can destroy the data, or flag the data such that any subsequent read will throw an exception as is the memory is not present.

Read-once memory can ensure that memory is read and deleted before another process has begun reading the memory. Accordingly, in some embodiments of the memory device depicted in FIGS. 2A and 2B, the memory device 200 can be formed in a way that the data security logic 206 operable to perform at least one data security function 208 associated with the non-volatile memory array 204 further includes read-once logic 210 operable to read data from a selected portion of the non-volatile memory array 204 for usage, and destroy the data in the selected portion of the non-volatile memory array 204.

In a specific example embodiment, the data security logic can manage a memory that includes charge memory which require discrete amounts of charge to induce a voltage, which is detected during reads. The data security logic can prevent reads subsequent to an initial read and reduce the charge, thereby disabling the subsequent reads.

For example, the memory device 200 can be arranged where the data security logic 206 operable to perform at least one data security function 208 associated with the non-volatile memory array 204 further includes read-once logic 210 operable to read data from a selected portion of the non-volatile memory array 204 for usage, destroy the data in the selected portion of the non-volatile memory array 204, and throw an exception 212 for subsequent reads of the selected portion of the non-volatile memory array 204.

In a particular example embodiment, the memory device can include data security logic that protects Basic Input/Output System (BIOS) code in the nonvolatile memory array from being read after system initialization. The BIOS is fundamental system code or instructions for managing system configuration and loading the operating system for a computing system. The region of memory containing the BIOS, a recovery BIOS region, is executed when a computing system is initialized and stores recovery or reset code, determining bootstrap load operations for each system initialization. The recovery BIOS region is critical to computing system operations so that protection of integrity of the BIOS is fundamental to operations. The data security logic can ensure that only a new system initialization/machine reset allows reading of the data in the recovery BIOS region so that only the processing that takes place during system initialization can access the selected block prior to locking against further access. The data security logic can lock one or more blocks in the memory based on the executed code.

In certain applications and/or embodiments, the memory device 200 can be constituted in a manner that the data security logic 206 operable to perform at least one data security function 208 associated with the non-volatile memory array 204 further includes read-once logic 210 operable to read data from a selected portion of the non-volatile memory array 204 for usage, and flag the selected portion of the non-volatile memory array 204.

In various embodiments, the data security logic can virtually lock predetermined locations in the nonvolatile memory, ensuring protection of secret code and data in a block of the nonvolatile memory array and enabling a computing system to prevent access to the secret code and/or data by other programs after allowed processing is complete. Memory locking protects selected blocks of memory against malware or hacking and flags the security breach for subsequent analysis and action.

In some embodiments, the memory device 200 can be constructed with the data security logic 206 operable to perform at least one data security function 208 associated with the non-volatile memory array 204 further including read-once logic 210 operable to read data from a selected portion of the non-volatile memory array 204 for usage, flag the selected portion of the non-volatile memory array 204, and throw an exception 212 for subsequent reads of the flagged selected portion of the non-volatile memory array 204.

The data security logic can protect memory and other objects to prevent mischievous, intentional violation of the memory and objects. The data security logic can protect memory and other objects against accidental memory overlays that degrade data, responding by throwing an exception and flagging the affected portions of the nonvolatile memory array.

In a particular embodiment, the memory device 200 can be configured such that the data security logic 206 operable to perform at least one data security function 208 associated with the non-volatile memory array 204 further includes read-once logic 210 operable to receive a request to read a selected portion of the non-volatile memory array 204, and respond to the request to read a selected portion of the non-volatile memory array 204 including determining whether data in the selected portion of the non-volatile memory array 204 was previously read, determining whether the previously read data in the selected portion of the non-volatile memory array 204 was deleted, and reading data from the selected portion of the non-volatile memory array 204 only if the previously read data was deleted.

In various embodiments, a memory device can be configured based on the amount of memory that is to be protected. For example, if only a small amount of protected memory is desired, the memory can be placed in close proximity to a CPU, in the manner of a machine register.

Figure 3A:
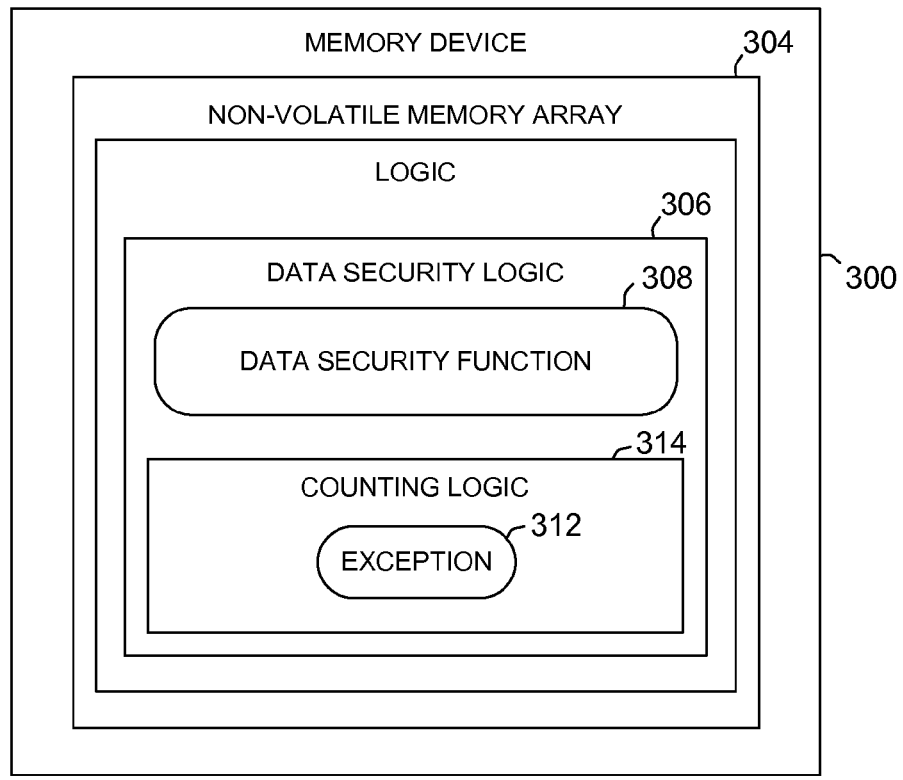
FIGS. 3A and 3B are schematic block diagrams illustrating respective top and side view of an embodiment of a memory device that supports data security and access tracking using counting logic that can count various aspects of operation associated with selected memory using functionality integrated into memory.
Figure 3B:
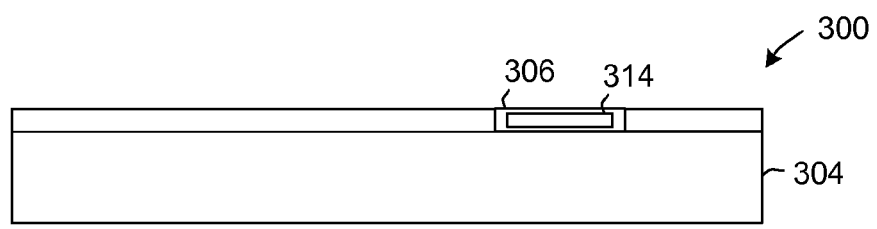

Referring to FIGS. 3A and 3B, schematic block diagrams illustrate respective top and side view of an embodiment of a memory device that supports data security and access tracking using counting logic that can count various aspects of operation associated with selected memory using functionality integrated into memory. Hence, the memory device 300 can be arranged where the data security logic 306 operable to perform at least one data security function 308 associated with the non-volatile memory array 304 further includes counting logic 314 operable to count a number of times data is read from a selected portion of the non-volatile memory array 304.

Further embodiments can ensure correct information processing using data security logic integrated into the memory device that can count the number of times selected data a read from memory and limiting memory access based on the count.

In some applications and/or embodiments, the memory device 300 can be formed in a way that the data security logic 306 operable to perform at least one data security function 308 associated with the non-volatile memory array 304 further includes counting logic 314 operable to count a number of times data is read from a selected portion of the non-volatile memory array 304, and throw an exception 312 for a count greater than one of the number of times data is read from the selected portion of the non-volatile memory array 304.

In a particular application, the data security logic can enable a selected number of reads of a protected memory portion, for example to allow a contracted number of executions of a particular program. The counting logic can decrement a counter for each read until the contracted number of accesses is made, then throw an exception which can inform a user that access is no longer available and that additional accesses will require a new contract.

In a further example embodiment configuration, the memory device 300 can be constituted in a manner that the data security logic 306 operable to perform at least one data security function 308 associated with the non-volatile memory array 304 further includes counting logic 314 operable to count a number of times data is read from a selected portion of the non-volatile memory array 304 and a number of times the data is written to the selected portion of the non-volatile memory array 304.

Data security logic including counting logic for the number of reads and writes can be used to control wear-aware memory allocation that is robust to erroneous writes. To address frequent writes to the same or neighboring memory locations imposes additional overhead as writing shifts data to new locations. The data security and counting logic can allocate memory to prevent frequent reuse of memory locations.

In some example embodiments, the memory device 300 can be constructed with the data security logic 306 operable to perform at least one data security function 308 associated with the non-volatile memory array 304 further including counting logic 314 operable to count a number of times data is read from a selected portion of the non-volatile memory array 304 and a number of times the data is written to the selected portion of the non-volatile memory array 304, and control access to the selected portion of the non-volatile memory array 304 based on the counts.

In some embodiments, the data security logic and counting logic can implement memory allocation that limits the number of times a particular portion of memory is allocated and can maintain frequently used data in durable memory that is separate from wear-resistant memory.

In further applications and/or embodiments, the memory device 300 can be configured such that the data security logic 306 operable to perform at least one data security function 308 associated with the non-volatile memory array 304 further includes counting logic 314 operable to count a number of times data is read from a selected portion of the non-volatile memory array 304 and a number of times the data is written to the selected portion of the non-volatile memory array 304, and throw an exception 312 based on the counts.

In various embodiments, the data security logic and counting logic can include counters for different portions of memory, for example memory segments with different memory-wear functionality. Memory with higher wear-resistance can be allocated a higher number of counts before an exception is thrown to allow reconfiguration.

Figure 4A:
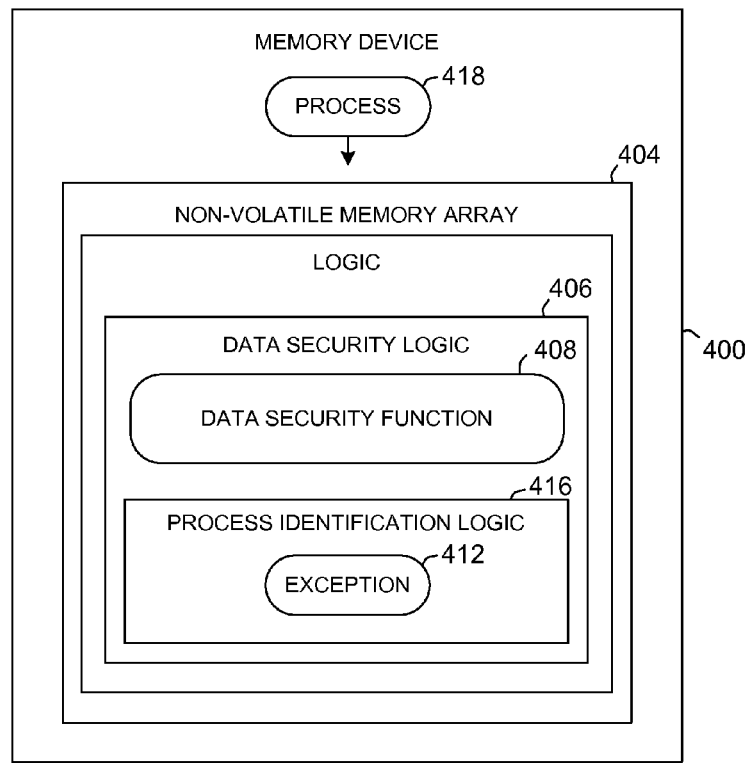
FIGS. 4A and 4B are schematic block diagrams showing respective top and side view of an embodiment of a memory device that supports data security and access tracking using process identification logic that can identify a process for authorization of access to selected memory using functionality integrated into memory.
Figure 4B:
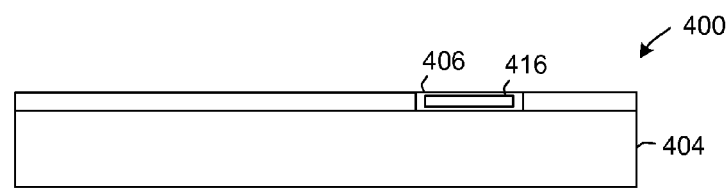

Referring to FIGS. 4A and 4B, schematic block diagrams show respective top and side view of an embodiment of a memory device that supports data security and access tracking using process identification logic that can identify a process for authorization of access to selected memory using functionality integrated into memory. Thus, in an example embodiment, the memory device 400 can be arranged where the data security logic 406 operable to perform at least one data security function 408 associated with the non-volatile memory array 404 further includes process identification logic 416 operable to identify a process 418 and determine whether the process 418 is enabled to read data from a selected portion of the non-volatile memory array 404 and allow the enabled process 418 to read the data from the selected portion of the non-volatile memory array 404.

For example, the process identification logic can implement memory hierarchies for memory protection. In particular, memory can be arranged in a hierarchy, such that an individual process can be enabled to have access to a particular ring within the hierarchy and all rings surrounding the particular ring. A component, such as an operating system kernel can be managed to be fully addressable, with access to the core of the hierarchical rings access to all memory rings; other processes can be controlled to have limited addressability to a particular ring or rings.

In an example embodiment, the memory device 400 can be constituted in a manner that the data security logic 406 operable to perform at least one data security function 408 associated with the non-volatile memory array 404 further includes process identification logic 416 operable to identify a process 418 and determine whether the process 418 is enabled to read data from a selected portion of the non-volatile memory array 404 and to throw an exception 412 if the process 418 is not enabled to read the data from the selected portion of the non-volatile memory array 404.

For example, the data security logic and process identification logic can map memory to different, but not necessarily concurrent processes, and control access to different portions of memory based on identity of a processor such as in the manner of file system access control.

In various embodiments, the memory device 400 can be formed in a way that the data security logic 406 operable to perform at least one data security function 408 associated with the non-volatile memory array 404 further includes process identification logic 416 operable to identify a process 418 and determine whether the process 418 is identified as enabled to read data from a selected portion of the non-volatile memory array 404 and to throw an exception 412 if the process 418 is not identified as enabled to read the data from the selected portion of the non-volatile memory array 404.

Within a computer system, that data security logic can be used to protect, for example, components of an operating system and other program components from one another's operations and actions. In a particular example situation, a global address space can be shared among multiple software components and the data security logic can ensure that memory, files, objects, data, code, information, and the like can be accessed or operated upon by only those components granted proper authorization. Thus, in sample embodiments and/or applications, the memory device 400 can be constructed with the data security logic 406 operable to perform at least one data security function 408 associated with the non-volatile memory array 404 further including process identification logic 416 operable to identify a plurality of processes 418 and determine whether the plurality of processes 418 is enabled to communicate using a selected portion of the non-volatile memory array 404 and to access the selected portion of the non-volatile memory array 404 if enabled to communicate.

The data security logic can additionally ensure proper information processing by assuring integrity of an interaction between two or more processes, for example to deter eavesdropping or other security breach, or to ensure that two processes are operating in concert and not overwriting one another's data.

In further embodiments, the memory device 400 can be configured such that the data security logic 406 operable to perform at least one data security function 408 associated with the non-volatile memory array 404 further includes process identification logic 416 operable to identify a plurality of processes 418 and determine whether the plurality of processes 418 is enabled to communicate using a selected portion of the non-volatile memory array 404 and to disallow access to the selected portion of the non-volatile memory array 404 if not enabled to communicate.

In an example application, the data security logic can copy data from a first location of memory to a second redundant section of memory and the process identification logic can limit access to the memory sections based on identification of a process. For a memory that includes sufficiently large and inexpensive memory, the processor or logic can perform a copy function at selected intervals, for example in a selected range of cycle rates, to copy the state to a redundant fast memory for copying to a slow memory, and to facilitate decision-making in memory. Thus, the memory can control sampling with the logic including sampling functionality, and sampling of fast memory. For applications or contexts such as video handling in which only intermittent frames are sufficient to produce a suitable video image, a backup into lossy memory may be suitable to enable a basic recovery of data. In some embodiments, the memory may include excess memory in the form of flip-chip via a dedicated bus to send data from a first fast memory to a second fast memory. Variability of performance in the lossy memory can be exploited to destroy data such as image data, for example by transferring an video data into a lossy media from which video streaming cannot be recovered.

In some applications, what is desired is a capability to store large amounts of data while allowing some amount of inaccuracy or error. Such an application can be video streaming. The memory device can thus be formed with at least a portion of the memory that is very inexpensive but lossy.

In additional embodiments, the memory device 400 can be arranged where the data security logic 406 operable to perform at least one data security function 408 associated with the non-volatile memory array 404 further includes process identification logic 416 operable to identify a plurality of processes 418 and determine whether the plurality of processes 418 is enabled to communicate using a selected portion of the non-volatile memory array 404 and to throw an exception 412 if not enabled to communicate.

Figure 5A:
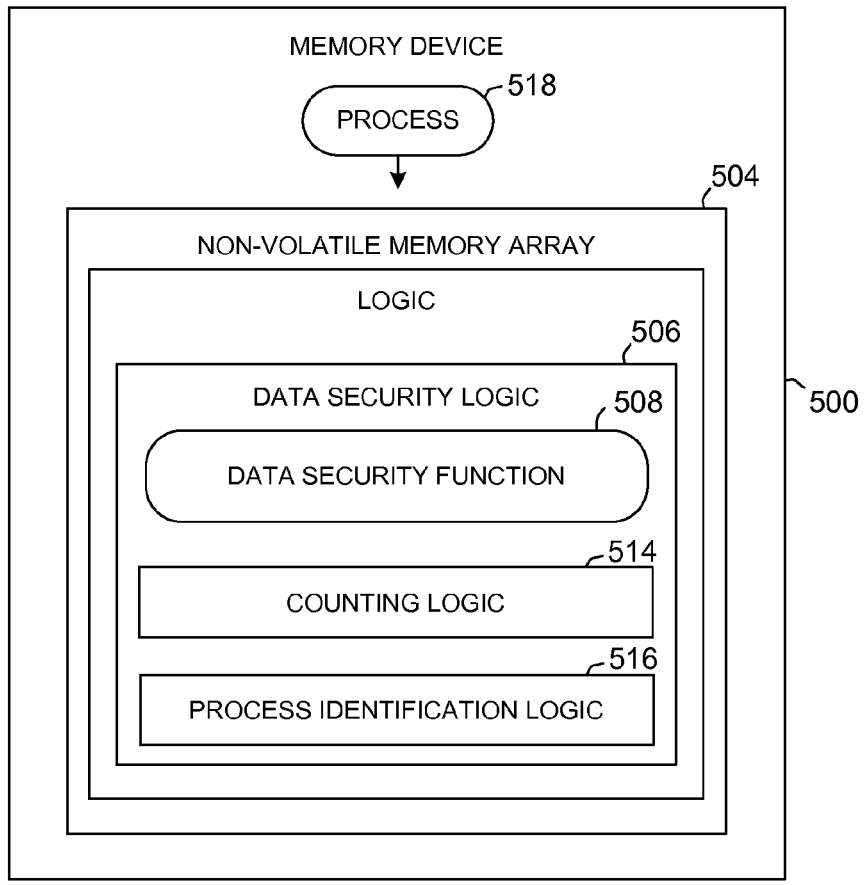
FIGS. 5A and 5B are schematic block diagrams depicting respective top and side view of an embodiment of a memory device that supports data security and access tracking using counting logic and process identification logic that can operate in combination to identify a process and count accesses of the process for authorization of access to selected memory using functionality integrated into memory.
Figure 5B:
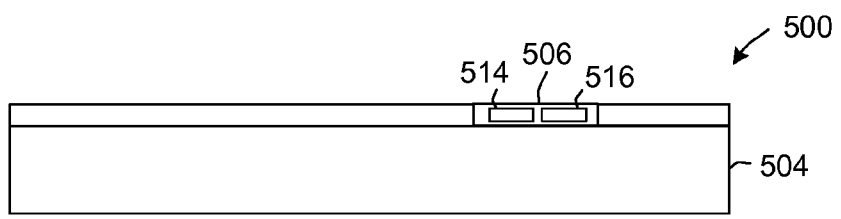

Referring to FIGS. 5A and 5B, schematic block diagrams depict respective top and side view of an embodiment of a memory device that supports data security and access tracking using counting logic and process identification logic that can operate in combination to identify a process and count accesses of the process for authorization of access to selected memory using functionality integrated into memory. Accordingly, in various embodiments, the memory device 500 can be constituted in a manner that the data security logic 506 operable to perform at least one data security function 508 associated with the non-volatile memory array 504 further includes counting logic 514 and process identification logic 516 operable in combination to manage access to a selected portion of the non-volatile memory array 504.

In some embodiments, the data security logic can perform read/write counting, including hardware support for identifying the number of access that have occurred, when the accesses occurred, and the process or entity that accessed certain data.

In example embodiments, the memory device 500 can be composed with the data security logic 506 operable to perform at least one data security function 508 associated with the non-volatile memory array 504 further including counting logic 514 and process identification logic 516 operable in combination to manage identify a number of accesses of a selected portion of the non-volatile memory array 504 by what processes 518.

In some embodiments and/or applications, the memory device 500 can be formed in a way that the data security logic 506 operable to perform at least one data security function 508 associated with the non-volatile memory array 504 further includes counting logic 514 and process identification logic 516 operable in combination to manage identify a number of accesses of a selected portion of the non-volatile memory array 504 by what processes 518 and at what times.

In an example embodiment, the data security logic including counting logic and process identification logic can delay reallocation of memory after a particular memory portion is released from use. The logic can timestamp the memory portion and add an identifier of the portion to a queue. On a memory allocation or release, the logic can identify the block at the head of the queue and analyze the process and number of memory access counts associated with the process to determine whether the memory portion is suitable to use the memory, based on wear characteristics of the memory portion. Thus, the logic can manage memory allocation to avoid excessive memory wear.

Figure 6A:
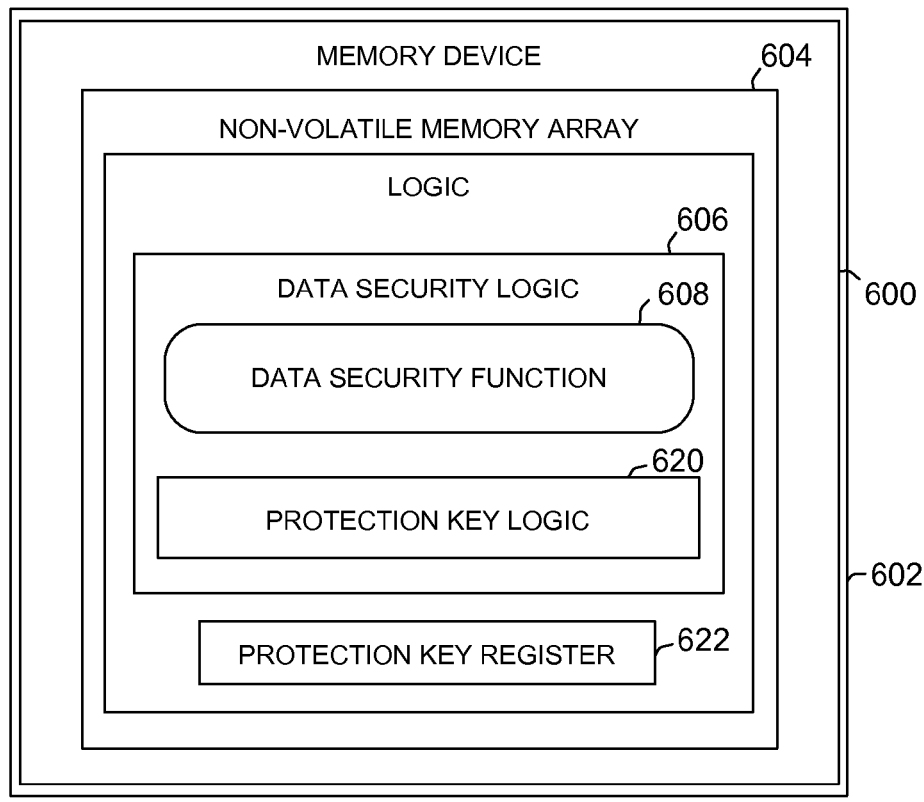
FIGS. 6A and 6B are schematic block diagrams illustrating respective top and side view of an embodiment of a memory device that supports data security and access tracking using a protection key to secure information and memory in a selected memory portion using functionality integrated into memory.
Figure 6B:
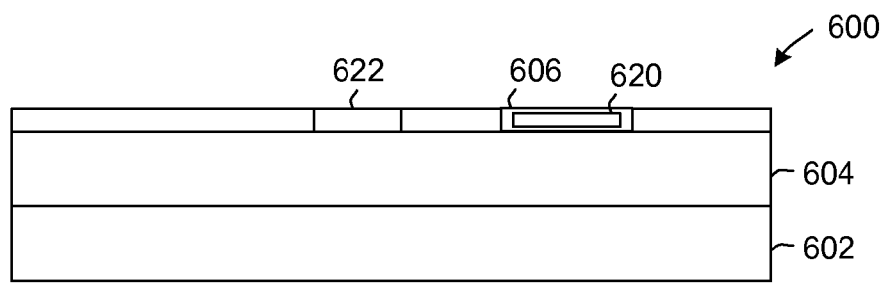

Referring to FIGS. 6A and 6B, schematic block diagrams illustrate respective top and side view of an embodiment of a memory device that supports data security and access tracking using a protection key to secure information and memory in a selected memory portion using functionality integrated into memory. In some embodiments and/or applications, the memory device 600 can further include a protection key register 622 integrated with the data security logic 606 and the non-volatile memory array 604 on the substrate 602. The data security logic 606 operable to perform at least one data security function 608 associated with the non-volatile memory array 604 can further include protection key logic 620 operable to manage access to a selected portion of the non-volatile memory array 604 based on information in the protection key register 622.

In a specific example embodiment, the protection key logic can manage memory protection using keys which can be allocated at a selected granularity to indicate an association with a data object. Individual processes or modules can be allowed access to memory portions assigned to one or more data objects. The protection key logic can control access to selected memory portions based on whether a protection key currently loaded in the protection key register allows access to the memory portion(s). In a specific example, an individual portion of memory can be assigned a key number that indexes into a protection key set. The currently loaded protection key set identified memory portion key numbers that can be accessed by a process attempting access. A key in the protection key set can be associated with one or more data objects or groups of data objects, identifying currently accessible data objects or groups of data objects.

In a particular example embodiment, the memory device 600 can further include a protection key register 622 integrated with the data security logic 606 and the non-volatile memory array 604 on the substrate 602. The data security logic 606 operable to perform at least one data security function 608 associated with the non-volatile memory array 604 can further include protection key logic 620 operable to receive information and write the received information to the protection key register 622.

In a specific example embodiment, the protection key logic can manage memory protection using control of a translation lookaside buffer in the memory integrated with the protection key logic. A request directed to a memory portion can be received from an external device such as a CPU and the protection key logic can search the translation lookaside buffer for the memory portion request. If an entry for the memory portion request is located in the translation lookaside buffer, then the key number stored with the entry is retrieved. Otherwise, a table is accessed to retrieve the key number for the request. The key number can be compared with the protection key set to determine whether access to memory portions assigned to the key number is enabled. If the protection key set enables access, the protection bit is also checked to determine whether access to the memory portion is enabled.

In some embodiments, the memory device 600 can further include a protection key register 622 integrated with the data security logic 606 and the non-volatile memory array 604 on the substrate 602. The data security logic 606 operable to perform at least one data security function 608 associated with the non-volatile memory array 604 can further include protection key logic 620 operable to read data from a selected portion of the non-volatile memory array 604 only if authorized by information in the protection key register 622.

In a particular example embodiment, the protection key logic can manage memory protection using a protection key set in the form of a bit vector indexed to memory portion key numbers. The protection key set can be indexed to memory portion key numbers for read requests and indexed to memory portion key numbers for write requests. A bit set at individual indexed key number locations can identify whether a particular type of access is enabled.

In various embodiments and/or applications, the memory device 600 can further include a protection key register 622 integrated with the data security logic 606 and the non-volatile memory array 604 on the substrate 602. The data security logic 606 operable to perform at least one data security function 608 associated with the non-volatile memory array 604 can further include protection key logic 620 operable to write data to a selected portion of the non-volatile memory array 604 only if authorized by information in the protection key register 622.

In a particular example embodiment, the protection key logic can manage memory protection in a memory with a flat address space. The protection key logic can updating memory segment table entries which hold a memory address for individual memory portions with a memory portion protector that identifies access allowed to the memory portion by a process or module as the process or module is loaded for execution. The protection key logic can efficiently manage changes in memory protection using memory protectors in table entries by addressing multiple portions of memory, for example different types of memory integrated into the memory device, by having a single address mirrored over multiple memory segments. For example, a memory portion protector for a single memory portion stored in multiple locations can have an address mirrored in memory segments including translation lookaside buffer, cache, and table in which the protection key logic integrated into the memory can simultaneously change the protector value in the multiple segments in a single operation.

Figure 7A:
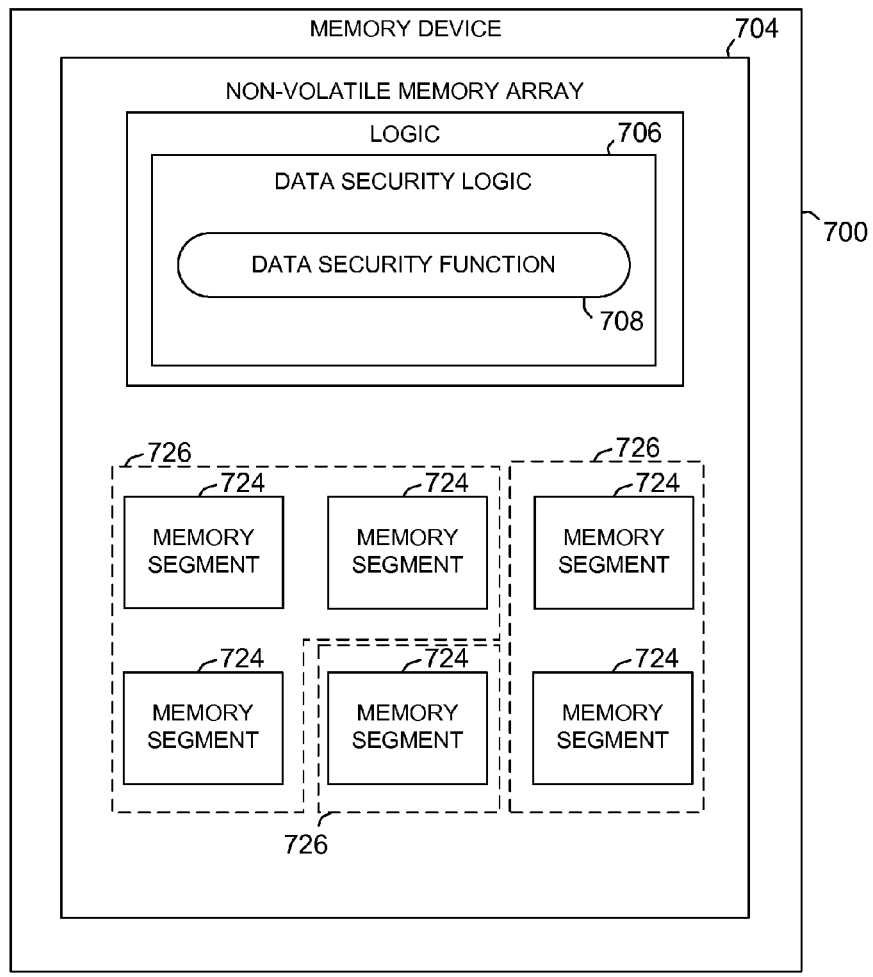
FIGS. 7A and 7B are respective top and side views of schematic block diagrams showing embodiments of a memory device that supports data security and access tracking using functionality integrated into memory including multiple memory types.
Figure 7B:
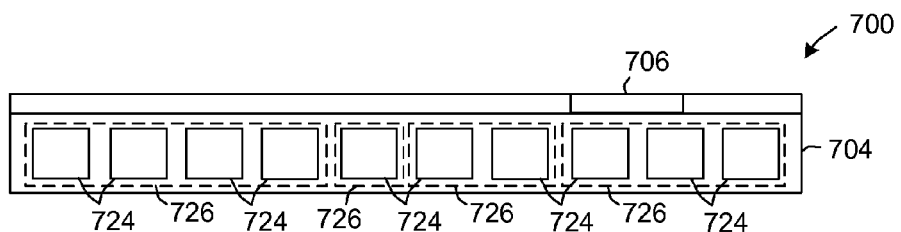

In some arrangements, memory can include portions with different memory types. In embodiments of the memory device depicted in FIGS. 7A and 7B, respective top and side views of schematic block diagrams show embodiments of a memory device that supports data security and access tracking using functionality integrated into memory including multiple memory types. The memory device 700 can be configured such that the non-volatile memory array 704 can further include a plurality of non-volatile memory segments 724 characterized by a respective plurality of non-volatile memory types 726. The data security logic 706 operable to perform at least one data security function 708 associated with the non-volatile memory array 704 can be operable to perform at least one data security function 708 for the non-volatile memory segments 724 selectively based on ones of the plurality of non-volatile memory types 726. In an example embodiment, the data security logic can include multiple data security functions associated with different non-volatile memory segments with possible differences in the level of security applied.

In various embodiments, the memory device can include multiple types of memory technology, for example including charge memory or resistive memory. An memory device can include sections of charge memory and resistive memory and the logic can assign applications to exploit the advantages and diminish the consequences of disadvantages of either type of memory. Charge memories induce a voltage which is detected during read operations in response to require amounts of charge. In nonvolatile storage, flash memories precisely control the discrete charge placed on a floating gate. In volatile storage, DRAM not only places charge in a storage capacitor but also mitigate subthreshold charge leakage through the access device using capacitors that are sufficiently large to store charge for reliable sensing and using transistors that are sufficiently large to exert effective control over the channel. Resistive memories use electrical current to induce a change in atomic structure, changing the resistance detected during reads. Resistive memories are more suitable for scaling than charge memories by avoiding precise charge placement and control. Programming via techniques such as current injection scale with cell size. Phase-change memory (PCM), spin-torque transfer (STT) magneto-resistive RAM (M-RAM), and ferroelectric RAM (FRAM) are examples of resistive memories.

The non-volatile memory array can include memory portions formed of memory technologies characterized by high performance under particular operating conditions. Phase change RAM (PCRAM) is a memory technology with highly favorable small cell size and thus density. The memory device which includes at least a portion of PCRAM can further include logic that monitors and determines operating conditions and can assign memory accesses to PCRAM in low power high performance conditions.

The logic can allow less-than-perfect performance for suitable applications and/or contexts. The logic can determine and use Quality-of-Service (QoS) ratings for processor in memory (POM), and assign priority of performance to sections of memory. For relatively high performance applications, the device may be configured to work perfectly and the logic can specify that only highly reliable memory is used. Other applications can operate at a lower QoS and the logic can select memory accordingly. Other examples of non-volatile memory technologies with various QoS ratings can include resistive RAM (R-RAM) and spin-transfer torque RAM (STT-RAM). R-RAM can be any memory technology that relies of resistance change to store information, for example including space-charge-limited-current (SCLC), filament, programmable-metallization-cell (PMC), Schottkey contact and traps (SCT). R-RAM can be characterized by non-volatility, high-speed, high-performance, zero standby power, and, in some arrangements, high density. For an memory device that includes at least a portion of the memory in the form of R-RAM, the logic can monitor memory accesses and determine whether a particular application is characterized by high-speed and high-performance, and assign the R-RAM memory portion for the application.

For example, the logic can determine and use QoS ratings, and assign priority of performance to sections of memory. For relatively high performance applications, the device may be configured to work perfectly and the logic can specify that only highly reliable memory is used. The logic can perform an error detection operation and determine whether too many errors are occurring according to a predetermined threshold and, if so, the logic can shift to higher performing memory. The logic can start an application with a determined QoS rating and monitor errors to iteratively select an appropriate memory segment that is tailored to application characteristics and performance.

In another example application, an memory device can include a non-volatile memory array and includes at least a portion of the memory in the form of STT-RAM. STT-RAM can be characterized by improved performance via overdriving. Overdriving the gate voltage of an NMOS transistor in the STT-RAM can increase $V_{GS}$ and thus enhance the driving strength of the NMOS transistor. The logic can be configured to manage overdriving, for example, by monitoring memory access operations such as reading, writing, erasing, driving write-line voltage, and the like, and control overdriving according to the particular application.

In various embodiments, the memory device can include a non-volatile memory array which includes one or more suitable memory technology. For example, memory technologies in the memory device can include embedded flash, read-only memory (ROM), electrical fuse (one-time programmable), CMOS floating gate (multiple time programmable), CMOS floating gate (one-time programmable), and anti-fuse (one-time programmable). The different memory technologies can have various advantages and disadvantages for particular operations or applications. Some memory technologies can have relatively high density such as ROM and antifuse, while others have low density (for example electrical fuse and CMOS floating gate). Some technologies have good endurance such as embedded flash, and CMOS floating gate, while others have poor endurance, for example ROM, electrical fuse, CMOS floating gate, and antifuse. Various technologies can have different standby and active current including high current (electrical fuse), medium current (embedded flash and CMOS floating gate), and low current (ROM and antifuse). The memory technologies vary in random access time including fast (ROM and antifuse), medium (embedded flash and CMOS floating gate), and slow (electrical fuse). The memory technologies vary in security including high security (antifuse), medium security (embedded flash and CMOS floating gate), and slow security (ROM and electrical fuse). The memory technologies vary in high and low temperature and voltage tolerance including high tolerance (ROM and antifuse), medium tolerance (electrical fuse), and low tolerance (embedded flash and CMOS floating gate). In a memory device that includes multiple memory sections with more than one memory technology, the logic can monitor a history and pattern of memory accesses and assign memory usage depending on the monitoring. For data or code that changes very frequently, the logic can assign embedded flash. For high volume storage, the logic can assign more dense memory technologies. For applications in which the code changes infrequently, the logic can allocate, for example, ROM and antifuse. The logic can assign memory accesses depending on temperature and voltage conditions that can be measured using sensors or otherwise communicated to the memory device. The logic can determine the security level of an application and assign the memory technology accordingly.

In some embodiments and/or applications, the non-volatile memory can be formed of one or more of any non-volatile memory type or technology including read-only memory, flash memory, ferroelectric random access memory (F-RAM), magneto-resistive RAM (M-RAM) or the like.

In some embodiments or applications, a capability for the memory device to efficiently support both bit maps and vector graphics may be useful. Accordingly, the memory device can be configured so that the memory includes a portion that is bit-mapped and a portion that is vector memory. For example, part of the memory can be optimized for pictures and video (JPEG) and another portion optimized for more computational applications. An example of such that context that would benefit from both memory types is a mobile telephone with camera and/or video functionality.

Figure 8A:
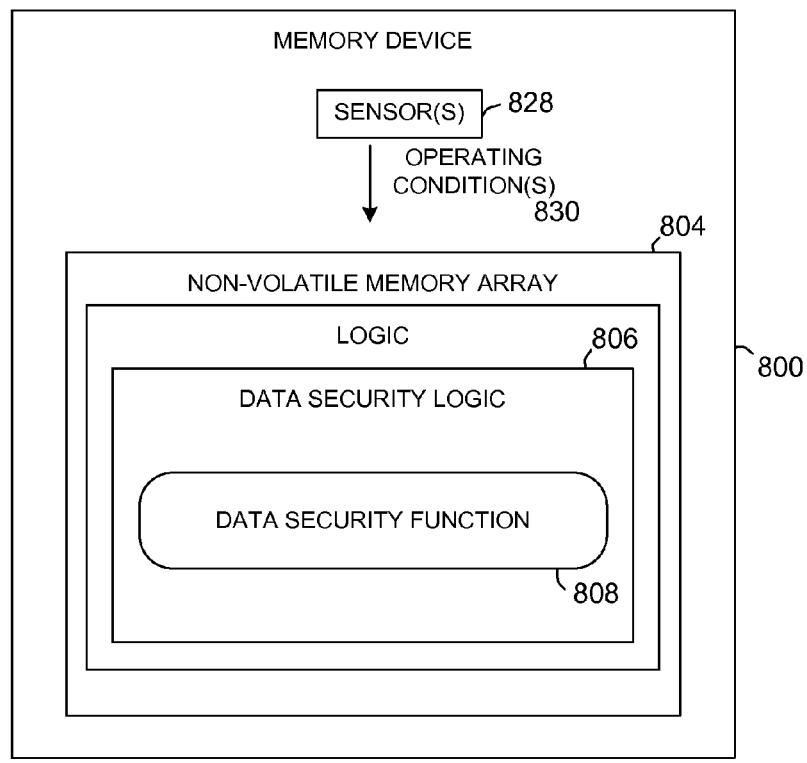
FIGS. 8A and 8B are respective top and side views of schematic block diagrams illustrating embodiments of a memory device that supports data security and access tracking using functionality integrated into memory and is capable of operating in combination with one or more sensors integrated with the apparatus to detect and react to operating conditions.
Figure 8B:
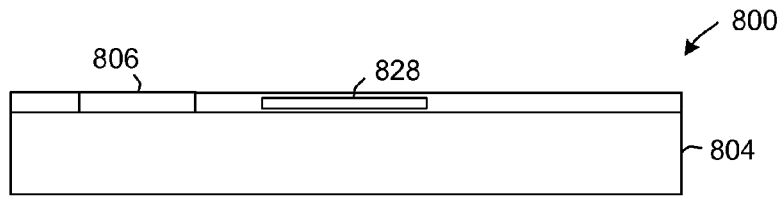

Referring to FIGS. 8A and 8B, respective top and side views of schematic block diagrams illustrate embodiments of a memory device that supports data security and access tracking using functionality integrated into memory and is capable of operating in combination with one or more sensors integrated with the apparatus to detect and react to operating conditions. For example, the memory device can be integrated used in a medical implant such as an orthopedic implant (knee, hip, shoulder, elbow, and the like), a cardiology implant such as a pacemaker, anti-tachycardia device, defibrillator, and the like. The memory device can include any suitable type of sensor such as motion or position sensors, electrical signal sensors, pressure sensors, oxygen sensors, and the like. The processor and memory can be configured to facilitate monitoring for therapeutic and diagnostic purposes, and delivery of therapy.

Figure 9A:
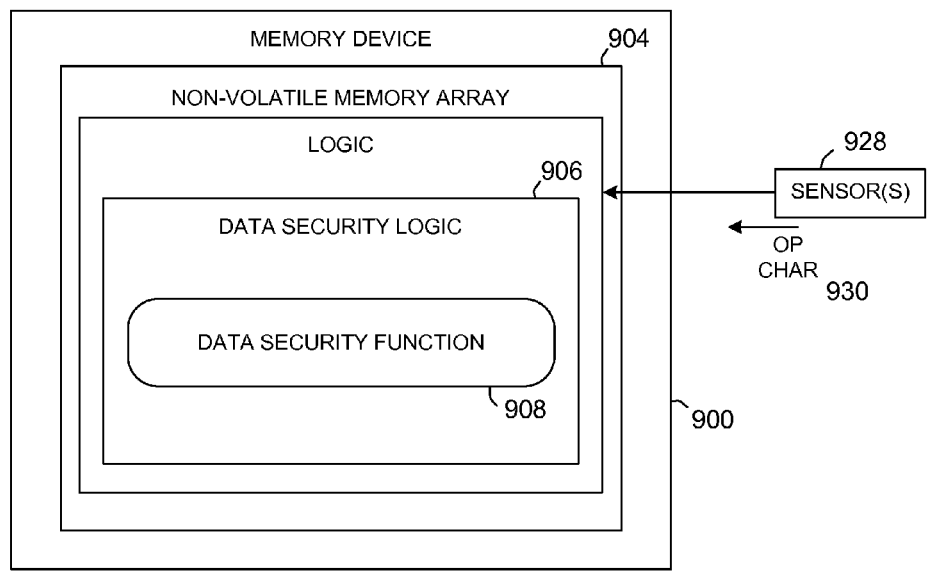
FIGS. 9A and 9B are respective top and side views of schematic block diagrams showing embodiments of a memory device that supports data security and access tracking using functionality integrated into memory and is capable of operating in combination with one or more sensors external to the apparatus to detect and react to operating conditions.
Figure 9B:
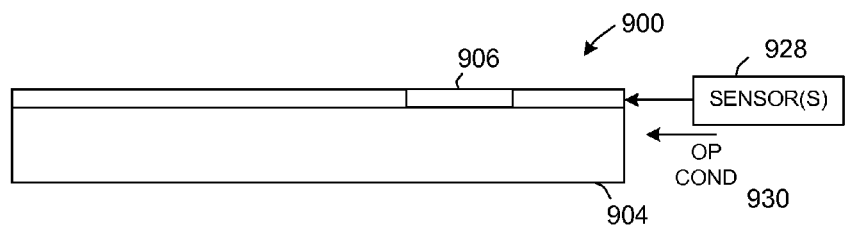

Referring to FIGS. 9A and 9B, respective top and side views of schematic block diagrams show embodiments of a memory device that supports data security and access tracking using functionality integrated into memory and is capable of operating in combination with one or more sensors external to the apparatus to detect and react to operating conditions. For example, the memory device can be used in a product in the form of an environmental monitor such as for usage in environmental-critical applications such as computer and network data centers, hospitals, and museums. The memory device can be used with any suitable type of environment sensor such as thermometers, pressure sensors, magnetic field sensors, moisture sensors, and the like. The environmental monitor can be used to monitor and maintain the environment within selected limits.

Referring to FIGS. 8A, 8B, 9A, and 9B, the memory device 800, 900 can further include at least one sensor 828, 928 operable to detect at least one operating condition 830, 930. The data security logic 806, 906 operable to perform at least one data security function 808, 908 associated with the non-volatile memory array 804, 904 can be operable to perform at least one data security function 808, 908 for the non-volatile memory array 804, 904 selectively based on the at least one operating condition 830, 930.

Thus, the data security logic can be operable to determine whether a portion of memory can be accessed based on physical phenomena detected by a sensor. For example, the memory device can incorporate sensors or other components that detect phenomena which can be monitored by the logic to detect aspects of magnetic fields, temperature, velocity, rotation, acceleration, inclination, gravity, humidity, moisture, vibration, pressure, sound, electrical fields or conditions such as voltage, current, power, resistance, and other physical aspects of the environment to enable the data security logic to perform actions to improve data and memory security.

The memory device can include any suitable sensor for detecting a condition that may be useful for improving data and memory security. Example sensors can measure voltage, current, capacitance, resistance, inductance, capacitive/resistive, and other electrical or magnetic phenomena. Other suitable sensors can sense touch, tactile phenomena, pressure, vibration, velocity, acceleration, rotation, angular acceleration, angular velocity, and the like. Some sensors can sense ionic potential, optical radiation, electrochemical potential, infrared radiation, temperature, ionizing radiation, moisture, and the like.

In an embodiment of a memory device that includes multiple memory types or technologies, the sensor can detect electrical characteristics such as voltage or current and the data security logic can use the electrical characteristics to perform data or memory security operations such as determining whether a portion of memory has been previously read and, if so, preventing subsequent reading of the memory portion.

In an embodiment of a memory device that includes multiple memory types or technologies, the sensor can detect electrical characteristics such as voltage or current and the logic can determine whether the energy drive is sufficient to drive the memory reliably. If the energy drive is insufficient for a particular type of memory, the logic can shift memory accesses to a memory type that can be reliably driven.

In various embodiments, logic can be operable to monitor the operating condition, monitor memory accesses, analyze the monitored operating conditions and memory accesses, predict expected outcomes based on the monitored operating conditions and memory accesses, and allocate memory accesses based on the predicted expected outcomes. In a particular application, the memory device can include logic configured to predict different possible outcomes, for example predicting several possible outcomes and preparing for each, then use sensors, measurements, and monitoring to determine which outcome to activate at a particular time.

Figure 10A:
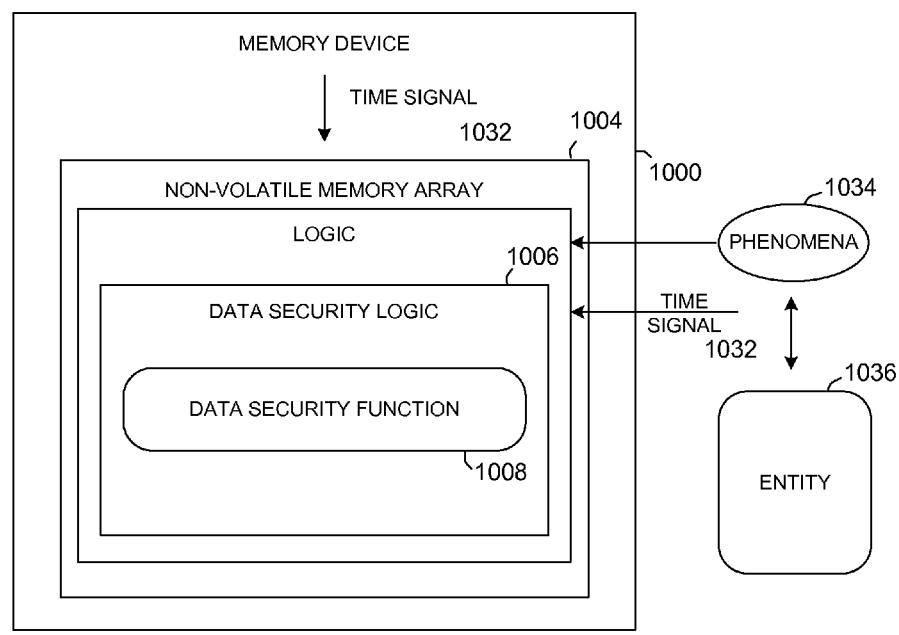
FIGS. 10A and 10B are schematic block diagrams depicting respective top and side view of an embodiment of a memory device supporting data security and access tracking that is responsive to various signals and phenomena using functionality integrated into memory.
Figure 10B:
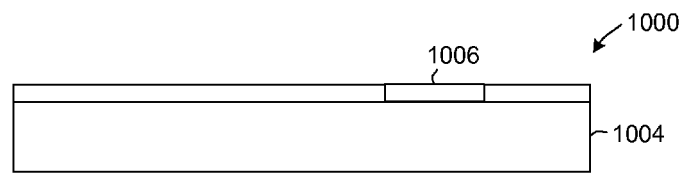

The data security logic can be used to deter attacks from malware running on a CPU external to the memory device, and attempted accesses of data stored on the memory device from a network. Referring to FIGS. 10A and 10B, schematic block diagrams depict respective top and side view of an embodiment of a memory device supporting data security and access tracking that is responsive to various signals and phenomena using functionality integrated into memory. In embodiments according to FIGS. 10A and 10B, the memory device 1000 can be arranged where the data security logic 1006 operable to perform at least one data security function 1008 associated with the non-volatile memory array 1004 is operable to access a time signal 1032 and perform at least one data security function 1008 for the non-volatile memory array 1004 based on the time signal 1032. The time signal can be used to limit access to one or more memory locations based on time. In an example embodiment and/or application, the memory may have access enabled as specified for a particular tick count since boot time, current time, various high-performance performance counters, high-precision logic counters that are internal to the memory device integrated circuit, high-precision processor or CPU counters external to the memory device integrated circuit, and the like.

For example, the memory device can include logic that takes into consideration that, at different times, the loads are expected to be different. In a particular instance, the memory device may be used in a data center in which some of the activity is work-related, and other activity is recreational. The logic can be configured to allocated different types of memory accordingly, for example to handle volumes of streaming video and audio content during non-working hours.

In another example operation, the data security logic can be configured to programmably select times at which a particular user, entity, or process can access a specified memory location. According to a predetermined arrangement, the data security logic can allow different entities to access the specified memory at particular times, or allow some entities read access at selected times and other entities write access, for example to avoid a race condition and ensure the correct data is available according to a predetermine arrangement.

In an example embodiment, the memory device 1000 can be constructed with the data security logic 1006 operable to perform at least one data security function 1008 associated with the non-volatile memory array 1004 operable to monitor phenomena 1034 detectable at the memory device 1000 and perform at least one data security function 1008 for the non-volatile memory array 1004 based on the monitored phenomena 1034. Detected or received information associated with various phenomena can be used to supply constraints limiting access to memory. In an example embodiment and/or application, the data security logic can limit memory accessibility to a variety of phenomena such as current process identifier (ID), current thread ID, a hash of a user's environmental block including user name, computer name, search path, and others. Other memory device phenomena can include system information fields, performance counters, and the like. Additional physical phenomena can be monitored via sensors or other components incorporated into the memory device that detect phenomena which can be monitored by the control logic to detect magnetic fields, temperature, velocity, rotation, acceleration, inclination, gravity, humidity, moisture, vibration, pressure, sound, electrical fields or conditions such as voltage, current, power, resistance, and other physical aspects of the environment to enable the control logic to perform actions to maintain, repair, clean, or other operations applied to the memory.

In various embodiments and/or applications, the memory device 1000 can be formed in a way that the data security logic 1006 operable to execute at least one data security function 1008 associated with the non-volatile memory array 1004 is operable to accumulate and communicate information about phenomena 1034 associated with at least one entity 1036 in association with the memory device 1000 and perform at least one data security function 1008 for the non-volatile memory array 1004 based on the monitored phenomena 1034. In various embodiments and/or applications, an entity can be a person, a living being, a non-living being, an organization (business, political, or otherwise), a device, a computer, a network, or the like. For purposes of example, the memory device can be integrated into a biocompatible, biodegradable form for hemodynamic monitoring of pressure and blood flow within the circulatory system. Thus, the processor and integrated memory in the memory device can include encryption logic in which security is facilitated by data security logic to control access to algorithm control parameters specific to the patient or to limit access to patient data accumulated and stored in the memory device, for example in a product for Holter monitoring of an ambulatory patient independently of any external device, although supporting communication with a device external to the patient's body via telemetry for exchange of commands, instructions, control information, and data. Other embodiments of the memory device can be used in combination with suitable sensors that can sense touch, tactile phenomena, pressure, vibration, velocity, acceleration, rotation, angular acceleration, angular velocity, ionic potential, optical radiation, electrochemical potential, infrared radiation, temperature, ionizing radiation, moisture, and the like that can supply phenomena information associated with an entity.

Figure 11A:
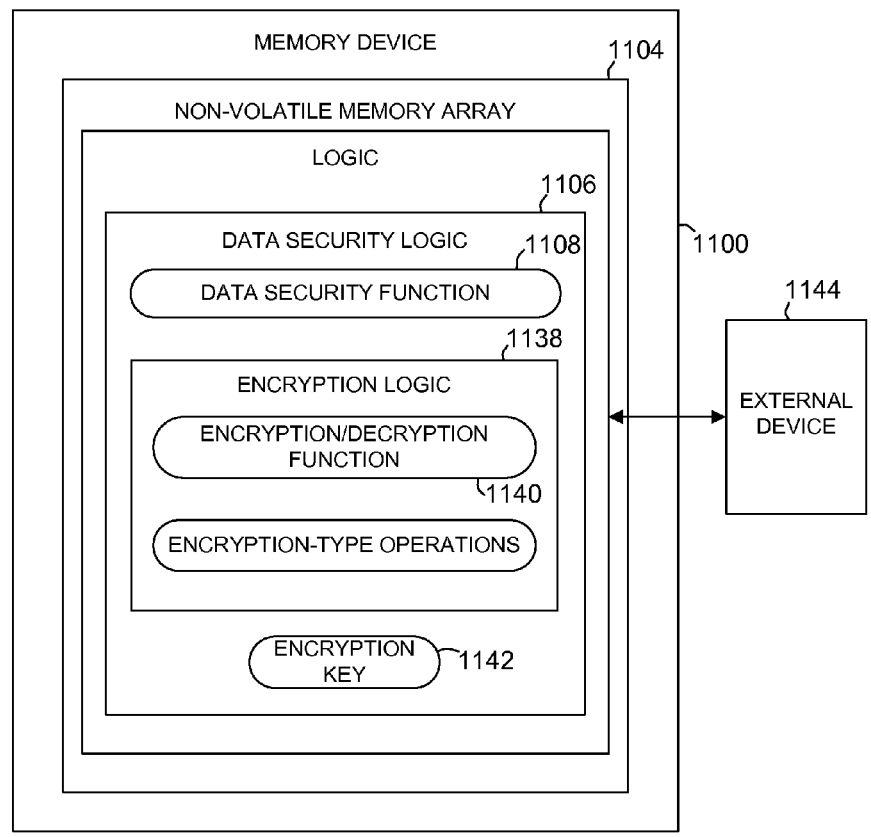
FIGS. 11A and 11B are schematic block diagrams illustrating respective top and side view of an embodiment of a memory device that supports data security and access tracking using encryption logic to secure information and memory in a selected memory portion using functionality integrated into memory.
Figure 11B:
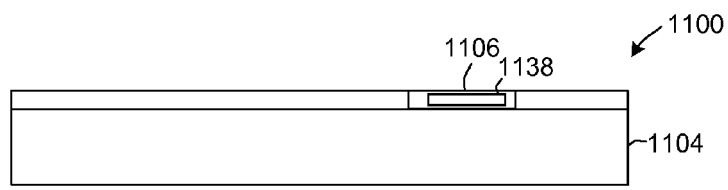

Referring to FIGS. 11A and 11B, schematic block diagrams illustrate respective top and side view of an embodiment of a memory device that supports data security and access tracking using encryption logic to secure information and memory in a selected memory portion using functionality integrated into memory. In example embodiments, the memory device 1100 can be constituted in a manner that the data security logic 1106 operable to perform at least one data security function 1108 associated with the non-volatile memory array 1104 can further include encryption logic 1138 operable to perform at least one encryption/decryption function 1140 associated with the non-volatile memory array 1104 and operable to read data from a selected portion of the non-volatile memory array 1104 only if authorized by results of the encryption/decryption function 1140.

In a particular example embodiment, the encryption logic can be used to protect secret information and/or instructions stored in selected blocks of the nonvolatile memory array. The secret information and/or instructions can be used for security operations, such as public and/or shared key cryptographic processing, copy protection, and the like. The encryption logic can protect the secret information and/or instructions from access subsequent to prescribed usage to prevent unauthorized access by malware, hackers, viruses, and the like.

Accordingly, the memory device further can be beneficial on the basis of improving security, for example by retaining encryption keys in the memory device, outside of main memory, until the keys are required in main memory. Holding (hiding) the encryption keys in the memory device, outside the main memory, until essential guards against malware. Typically, malware reads passcodes or encryption keys from main memory and uses the violated passcodes and encryption keys to perform decryption and/or decryption, generally impersonating an authorized user. In a secure environment, a user or system can transfer the passcodes and encryption keys to main memory only when essential, and otherwise maintain them securely in the memory device.

The memory device, by virtue of distributed processing with the memory, can enable the data security logic to improve security by holding data in a secure location on the non-volatile memory and hide a substantial amount of information secure from attacks that would affect a CPU and main memory. The distributed logic can execute simple or minor, dedicated processing due to the substantial amount of silicon available on the memory device.

In sample embodiments and/or applications, the memory device 1100 can be arranged where the data security logic 1106 operable to perform at least one data security function 1108 associated with the non-volatile memory array 1104 further includes encryption logic 1138 operable to perform at least one encryption/decryption function 1140 associated with the non-volatile memory array 1104 that holds at least one encryption key 1142 secure from a device external to the memory device 1144 and operable to read data from a selected portion of the non-volatile memory array 1104 only if enabled by the encryption key 1142.

By distributing data security and encryption functionality in combination with the memory, outside a main CPU and main memory in a computer system, throughput can be increased for encryption-type activities at least partly because transfer of data between the memory device and the CPU and main memory can be greatly reduced.

Figure 12A:
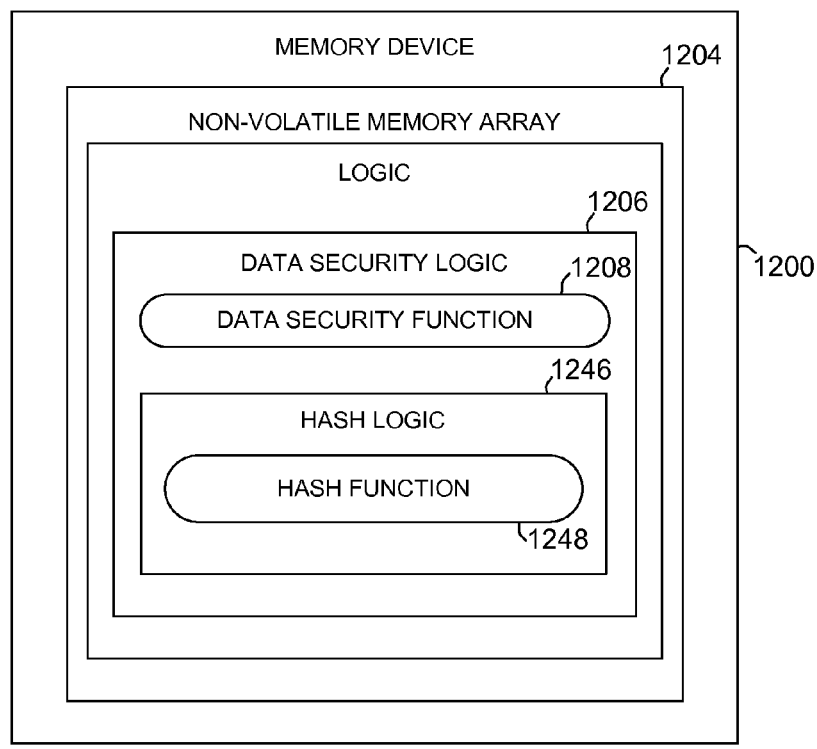
FIGS. 12A and 12B are schematic block diagrams showing respective top and side view of an embodiment of a memory device that supports data security and access tracking using hashing logic to secure information and memory in a selected memory portion using functionality integrated into memory.
Figure 12B:
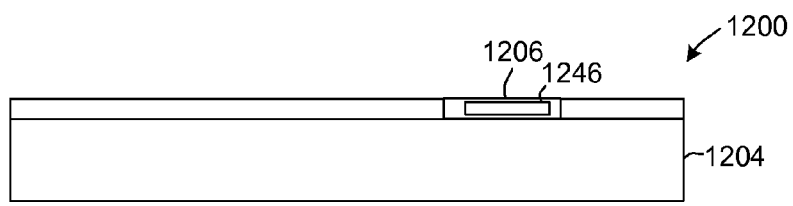

Referring to FIGS. 12A and 12B, schematic block diagrams show respective top and side view of an embodiment of a memory device that supports data security and access tracking using hashing logic to secure information and memory in a selected memory portion using functionality integrated into memory. Thus, in an illustrative embodiment, the memory device 1200 can be configured such that the data security logic 1206 operable to perform at least one data security function 1208 associated with the non-volatile memory array 1204 can further include hash logic 1246 operable to perform a hash function 1248 associated with the non-volatile memory array 1204 and operable to read data from a selected portion of the non-volatile memory array 1204 only if authorized by results of the hash function 1248. A hash function can be any algorithm or subroutine that maps large data sets of variable length, called keys, to smaller data sets of a fixed length. The values returned by a hash function can be called hash values, hash codes, hash sums, checksums, or hashes.

Hash logic can be used in both symmetric and asymmetric cryptography to generate keys and random values used in operations. In some embodiments, the encryption logic can support symmetric-key cryptography (block ciphers or stream ciphers) in which both the sender and receiver share the same key or different, related keys which are computable. The encryption logic can implement Data Encryption Standard (DES) and/or Advanced Encryption Standard (AES) block cipher designs in which data is input in blocks of plaintext. Embodiments of the encryption logic can also implement stream ciphers which create an arbitrarily long stream of key material, which is combined with the plaintext bit-by-bit or character-by-character. An output stream is formed based on a hidden internal state which changes as the cipher operates and is initialized up using the secret key material. The encryption logic can also implement cryptographic hash functions that can receive a message of any length as an input signal, and can produce a short, fixed length hash for use, for example, as a digital signature.

In some embodiment, the encryption logic can support public key cryptography in which a public key may be freely distributed, while a paired private key remains secret. In a public-key encryption system, the public key is used for encryption, while the private or secret key is used for decryption. Public-key cryptography can be used, for example, for implementing digital signature techniques.

The hash logic can be used in conjunction with the data security logic on the memory device for various purposes. For example, a pseudo-random number generator function P(key) can be uniform on an interval $[0, 2^{b-1}]$ and a hash function uniform on the interval $[0, n-1]$ is $nP[key]/2^b$ so that a division operation can be replaced by a more simple and possibly faster right bit shift, $nP(key) \gg b$, in an operation that can simplify the logic in the memory device. In another example operation, hashing logic in the memory device can be formed to perform hashing by nonlinear table lookup in which tables of random numbers can enable high-quality nonlinear functions to be used as hash functions or other purposes such as cryptography. The key to be hashed can be divided into parts with individual parts used as an index for a non-linear table. Table values can be added by arithmetic or XOR addition to the hash value, reducing memory size and enabling fast hash execution, which can be particularly beneficial in a memory device that includes simplified logic integrated with the non-volatile memory.

Figure 13A:
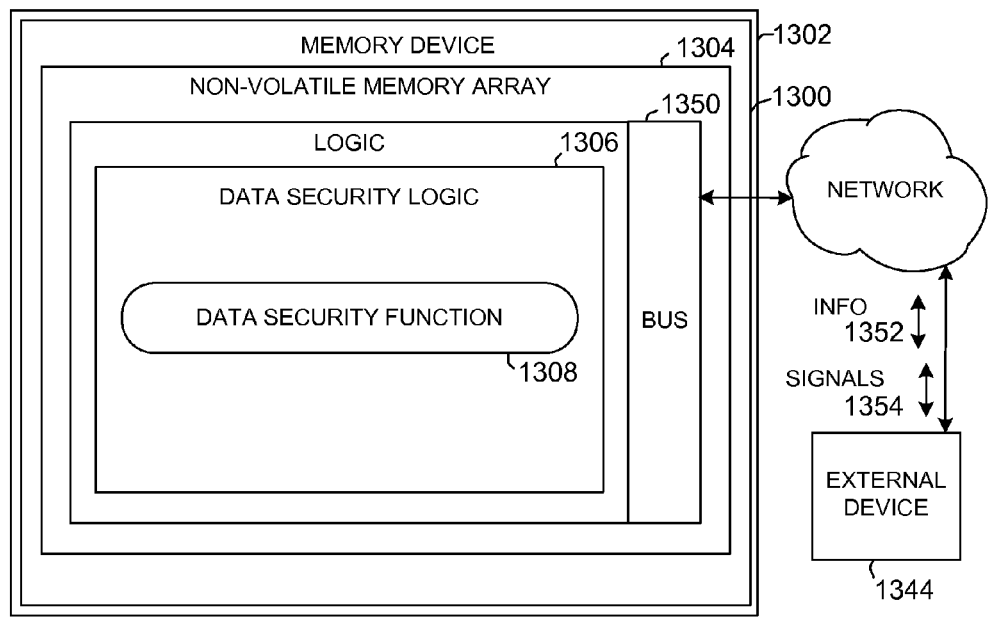
FIGS. 13A and 13B are schematic block diagrams depicting respective top and side view of an embodiment of a memory device supporting data security and access tracking that includes a bus and is functionality integrated into memory.
Figure 13B:
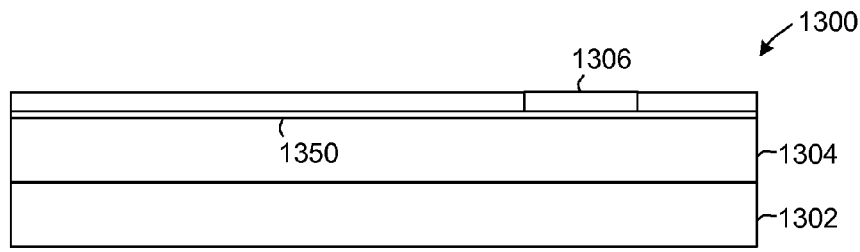

Referring to FIGS. 13A and 13B, schematic block diagrams depict respective top and side view of an embodiment of a memory device supporting data security and access tracking that includes a bus and is functionality integrated into memory. Consequently, the memory device 1300 can further include a bus 1350 integrated with the data security logic 1306 and the non-volatile memory array 1304 on the substrate 1302. The bus 1350 can be operable to communicate access requests and information 1352 between the memory device 1300 and a device external to the memory device 1344. The memory device can facilitate communication and handle additional bandwidth via usage of logic that can predict subsequent transfers and write to memory accordingly to enable processing on the predicted data values. In some embodiments, the memory device can include communication channels in addition to the bus to facilitate transfer of information for various management functions, alleviating the traffic on the bus.

A memory device that includes a communication interface or bus can communicate with other such devices or any type of device or system to enable multiple distributed devices to intercommunicate or to communicate with a network, for example in a cloud system. Thus, the memory device can be widely distributed or even ubiquitous, to perform selected local processing regarding usage and environment, for example to enable history tracking, data pre-processing, and sharing to other devices or through the cloud.

In some embodiments, the memory device 1300 can be formed in a way that the data security logic 1306 operable to perform at least one data security function 1308 associated with the non-volatile memory array 1304 is operable to perform the at least one data security function 1308 independently of signals 1354 external to the memory device 1300.

In particular embodiments, the logic, including data security logic, can perform pattern recognition in an integrated circuit chip and perform analysis in operations that are background to data communication via a bus to a device such as a processor external to the memory device. Background tasks that are local to the memory device can include maximum and minimum sorting, medium, and mode computation. Operations perform by the logic can include statistical measurements, indexing, synchronizing, detection of repetitive tasks, and the like.

Figure 14A:
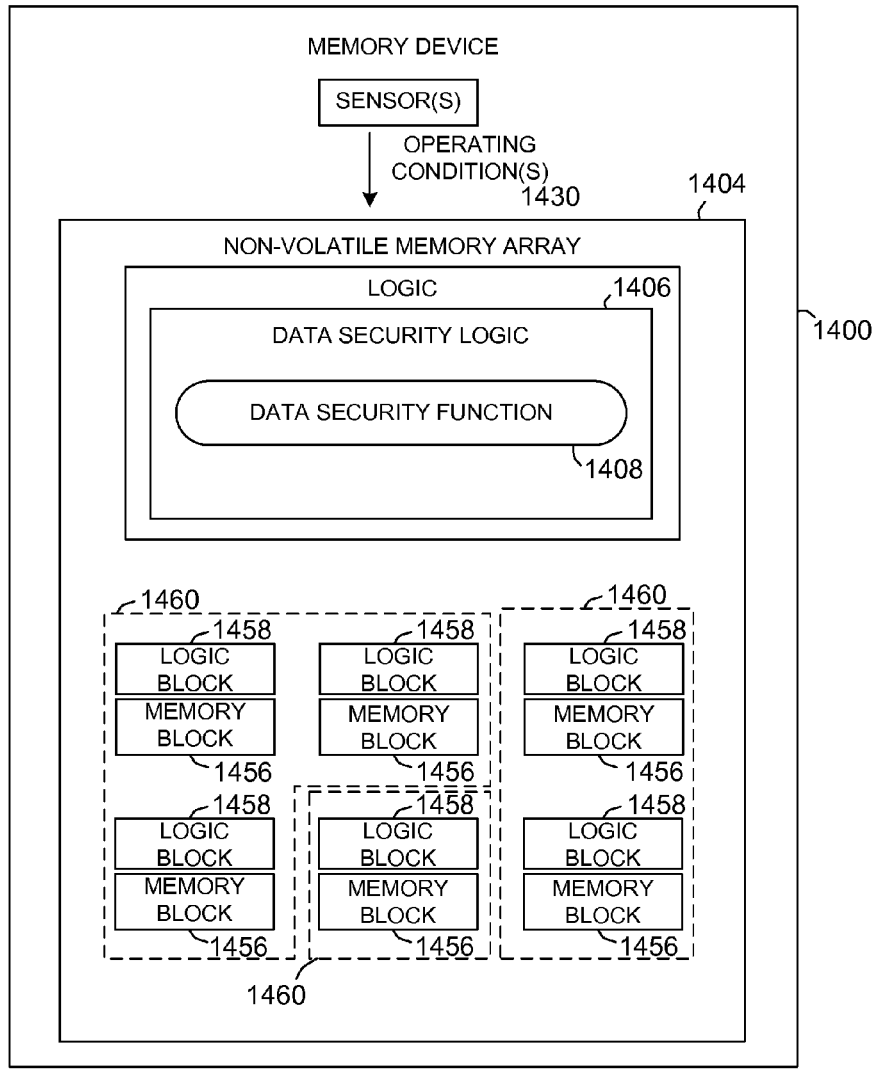
FIGS. 14A and 14B are schematic block diagrams illustrating respective top and side view of an embodiment of a memory device that supports data security and access tracking using encryption logic to secure information and memory in a selected memory portion using functionality integrated into memory.
Figure 14B:
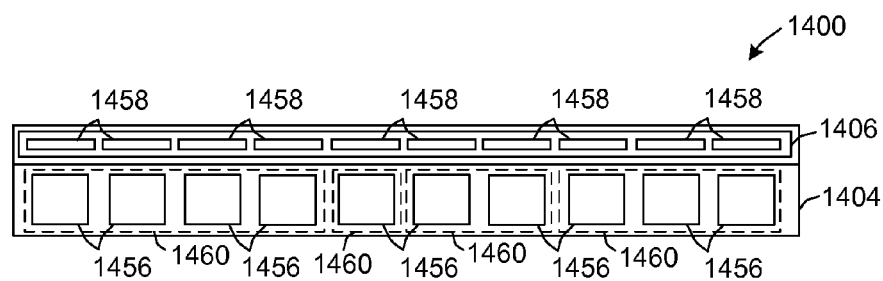

Referring to FIGS. 14A and 14B, schematic block diagrams illustrate respective top and side view of an embodiment of a memory device that supports data security and access tracking using encryption logic to secure information and memory in a selected memory portion using functionality integrated into memory. Thus in some embodiments, the memory device 1400 can be arranged where the non-volatile memory array 1404 is partitioned into a plurality of memory blocks 1456. The data security logic 1406 operable to perform at least one data security function 1408 associated with the non-volatile memory array 1404 can be partitioned into a plurality of logic blocks 1458 spatially distributed over the non-volatile memory array 1404. One or more of the plurality of logic blocks 1458 are associated with one or more of the plurality of memory blocks 1456.

Accordingly, data security logic can be operable to monitor memory accesses, determine statistics on type and number of instructions of the monitored memory accesses, and predict a sequence of instructions and data using the determined statistics. The logic can oversee operations of an overall system, maintaining statistics on the type and number of instructions communicated and processed. In some embodiments, logic can be operable to monitor memory accesses, detect a pattern of instructions and data from the monitored memory accesses, predict expected instructions and data from the detected pattern of instructions and data using, for example, a probability sampling, and preprocessing the predicted expected instructions. In probability sampling, instructions and/or data in the population of instructions and/or data can have a greater than zero probability of being selected in the sample, and the probability can be accurately determined. In some applications, the logic can use the statistics to predict a future sequence of instructions and data. The logic can detect patterns in which a first sequence of data and/or instructions is commonly followed by a second sequence. Upon detection of such a first sequence, the logic can apply the second sequence to the memory without actually receiving the second sequence, for example from a processor via the data bus. Thus, the logic can accelerate data handling and work throughput. The logic can monitor data and/or instructions and anticipate requests for memory. The logic can also detect an indexing pattern of instructions and interactions with memory using specialized logic that is integrated into the non-volatile memory area, enabling preprocessing of expected instructions within the memory. The logic thus can perform statistical operations that analyze instruction sequences to predict the type of instructions to perform using logic that is distributed within the non-volatile memory arrays of the memory device.

In example embodiments, the memory device 1400 can be configured such that the non-volatile memory array 1404 is partitioned into a plurality of memory blocks 1456. The data security logic 1406 operable to perform at least one data security function 1408 associated with the non-volatile memory array 1404 can be partitioned into a plurality of logic blocks 1458 spatially distributed over the non-volatile memory array 1404 and is operable to receive a report on at least one operating condition 1430 of system performance at system bootstrap loading and allocate functionality of one or more of the plurality of logic blocks 1458 with one or more of the plurality of memory blocks 1456 based on the report. An operation at bootstrap loading can cause the system to report on the operating condition of all components (including all chunks of memory) to enable allocation of functionality based on performance of the components.

In some applications and/or embodiments, different memory blocks can be allocated for respective different functionality so that the logic blocks can support functionality that is specific to the appropriate memory blocks.

In a particular application, the memory device can include logic that restores a persistent application state by mapping non-volatile memory pages across system reboot operations, for example by mapping non-volatile RAM pages in different processes including processes that are not necessarily concurrent. The logic can also support access control in portions of the non-volatile RAM in the manner of file system access control.

Some types of memory can be susceptible to failure under specified conditions. For example, two-terminal non-volatile memory devices based on resistance switching effects, called memristors, are susceptible to damage from temperature and bias field conditions. Placing a memristor in an oven or applying a bias field can erase the entire memory. A memory device can include a portion of memory which is susceptible to a particular condition and another, redundant portion which is resistant to the condition, thereby enabling operation in a RAID (redundant array of independent disk) array fashion to ensure retention of data during condition episodes. In case of accidental erasure, the logic can perform functionality analogous to that of a RAID array, for example, to use a slow memory that is impervious to magnetic fields to rebuild the erased data. In a particular embodiment, the slow memory can maintain hash tables are can be heat or magnetic-resistant. A two-way hash can be used to represent data as a hash, thereby reducing memory size.

The memory device can include logic that facilitates accessing of memory based on a determination of the type of operations being performed. For example, the logic can detect high traffic in video streaming and modify data handling to shift from 16-bit byte memory accesses to accessing of blocks of data. For cloud computing applications which are limited by bandwidth, the logic in the locally-controlled memory device can push all physical parameters off an external processor into the memory device, avoiding the bandwidth limitation and enabling additional memory-local capability including potentially different error correction algorithms. The memory device can thus enable a large scale memory with local control, such as a video memory with frame buffers or a dedicated image memory.

In some applications and/or embodiments, a memory device can incorporate reduced data set redundancy in which a data copy can be compressed in a suitable manner. The logic can perform redundant data management relatively slowly, avoiding the heat buildup that can result from a fast data transfer. Thus, redundant backup memory buses can be run at comparatively slow speed, thereby avoiding a significant increase in the heat budget for redundancy processing.

The control store can be configured to enable new operations. For example, the logic can be configured to facilitate efficient memory accesses. In a particular example, the logic can support a particular type of special image store which stores information of a particular size and form efficiently in memory, that writes different memory elements concurrently to a value that is suitable according to characteristics of the incoming image data. Special instructions can be used that can efficiently perform transforms on the image data.

In some applications and/or embodiments, the memory device 1400 can be constituted in a manner that the non-volatile memory array 1404 is partitioned into a plurality of memory blocks 1456 characterized by a plurality of different operating characteristics 1460. The data security logic 1406 operable to perform at least one data security function 1408 associated with the non-volatile memory array 1404 can be partitioned into a plurality of logic blocks 1458 spatially distributed over the non-volatile memory array 1404 wherein one or more of the plurality of logic blocks 1458 are associated with one or more of the plurality of memory blocks 1456 at least partly based on the operating characteristics 1460 of the plurality of memory blocks 1456.

Different types of memory can have different operating characteristics. The memory device can be formed of multiple memory segments that have different operating characteristics, for example in aspects of speed, power consumption, size, as well as susceptibility or resistance to particular operating conditions such as magnetic field characteristics, temperature, and voltage. The logic can operate as a memory controller integrated with the non-volatile memory array to optimize for the particular memory type depending, for example, on application constraints such as the amount of computation, energy consumption load, and many other conditions. For example, logic metadata can supplies intra-memory hints about heat generation.

For example, in some embodiments, the memory device can include both phase change memory (PCRAM) and other memory types and the logic can assign memory usage according to various operating characteristics such as available power. In a specific example, PCRAM and DRAM may be selected based on power considerations. PCRAM access latencies are typically in the range of tens of nanoseconds, but remain several times slower than DRAM. PCRAM writes use energy-intensive current injection, causing thermal stress within a storage cell that degrades current-injection contacts and limits endurance to hundreds of millions of writes per cell. In a memory device that uses both PCRAM and DRAM, the logic can allocate memory usage according to the write density of an application.

A memory device can allocate memory for a particular application or operation based on scalability, for example by determining whether a substantial number of storage cells is to be used. PCRAM can be a highly scalable memory technology since thermal resistivity increases, contact area decreases, and the volume of phase-change material to block current flow decreases with feature size. As feature size becomes smaller, contact area decreases quadratically, and reduced contact area causes resistivity to increase linearly, causing programming current to decrease linearly. Thus PCRAM can attain not only smaller storage elements but also smaller access devices for current injection, leading to lower memory subsystem energy. Thus, the logic can allocate PCRAM segments to applications characterized by large memory use and density.

In some embodiments and/or applications, the memory device can be configured to allocate different portions of memory that have differing characteristics to specific applications. Some characteristics of memory can be better for some applications. For example, the logic can assign data in high-speed operations to high-speed memory while assigning less time-critical applications to slower memory. The logic can assign frequently updated information to memory types that are more durable to writes. In another example application, the memory device can be used in an end-to-end image storage system which includes multiple types of memory including multiple types of non-volatile RAM. For example, the memory device can be used to supply inexpensive memory such as memory stripes that are not part of a device such as a picture telephone, but is used to accumulate data (such as pictures) using some mirror communications that are facilitated by intelligence supplied by the logic. In an example application, the logic can activate to perform data communication when the memory device is in a location sufficiently proximal to the picture telephone to enable data transfer. The logic can be used to detect that the picture telephone and the memory device are sufficiently close to perform a data transfer and, if so, operate in a low operation, low power mode to perform the data communication. Accordingly, the intelligence of the logic can enable data transmission when the memory is in any location that is sufficiently close to the data source.

In some embodiments, the memory device can include some memory that is unacceptable for standard processing but very inexpensive and thus may have some usefulness and cost-effectiveness in some operations. For example, a relatively fast but error-prone memory may be useful for video processing. In various applications, the basis of memory quality may vary, for example, error rate, speed, and the like.

The memory device can thus be used for a wide variety of data communication operations to enable concentration of data originating from many sources. In particular arrangements, a memory device can include multiple types of memory with multiple memory characteristics in terms of cost, price, power, reliability, and the like. A memory device can be optimized to any desired characteristic such as memory quality, memory power, cost in terms of number of electrons, noise, power consumption, and others. For example, power consumption can be optimized by lowering access threshold. The logic can be configured to determine the source of noise, for example if noisy during writing, the logic can determine how little write current can be used, thereby reducing power consumption. The logic can be used to monitor electrical characteristics such as power or charge. Only so many electrons are available in a memory and the logic can be configured to determine how few electrons can be used to perform a particular operation such as read/write operations.

The memory device can include multiple types of memory including the non-volatile memory array in the form of multiple types of non-volatile memory technologies, in addition to portions of memory that may be volatile. The memory device may include multiple types of memory for use in a redundant fashion. Accordingly, the memory device can include two or more memory segments of any non-volatile memory type or technology including read-only memory, flash memory, ferroelectric random access memory (F-RAM), magneto-resistive RAM (M-RAM) or the like. The logic can operate a segment of M-RAM which is comparable in speed and capacity to volatile RAM while enabling conservation of energy, rapid or instantaneous start-up and shutdown sequences. In other applications, the memory device can include memory in the form of charge-coupled devices (CCDs) that are not directly addressable or other pure solid state memory that is reliable and inexpensive for use as separate memory device for various applications such as cell phones, and the like.

In a memory device that includes multiple different types of memory including a spin-transfer M-RAM, the logic can assign functionality at least in part based on the magnetic properties of memory. In a system that includes at least one portion of F-RAM, the logic can exploit operating characteristics of extremely high endurance, very low power consumption (since F-RAM does not require a charge pump like other non-volatile memories), single-cycle write speeds, and gamma radiation tolerance. The memory device can include different segments of different types of memory including volatile and non-volatile memory, flash, dynamic RAM (DRAM) and the like, and use the logic to attain different performance/cost benefits.

The memory device can, in addition to including multiple types of memory, can include multiple different classes of memory of the same memory type to attain a desired operating characteristic. The different classes of memory may include memory of the same technology with different operating parameters or different fabrication process parameters. The different classes of memory may be formed with different polysilicon types, different metal types, different silicides or salicides, various source, gate, and spacer dimensions, different annealing processes, and any other suitable variation in fabrication technique.

In some embodiments and/or applications, the logic can allocate instruction cache and data cache depending on the application and environment. In further arrangements, the logic can also select physical locations of memory depending on application and operating environment.

Thus, the logic can be operable to perform maintenance operations of the memory in response to physical phenomena imposes on the memory. For example, the memory device can incorporate sensors or other components that detect phenomena which can be monitored by the logic to detect magnetic fields, electrical conditions, temperature, and the like to enable the logic to perform actions to maintain, repair, clean, or other operations applied to the memory.

In a particular application, the data security logic can be used to facilitate sampling, for example in seeking knowledge about the cause system of which an observed condition is an outcome. Sampling theory can treat the observed condition as a sample of a larger super-condition or for handling a condition from which a sample is drawn may not be the same as a condition for which information is sought. In the application of failure prediction, the logic can analyze the monitored operating characteristics, detect a precursor to a memory failure based on the analysis, and allocate memory accesses based on the detected precursor. Accordingly, the logic can be used to predict how and when failures will take place using any suitable information for making the prediction. For example, the logic can use temperature measurements to predict failure or use various forms of information to make predictions. In a particular embodiment, the logic can enable writing data at a high rate in some conditions and limit writing speed in other conditions. For example, at high temperatures for a memory that is susceptible to failure, the logic can limit writing speed to a low rate while allowing higher write data rates at lower temperature. In some applications or contexts, the logic can perform performance mapping at selected time intervals, for example updating a map of sections of memory every 10,000 writes. The operating logic can determine how the memory is used and project back to determine characteristics of the operating environment.

One problem inherent to non-volatile memory is failure that results from multiple writes to a memory element. The logic can operate to suitably allocate and distribute writes to non-volatile memory cells to avoid or prevent failure, for example by shifting through memory as particular cells are written or by allocating newer or less-written memory to operations, applications, or contexts characterized by a requirement for higher accuracy.

In an example embodiment, the memory device can include logic can allocate writes according to memory type. For example, the memory device can include a section of PCRAM. Writes can result in substantial wear in PCRAM. When current is injected into a volume of phase-change material, thermal expansion and contraction degrade the electrode storage contact, resulting in programming currents injected into the memory cell that are insufficiently reliable. PCRAM material resistivity is highly dependent on current injection so that current variability leads to resistance variability, degrading the read window of suitable programmed minimum and maximum resistances. Accordingly, the logic and monitor and determine applications characterized by repeated and enduring writes, and allocate such applications to memory segments other than PCRAM segments.

A memory device can be configured with logic that is operable to mitigate wear and energy. For example, PCRAM, which is susceptible to wear and failure for high levels of writing to a PCRAM cell over a memory lifetime, can be managed using mitigation techniques of write reduction and leveling to improve PCRAM endurance. In a particular operation, the logic can allocate some memory to function as a cache and track written cache lines and written cache words to implement partial writes and reduce wear. In another technique, the logic can monitor writes to eliminate redundant bit writes. In a typical memory access, a write updates an entire row of memory cells, many of which are redundant. The logic can remove the redundant bit writes and thereby substantially increase memory lifetimes, for example by preceding a write with a read and compare. Following the read, an XNOR gate can be used to filter redundant bit-writes. A PCRAM read is sufficiently faster than a PCM write and writes are less latency critical, so the performance reduction from reading before a write is in consequential.

In addition to eliminating redundant writes, the logic can also improve write wear performance by row shifting. After removing redundant bit writes, bits most written in a row tend to be localized so that the logic can perform simple shifting to more evenly distribute writes within a row.

The logic can attain additional wear improvement by segment swapping in which memory segments of high and low write accesses are periodically swapped. The logic can track write counts and manage a mapping table between segments.

In another example embodiment, the memory device can include logic operable to allocate memory according to wear such as by limiting the frequency of allocation for a particular memory block and by maintaining frequently changing metadata in DRAM that is separate from managed blocks of non-volatile memory.

Embodiments of the memory device can perform wear-leveling via managed allocation. For example, the logic can avoid allocation of a newly released memory block but rather time-stamp the block and add the block to a first-in-first-out queue. On subsequent allocations or releases, the logic can examine the block at the head of the queue and, if resident on the queue for a sufficient time, can remove the block from the queue and mark eligible for re-allocation. The logic can maintain list pointers in headers and footers of freed blocks and update the list pointers when adjacent free blocks are merged into a larger free region. In another technique, the logic can track the allocated or free state of memory blocks using a DRAM bitmap and manage the bitmap dynamically during operations.

In an example arrangement, the memory device can include memory of two types, such as non-volatile RAM (NVRAM) and DRAM in combination with logic that allocates memory accesses for the NVRAM. The logic prevents frequent reuse of memory locations and stores frequently-changing metadata in DRAM. Data security logic can also add checksums to detect and correct corruption.

In embodiments adapted to promote write durability, the memory device can include a non-volatile memory array with multiple types of memory including at least one portion of memory characterized by elevated write endurance. In a particular embodiment, the non-volatile memory array can include at least on portion formed of M-RAM which is based on a tunneling magneto-resistive (TMR) effect. The individual M-RAM memory cells include a magnetic tunnel junction (MTJ) which can be a metal-insulator-metal structure with ferromagnetic electrodes. A small bias voltage applied between the electrode causes a tunnel current to flow. The MTJ is exposed to an external magnetic field and forms a hysteresis loop with two stable states, corresponding to 0 and 1 data states at zero magnetic field. M-RAM is characterized among non-volatile memory technologies as having excellent write endurance with essentially no significant degradation in magneto-resistance or tunnel junction resistance through millions of write cycles. Accordingly, the logic can monitor and determine whether a particular application or process is characterized by frequent, enduring write operations and assign a portion of M-RAM to handle memory accesses.

Another memory technology characterized by write endurance is ferroelectric RAM (FeRAM). FeRAM can be constructed using material such as lead-zirconate-titanate (PZT), strontium-bismuth-tantalate (SBT), lanthanum substituted bismuth-tantalate (BLT), and others. An externally applied electric field causes polarization of the FeRAM material to be switched and information retained even upon removal of the field. In absence of the electric field, polarization has two distinct stable states to enable usage in memory storage. FeRAM can have write endurance at the level of M-RAM and is further characterized by a reduced cell size and thus higher density. Thus, the logic can monitor and determine whether a particular application or process is characterized by frequent, enduring write operations in combination with a relatively large number of storage cells. The logic can assign a portion of FeRAM to handle memory accesses.

In a particular embodiment, the memory device can include the non-volatile memory array which is inexpensive and can be maintained in close proximity to other types of memory either internal to the memory device or in a nearby integrated circuit chip. The logic can be configured to perform bit-error correction by maintaining multiple copies of data in the high capacity enabled by non-volatile memory arrays, rather than the bit-checks of other error correction techniques. The multiple copies of data in the non-volatile memory can be used to occasionally detect errors using the multiple data copies. Accordingly, the memory device can include a relatively high capacity non-volatile memory array with high capacity and logic operable to perform error correction. The high capacity in non-volatile memory can be used for error detection and correction in which redundant data is held in the non-volatile memory for error correction in the form of multiple data copies to enable recovery by the receiving memory even when a number of errors up to the capability of the code in use are introduced during transmission or on storage. Errors can be corrected without requesting retransmission by the sender.

Figure 15A:
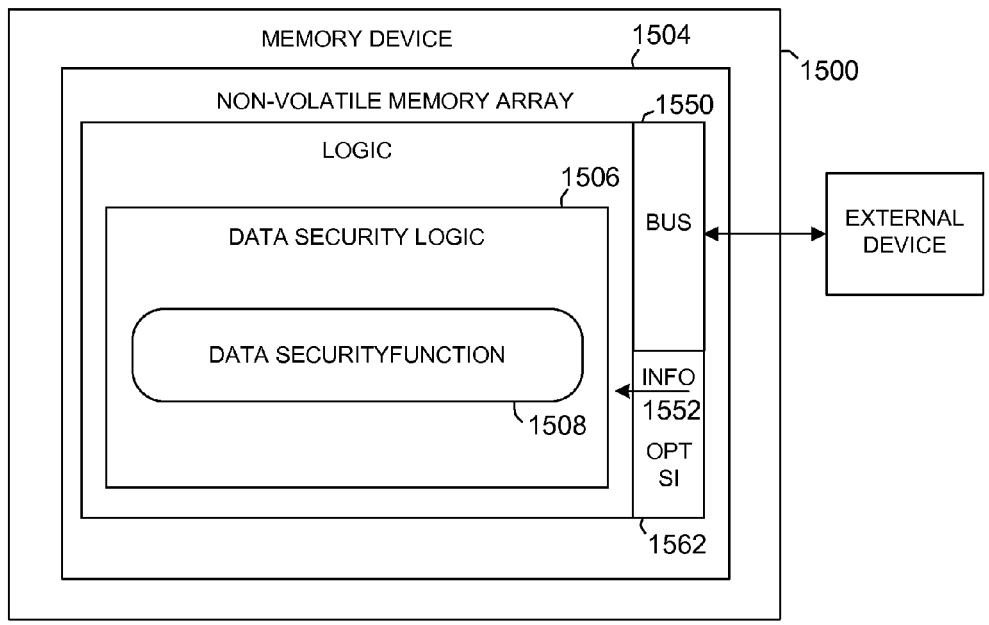
FIGS. 15A and 15B are schematic block diagrams showing respective top and side view of an embodiment of a memory device that supports data security and access tracking and includes optical silicon that enables communication independent of a bus structure and is functionality integrated into memory.
Figure 15B:
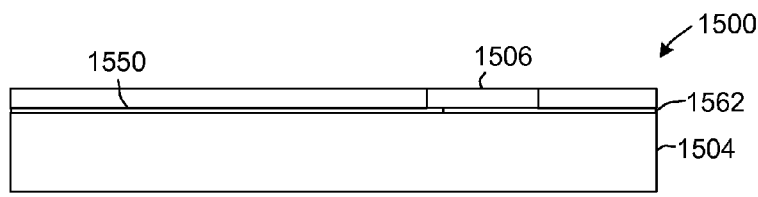

Referring to FIGS. 15A and 15B, schematic block diagrams show respective top and side view of an embodiment of a memory device that supports data security and access tracking and includes optical silicon that enables communication independent of a bus structure and is functionality integrated into memory. Accordingly, the memory device 1500 can further include optical silicon 1562 operable to communicate optically, independently of a bus 1550 coupled to the memory device 1500. The data security logic 1506 operable to perform at least one data security function 1508 associated with the non-volatile memory array 1504 can be operable to receive information 1552 from the optical silicon and read data from a selected portion of the non-volatile memory array 1504 only if authorized by the received information 1552. Usage of optical silicon can enable the memory device to avoid the bandwidth and bottleneck problems of a system bus. The optical silicon can enable data to pass more quickly from outside the memory device to the memory. The memory device can support a WiFi network which optimizes memory for a particular application. Optical silicon can be used to alleviate some of the bandwidth problem for reading high volumes of data, such as for moving photographs from a camera or camera-phone to a storage device such as a computer or library.

For example, an optical sensor or silicon-based optical data connection can use silicon photonics and a hybrid silicon laser for communication between integrated circuit chips at distributed locations using plasmons (quanta of plasma oscillation) to communicate over relatively long distances, for example 2-3 inches on a narrow nano-wire coupler. The plasmon is a quasiparticle that results from quantization of plasma oscillations. Data can be received and converted using an optical antenna, a nano-cavity, or a quantum dot. The communication field can travel independently of a wired bus structure. For example, the memory device can receive information via the optical link, independently of the system bus connected to a processor, and the logic can use the extra-bus information to perform management or housekeeping functions to track applications and/or processes (or, for example, bit correction) via data sent optically to the memory device. The optical link thus enables low-bandwidth, back-channel communication, enabling formation of a memory that can communicate with large bursts of data for placement with optical accessibility.

The memory device can use the optical communication interface to substantially increase bandwidth. For example, dynamic random access memory (DRAM) cannot maintain synchrony over a distance of about four inches so that DRAM must be within four inches or less of a communicating processor, resulting in the memory bus becoming a data choke point, which can be relieved by the optical communication interface. Embodiments of the memory device with an optical interface can use the logic to perform bus control operations using an optical clock and interferometry using interfering optical beams to accelerate data communication.

In some specific embodiments, the optical silicon interface can be operated by the logic to increase data communication speed and reliability by constructing signals in the form of a sine-wave in a piece-wise manner, measuring segments above and below a base line and assigning digital values as 0 or 1 depending on wave position. Accordingly, formation of square wave signals is avoided, which attains benefits to heat dissipation, which is proportional to frequency squared.

Figure 16:
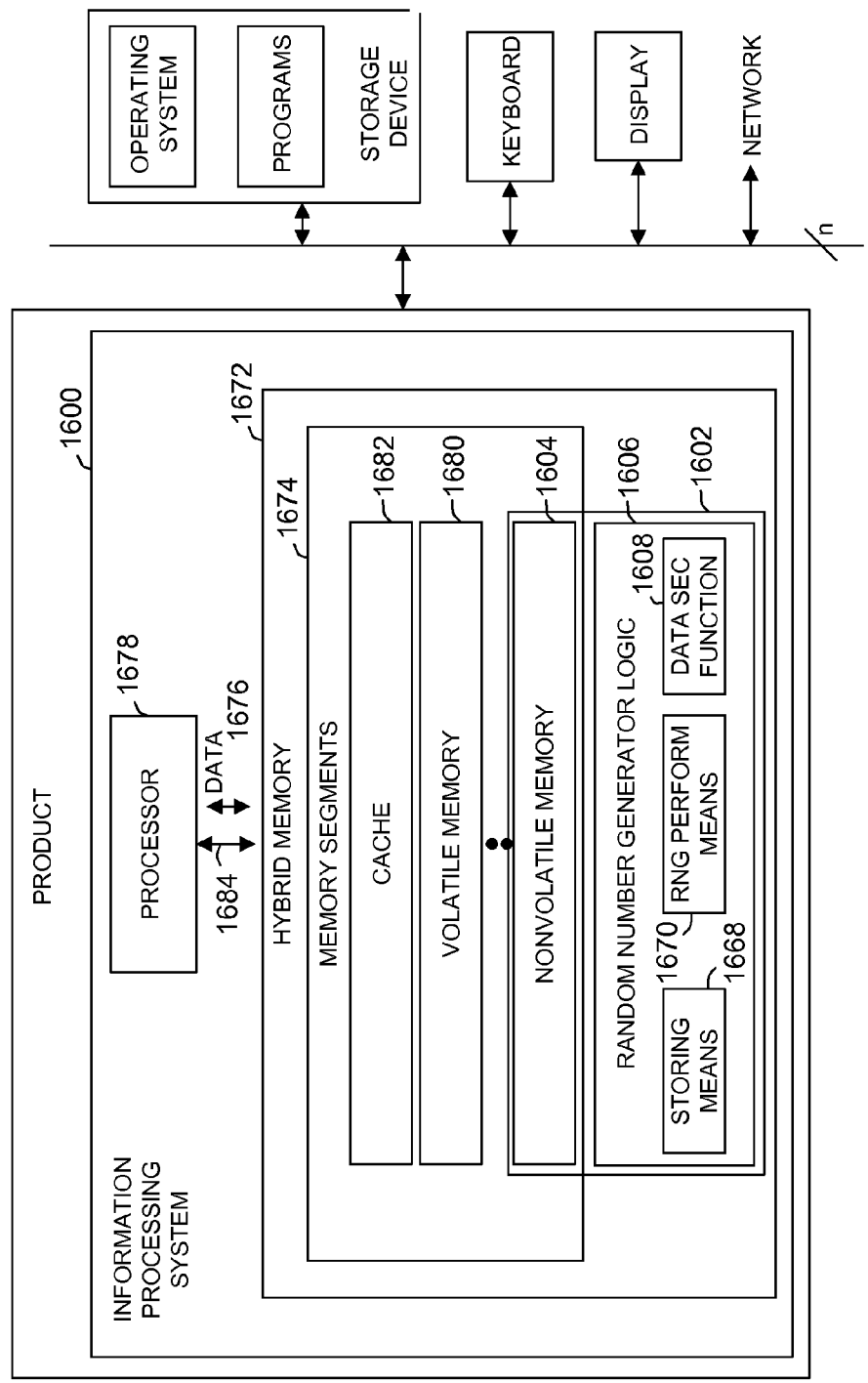
FIG. 16 is a schematic block diagram showing an embodiment of an information processing system including memory that supports data security and access tracking and is functionality integrated into memory.

Referring to FIG. 16, a schematic block diagram shows an embodiment of an information processing system including memory that supports data security and access tracking and is functionality integrated into memory. Accordingly, in some embodiments, an information processing system 1600 can include means 1666 for storing information including data security logic 1606 integrated in combination with non-volatile memory array 1604 integrated on a substrate 1602, and means 1668 for performing at least one data security function 1608 associated with the non-volatile memory array 1604.

In an example embodiment, the information processing system 1600 can include a hybrid memory 1672 that includes multiple memory segments 1674 characterized by a multiple different operating characteristics. The hybrid memory 1672 can store data 1676 communicated from a processor 1678. The information processing system 1600 can further include logic for performing encryption operations on the data 1676 during transfers between the memory segments 1674.

In some embodiments, the information processing system 1600 can be constituted wherein the logic operable to perform encryption operations is operable to perform encryption operations on the data 1676 during transfers between the processor 1678 and the multiple memory segments 1674.

The multiple memory segments 1674 can be arranged to include various types of memory with different characteristics and speeds, for example the multiple memory segments 1674 can comprise volatile main memory 1680, non-volatile main memory 1604, or a combination of memory types.

In particular embodiments, the multiple memory segments 1674 can constitute a volatile main memory 1680 and a non-volatile main memory 1604 wherein the volatile main memory 1680 has faster operating characteristics than the non-volatile main memory 1604. For example, the multiple memory segments 1674 can be formed in memory subsystem combining DRAM and a large amount of nonvolatile memory such as flash or phase change memory (PCM).

In some information processing system 1600 embodiments, the multiple memory segments 1674 can include a cache 1682. In an example embodiment, DRAM can operate as a cache 1682 for the PCM or nonvolatile memory, facilitating channel encryption between the processor 1678 and the information processing system 1600. The logic operable to perform encryption operations can decrypt the information encrypted by the processor 1678 and sent over the channel and store the decrypted information in the DRAM, then can use storage encryption when passing the information from the DRAM to the PCM or nonvolatile memory 1604.

Various embodiments of the information processing system 1600 can be configured for channel encryption. For instance, the logic operable to perform encryption operations can function to encrypt data 1676 on a communication channel 1684 that communicates information between the processor 1678 and the hybrid memory 1672.

The information processing system 1600 can be configured to perform one or more of several channel encryption operations in cooperation with a processor 1678. For instance, the logic operable to perform encryption operations can operable to decrypt information encrypted by the processor 1678. In some embodiments and/or conditions, the logic operable to perform encryption operations is operable to decrypt address and data information encrypted by the processor 1678 and store data at the address in the hybrid memory 1672. Similarly, the information processing system 1600 can be configured wherein the logic operable to perform encryption operations is operable to partially decrypt information encrypted by the processor 1678.

Some embodiments of the information processing system 1600 can include data security logic 1606, for example which can be closely associated to and integrated onto the information processing system 1600 chip. Accordingly, the processor 1678 can implement at least one data security function 1608 in association with the hybrid memory 1672 and coupled to the logic operable to perform encryption operations. The data security logic 1606 can be operable to perform data security functions 1608 using encrypted information.

The information processing system 1600 can be configured to implement one or more of a variety of security schemes including channel encryption, storage encryption, RSA (Rivest, Shamir, Adleman) cryptography and key distribution, Public Key Infrastructure (PKI). Accordingly, the logic operable to perform encryption operations can be operable to perform stream encryption of communicated information wherein processor and memory sides are assigned a key. In another example functionality, the logic operable to perform encryption operations can be operable to encrypt information that is storage encrypted wherein the storage-encrypted information is encrypted by the processor 1678, stored in the hybrid memory 1672, accessed from the hybrid memory 1672, and decrypted by the processor 1678.

In some embodiments and/or applications, the information processing system 1600 can be configured to use of cryptographic processing to facilitate information handling. For example, data can be copied for redundant storage and the redundant copy can be secured by encryption and stored in the non-volatile memory in encrypted form. The encrypted redundant copy of the data can be used for restoration in the event of a detected error. In another example, A cryptographic hash function generates information indicative of data integrity, whether changes in data are accidental or maliciously and intentional. Modification to the data can be detected through a mismatching hash value. For a particular hash value, finding of input data that yields the same hash value is not easily possible, if an attacker can change not only the message but also the hash value, then a keyed hash or message authentication code (MAC) can supply additional security. Without knowing the key, for the attacker to calculate the correct keyed hash value for a modified message is not feasible.

In a particular applications and/or arrangements, the security perimeter can be formed within the information processing system 1600 and, for example, enclose the entire information processing system 1600, between dynamic random access memory (DRAM) and the information processing system 1600, between non-volatile random access memory (RAM) and the information processing system 1600, or any other suitable position. The cryptographic and/or tamper-handling perimeter can further be generalized for positioning between a smaller amount of memory and a larger amount of memory in the information processing system 1600. Some embodiments can include a cryptographic perimeter in the absence of a tamper-handling perimeter.

In some embodiments, the logic operable to perform encryption operations can be operable to perform time-varying encryption. For example, channel encryption assisted by the information processing system 1600 can enable randomization of encrypted information wherein encrypted data is read back and encryption can be stripped off by the receiving processor 1678. The information processing system 1600 with logic or other smart component can enable time-varying encryption. Data can be written to an address which, when read back, is different, but no information is lost since the reading processor 1678 or other reading device at the opposite side of the channel from the smart memory has sufficient intelligence capability to strip off the encryption.

In an example embodiment, the information processing system can include logic can allocate writes according to memory type. For example, the information processing system can include a section of PCRAM. Writes can result in substantial wear in PCRAM. When current is injected into a volume of phase-change material, thermal expansion and contraction degrade the electrode storage contact, resulting in programming currents injected into the memory cell that are insufficiently reliable. PCRAM material resistivity is highly dependent on current injection so that current variability leads to resistance variability, degrading the read window of suitable programmed minimum and maximum resistances. Accordingly, the logic and monitor and determine applications characterized by repeated and enduring writes, and allocate such applications to memory segments other than PCRAM segments.

A information processing system can be configured with logic that is operable to mitigate wear and energy. For example, PCRAM, which is susceptible to wear and failure for high levels of writing to a PCRAM cell over a memory lifetime, can be managed using mitigation techniques of write reduction and leveling to improve PCRAM endurance. In a particular operation, the logic can allocate some memory to function as a cache and track written cache lines and written cache words to implement partial writes and reduce wear. In another technique, the logic can monitor writes to eliminate redundant bit writes. In a typical memory access, a write updates an entire row of memory cells, many of which are redundant. The logic can remove the redundant bit writes and thereby substantially increase memory lifetimes, for example by preceding a write with a read and compare. Following the read, an XNOR gate can be used to filter redundant bit-writes. A PCRAM read is sufficiently faster than a PCM write and writes are less latency critical, so the performance reduction from reading before a write is in consequential.

In some embodiments and/or applications, the logic can allocate instruction cache and data cache depending on the application and environment. In further arrangements, the logic can also select physical locations of memory depending on application and operating environment.

In addition to eliminating redundant writes, the logic can also improve write wear performance by row shifting. After removing redundant bit writes, bits most written in a row tend to be localized so that the logic can perform simple shifting to more evenly distribute writes within a row.

The logic can attain additional wear improvement by segment swapping in which memory segments of high and low write accesses are periodically swapped. The logic can track write counts and manage a mapping table between segments.

In another example embodiment, the information processing system can include logic operable to allocate memory according to wear such as by limiting the frequency of allocation for a particular memory block and by maintaining frequently changing metadata in DRAM that is separate from managed blocks of non-volatile memory.

Embodiments of the information processing system can perform wear-leveling via managed allocation. For example, the logic can avoid allocation of a newly released memory block but rather time-stamp the block and add the block to a first-in-first-out queue. On subsequent allocations or releases, the logic can examine the block at the head of the queue and, if resident on the queue for a sufficient time, can remove the block from the queue and mark eligible for re-allocation. The logic can maintain list pointers in headers and footers of freed blocks and update the list pointers when adjacent free blocks are merged into a larger free region. In another technique, the logic can track the allocated or free state of memory blocks using a DRAM bitmap and manage the bitmap dynamically during operations.

Figure 17A:
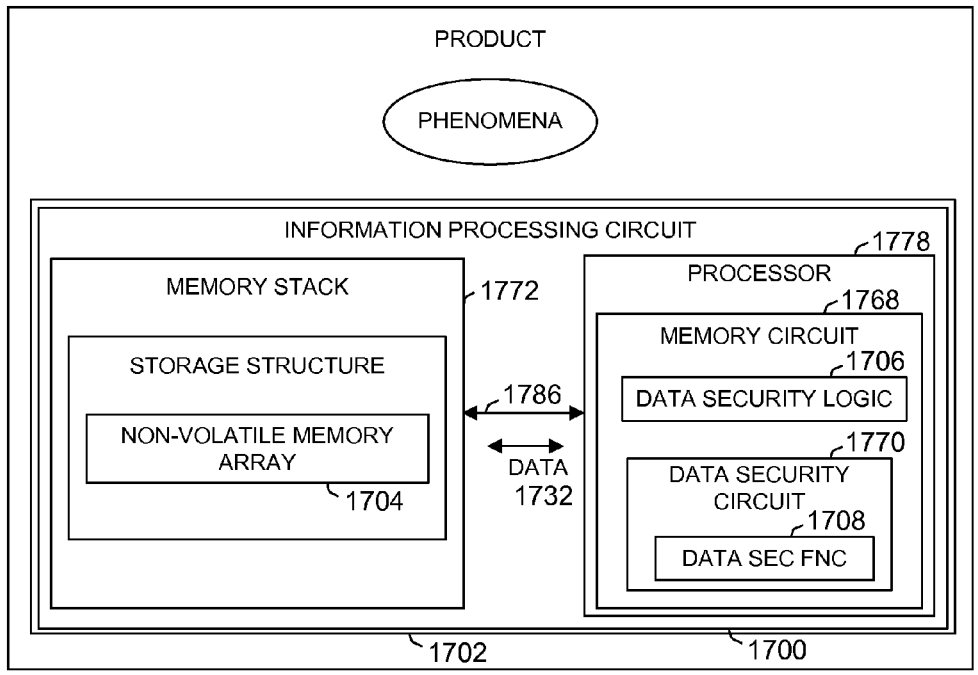
FIGS. 17A and 17B are a schematic block diagram and a side pictorial view illustrating an embodiment of an information processing circuit including memory that supports data security and access tracking and is functionality integrated into memory.
Figure 17B:
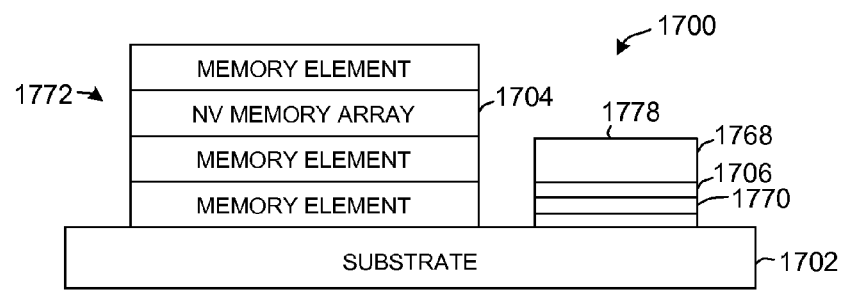

Referring to FIGS. 17A and 17B, a schematic block diagram and a side pictorial view illustrate an embodiment of an information processing circuit including memory that supports data security and access tracking and is functionality integrated into memory. An embodiment of an information processing circuit 1700 can include a memory circuit 1768 including data security logic 1706 integrated with non-volatile memory array 1704 on a substrate 1702, and circuitry 1770 for performing at least one data security function 1708 associated with the non-volatile memory array 1704.

Embodiments of an information processing circuit 1700 can make use of a memory stack 1772 to facilitate intelligent memory computation. In a particular example embodiment, intelligent memory computation can include security capabilities, including cryptographic security. The information processing circuit 1700 can be constituted to facilitate channel encryption through operation of the logic operable to perform encryption operations. Accordingly, the logic operable to perform encryption operations can be operable to perform channel encryption operations on a communication channel 1786 that communicates information between the processor 1778 and the memory stack 1772. Channel encryption can improve performance and economy in various applications and conditions in comparison to expensive storage encryption. The logic operable to perform encryption operations can facilitate good memory encryption, for example between the processor 1778 and the memory stack 1772. An illustrative configuration can include a CPU that interacts with the memory stack 1772 comprising multiple DRAM chips and the logic operable to perform encryption operations integrated into a logic chip operable to perform strong channel encryption between the CPU and the memory stack 1772.

In various embodiments, the information processing circuit 1700, the memory stack 1772, and the logic operable to perform encryption operations can be constituted to perform one or more of several security operations. For example, the logic operable to perform encryption operations is operable to decrypt information encrypted by the processor 1778. Similarly, the logic operable to perform encryption operations is operable to partially decrypt information encrypted by the processor 1778. The logic can also be operable to perform encryption operations is operable to perform stream encryption of information communicated on a communication channel 1786 wherein processor and memory sides of the communication channel 1786 are assigned a key. In an embodiment or circumstances where security can be best attained by using a combination of storage encryption and channel encryption, the logic operable to perform encryption operations is operable to perform channel encryption operations on a communication channel 1786 for information that is storage encrypted wherein the storage-encrypted information is encrypted by the processor 1778, stored in the memory stack 1772, accessed from the memory stack 1772, and decrypted by the processor 1778. The logic operable to perform encryption operations can also be operable to perform time-varying encryption.

Information can be stored in the memory stack 1772 unencrypted or the logic can encrypt the data for storage. Thus, channel encryption can be performed between the CPU and a logic chip, enabling cryptographic security without requiring storage encryption of data stored in the logic chip.

In various embodiments, a memory device with integrated logic and memory can be integrated into a product. For example, the memory device can be integrated to a product in the form of a security device for securing an item such as a home, an automobile, or any other item of value. The memory device can monitor conditions of the product autonomously of devices external to the product, while supporting updates to the memory device.

In other embodiments, the memory device can be integrated into other products, for example electronic devices, such as mobile and cell phones, notebook computers, personal digital assistants, medical devices, medical diagnostic systems, digital cameras, audio players, digital televisions, automotive and transportation engine control units, USB flash personal discs, and global positioning systems.

In other applications and/or contexts, a memory system can be formed of printed non-volatile memory on polymer. In some arrangements, a printed non-volatile memory on polymer can form flexible memories. For example, a flexible memory can be integrated with processors for further integration into any type of product, even very simple products such as bottles, cans, or packaging materials. A non-volatile memory can be integrated in a system of any suitable product such as, for example, a door handle sleeve to detect and record who, what, when, and how anyone has touched the door handle. Such a system can be used to facilitate access or to provide security. In other examples, a non-volatile memory and processor in some applications with sensors and/or a communication interface can be used in a flexible device for a medical product such as bandages or implants. These products can be formed of dissolvable materials for temporary usage, for example in biocompatible electronic or medical devices that can dissolve in a body environment, or environmental monitors and consumer electronics that can dissolve in compost. Other applications of products incorporating non-volatile memory and processor can include sporting equipment, tags such as for rental cars, patient armbands in hospitals tied to sensors, smart glasses, or any type of device.

In further embodiments, instead of a flexible polymer, the non-volatile memory and processor can be formed of silicon that is sufficiently thin to become flexible and thus formed as an inexpensive printed circuit component. Flexible memory in ubiquitous items, using polymer memory or silicon memory, can enable various profitable services, for example in conjunction with medical devices, security services, automotive products, and the like.

In embodiments of the memory device with processing capability of logic integrated in a distributed manner with non-volatile memory, the processing capability can be implemented with relatively low speed requirement to enable processors to be available in a ubiquitous manner. Accordingly, information can be acquired in a dispersed manner and intercommunicated over vast systems. Thus processors can be inexpensive and memory readily available for various consumer items. Custom versions of memory including non-volatile memory and RAM can be integrated into virtually any product, enabling widespread preprocessing in items such as door handles to determine who has accessed a location and how the access was made to allow any type of processing on the information.

Referring to FIGS. 18A through 18W and 19A through 19Q, multiple schematic flow charts show several embodiments and/or aspects of a method of manufacturing a memory device including data security logic integrated in combination with non-volatile memory array on a substrate that supports data security and access tracking using functionality integrated into memory. The illustrative method 1800, depicted in FIG. 18A, of manufacturing a memory device can include forming 1801 a non-volatile memory array on a substrate, and integrating 1802 data security logic in combination with the non-volatile memory array on the substrate. The data security logic is operable to perform 1803 at least one data security function associated with the non-volatile memory array.

Referring to FIG. 18B, in some embodiments, the method 1804 of manufacturing the memory device can further include integrating 1805 read-once logic into the data security logic in combination with the non-volatile memory array on the substrate. The read-once logic is operable to enforce 1806 a read-once restriction on a selected portion of the non-volatile memory array.

In further embodiments and/or applications, as shown in FIG. 18C, the method 1807 of manufacturing the memory device can further include integrating 1808 read-once logic into the data security logic in combination with the non-volatile memory array on the substrate. The read-once logic is operable to read 1809 data from a selected portion of the non-volatile memory array for usage and destroy 1810 the data in the selected portion of the non-volatile memory array.

Figures 18D, 18E, 18F:
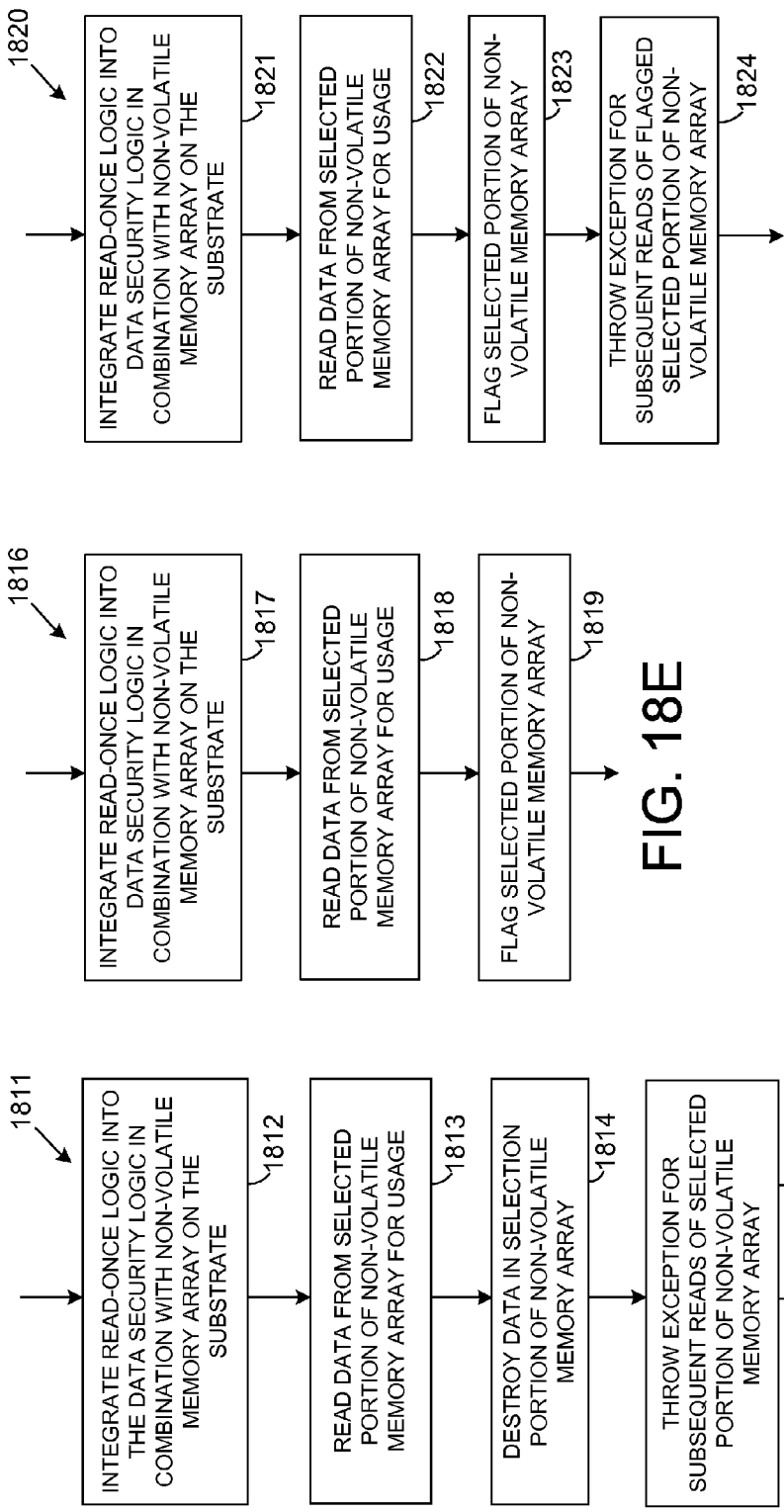
FIGS. 18A through 18W and 19A through 19Q are multiple schematic flow charts showing several embodiments and/or aspects of a method of manufacturing a memory device including data security logic integrated in combination with non-volatile memory array on a substrate that supports data security and access tracking using functionality integrated into memory.

In various embodiments, as depicted in FIG. 18D, the method 1811 of manufacturing the memory device can further include integrating 1812 read-once logic into the data security logic in combination with the non-volatile memory array on the substrate. The read-once logic is operable to read 1813 data from a selected portion of the non-volatile memory array for usage, destroy 1814 the data in the selected portion of the non-volatile memory array, and throw 1815 an exception for subsequent reads of the selected portion of the non-volatile memory array.

Referring to FIG. 18E, in some embodiments, the method 1816 of manufacturing the memory device can further include integrating 1817 read-once logic into the data security logic in combination with the non-volatile memory array on the substrate. The read-once logic is operable to read 1818 data from a selected portion of the non-volatile memory array for usage and flag 1819 the selected portion of the non-volatile memory array.

As shown in FIG. 18F, in various embodiments and/or applications, the method 1820 of manufacturing the memory device can further include integrating 1821 read-once logic into the data security logic in combination with the non-volatile memory array on the substrate. The read-once logic is operable to read 1822 data from a selected portion of the non-volatile memory array for usage, flag 1823 the selected portion of the non-volatile memory array, and throw 1824 an exception for subsequent reads of the flagged selected portion of the non-volatile memory array.

In some embodiments, illustrated in FIG. 18G, the method 1825 of manufacturing the memory device can further include integrating 1826 read-once logic into the data security logic in combination with the non-volatile memory array on the substrate. The read-once logic is operable to receive 1827 a request to read a selected portion of the non-volatile memory array and respond 1828 to the request to read a selected portion of the non-volatile memory array. Responding 1828 to the request can include determining 1829 whether data in the selected portion of the non-volatile memory array was previously read, determining 1830 whether the previously read data in the selected portion of the non-volatile memory array was deleted, and reading 1831 data from the selected portion of the non-volatile memory array only if the previously read data was deleted.

In various embodiments and/or applications, as shown in FIG. 18H, the method 1832 of manufacturing the memory device can further include integrating 1833 counting logic into the data security logic in combination with the non-volatile memory array on the substrate. The counting logic is operable to count 1834 a number of times data is read from a selected portion of the non-volatile memory array.

Referring to FIG. 18I, selected embodiments of the method 1835 of manufacturing the memory device can further include integrating 1836 counting logic into the data security logic in combination with the non-volatile memory array on the substrate. The counting logic is operable to count 1837 a number of times data is read from a selected portion of the non-volatile memory array and throw 1838 an exception for a count greater than one of the number of times data is read from the selected portion of the non-volatile memory array.

As illustrated in FIG. 18J, some embodiments of the method 1839 of manufacturing the memory device can further include integrating 1840 counting logic into the data security logic in combination with the non-volatile memory array on the substrate. The counting logic is operable to count 1841 the number of times data is read from a selected portion of the non-volatile memory array and the number of times the data is written to the selected portion of the non-volatile memory array.

As shown in FIG. 18K, an embodiment of the method 1842 of manufacturing the memory device can further include integrating 1843 counting logic into the data security logic in combination with the non-volatile memory array on the substrate. The counting logic is operable to count 1844 the number of times data is read from a selected portion of the non-volatile memory array and the number of times the data is written to the selected portion of the non-volatile memory array, and control 1845 access to the selected portion of the non-volatile memory array based on the counts.

Referring to FIG. 18L, in some embodiments, the method 1846 of manufacturing the memory device can further include integrating 1847 counting logic into the data security logic in combination with the non-volatile memory array on the substrate. The counting logic is operable to count 1848 the number of times data is read from a selected portion of the non-volatile memory array and the number of times the data is written to the selected portion of the non-volatile memory array, and throw 1849 an exception based on the counts.

In further embodiments and/or applications, as shown in FIG. 18M, the method 1850 of manufacturing the memory device can be configured to include integrating 1851 process identification logic into the data security logic in combination with the non-volatile memory array on the substrate. The process identification logic is operable to identify 1852 a process, determine 1853 whether the process is enabled to read data from a selected portion of the non-volatile memory array, and allow 1854 the enabled process to read the data from the selected portion of the non-volatile memory array.

In various embodiments, as depicted in FIG. 18N, the method 1855 of manufacturing the memory device can further include integrating 1856 process identification logic into the data security logic in combination with the non-volatile memory array on the substrate. The process identification logic is operable to identify 1857 a process, determine 1858 whether the process is enabled to read data from a selected portion of the non-volatile memory array, and throw 1859 an exception if the process is not enabled to read the data from the selected portion of the non-volatile memory array.

Referring to FIG. 18O, in some embodiments, the method 1860 of manufacturing the memory device can further include integrating 1861 process identification logic into the data security logic in combination with the non-volatile memory array on the substrate. The process identification logic is operable to identify 1862 a process, determine 1863 whether the process is identified as enabled to read data from a selected portion of the non-volatile memory array, and throw 1864 an exception if the process is not identified as enabled to read the data from the selected portion of the non-volatile memory array.

As shown in FIG. 18P, in various embodiments and/or applications, the method 1865 of manufacturing the memory device can further include integrating 1866 process identification logic into the data security logic in combination with the non-volatile memory array on the substrate. The process identification logic is operable to identify 1867 a plurality of processes, determine 1868 whether the plurality of processes is enabled to communicate using a selected portion of the non-volatile memory array, and access 1869 the selected portion of the non-volatile memory array if enabled to communicate.

In various embodiments, as depicted in FIG. 18Q, the method 1870 of manufacturing the memory device can further include integrating 1871 process identification logic into the data security logic in combination with the non-volatile memory array on the substrate. The process identification logic is operable to identify 1872 a plurality of processes, determine 1873 whether the plurality of processes is enabled to communicate using a selected portion of the non-volatile memory array, and disallow 1874 access to the selected portion of the non-volatile memory array if not enabled to communicate.

Referring to FIG. 18R, in some embodiments, the method 1875 of manufacturing the memory device can further include integrating 1876 process identification logic into the data security logic in combination with the non-volatile memory array on the substrate. The process identification logic is operable to identify 1877 a plurality of processes, determine 1878 whether the plurality of processes is enabled to communicate using a selected portion of the non-volatile memory array, and throw 1879 an exception if not enabled to communicate.

As shown in FIG. 18S, in various embodiments and/or applications, the method 1880 of manufacturing the memory device can further include integrating 1881 counting logic and process identification logic into the data security logic in combination with the non-volatile memory array on the substrate. The counting logic and process identification logic are operable in combination to manage 1882 access to a selected portion of the non-volatile memory array.

In some embodiments, illustrated in FIG. 18T, the method 1883 of manufacturing the memory device can further include integrating 1884 counting logic and process identification logic into the data security logic in combination with the non-volatile memory array on the substrate. The counting logic and process identification logic are operable in combination to identify 1885 a number of accesses of a selected portion of the non-volatile memory array and identify 1886 processes that access the selected portion of the non-volatile memory array.

In various embodiments and/or applications, as shown in FIG. 18U, the method 1887 of manufacturing the memory device can further include integrating 1888 counting logic and process identification logic into the data security logic in combination with the non-volatile memory array on the substrate. The counting logic and process identification logic are operable in combination to identify 1889 the number of accesses of a selected portion of the non-volatile memory array, identify 1890 processes that access the selected portion of the non-volatile memory array, and identify 1891 times of accesses of the selected portion of the non-volatile memory array.

Referring to FIG. 18V, selected embodiments of the method 1892 of manufacturing the memory device can further include integrating 1893 a protection key register and protection key logic into the data security logic in combination with the non-volatile memory array on the substrate. The protection key register and protection key logic are operable to manage 1894 access to a selected portion of the non-volatile memory array based on information in the protection key register.

In various embodiments, as depicted in FIG. 18W, the method 1895 of manufacturing the memory device can further include integrating 1896 a protection key register and protection key logic into the data security logic in combination with the non-volatile memory array on the substrate. The protection key register and protection key logic are operable to receive 1897 information and write 1898 the received information to the protection key register.

The illustrative method 1900, depicted in FIG. 19A, of manufacturing a memory device can include integrating 1901 a protection key register and protection key logic into the data security logic in combination with the non-volatile memory array on the substrate. The protection key register and protection key logic are operable to read 1902 data from a selected portion of the non-volatile memory array only if authorized by information in the protection key register.

Referring to FIG. 19B, in some embodiments, the method 1903 of manufacturing the memory device can further include integrating 1904 a protection key register and protection key logic into the data security logic in combination with the non-volatile memory array on the substrate. The protection key register and protection key logic are operable to write 1905 data to a selected portion of the non-volatile memory array only if authorized by information in the protection key register.

In further embodiments and/or applications, as shown in FIG. 19C, the method 1906 of manufacturing the memory device can further include forming 1907 a plurality of non-volatile memory segments characterized by a respective plurality of non-volatile memory types in the non-volatile memory array, and integrating 1908 the data security logic in combination with the non-volatile memory array on the substrate. The data security logic is operable to perform 1909 at least one data security function for the non-volatile memory segments selectively based on ones of the plurality of non-volatile memory types.

Figure 19F:
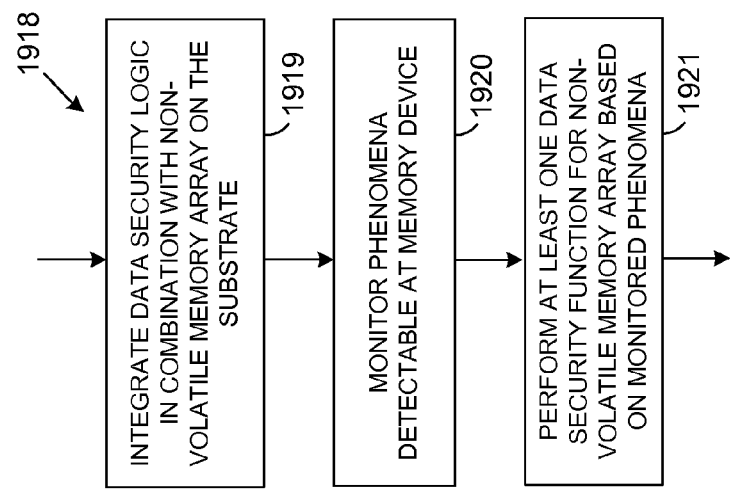
Figure 19E:
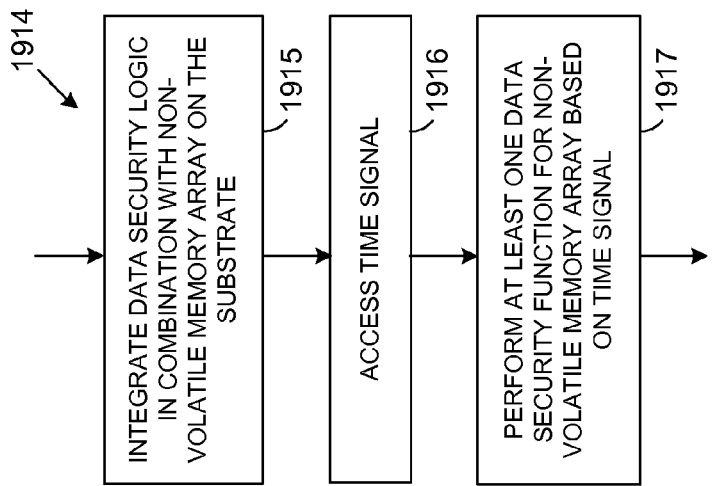
Figure 19D:
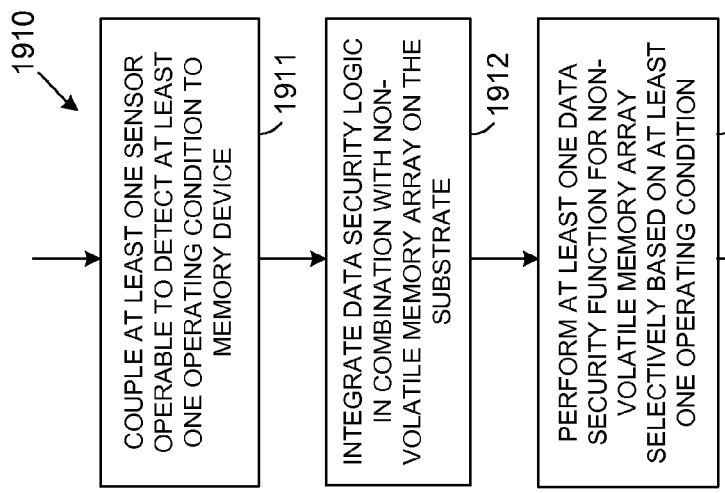

In various embodiments, as depicted in FIG. 19D, the method 1910 of manufacturing the memory device can further include coupling 1911 at least one sensor operable to detect at least one operating condition to the memory device, and integrating 1912 the data security logic in combination with the non-volatile memory array on the substrate. The data security logic is operable to perform 1913 at least one data security function for the non-volatile memory array selectively based on the at least one operating condition.

Referring to FIG. 19E, in some embodiments, the method 1914 of manufacturing the memory device can further include integrating 1915 data security logic in combination with the non-volatile memory array on the substrate. The data security logic is operable to access 1916 a time signal and perform 1917 at least one data security function for the non-volatile memory array based on the time signal.

As shown in FIG. 19F, in various embodiments and/or applications, the method 1918 of manufacturing the memory device can further include integrating 1919 data security logic in combination with the non-volatile memory array on the substrate. The data security logic is operable to monitor 1920 phenomena detectable at the memory device and perform 1921 at least one data security function for the non-volatile memory array based on the monitored phenomena.

In some embodiments, illustrated in FIG. 19G, the method 1922 of manufacturing the memory device can further include integrating 1923 data security logic in combination with the non-volatile memory array on the substrate. The that is operable to accumulate and communicate 1924 information about phenomena associated with at least one entity in association with the memory device and perform 1925 at least one data security function for the non-volatile memory array based on the monitored phenomena.

In various embodiments and/or applications, as shown in FIG. 19H, the method 1926 of manufacturing the memory device can further include integrating 1927 encryption logic into the data security logic in combination with the non-volatile memory array on the substrate. The encryption logic is operable to perform 1928 at least one encryption/decryption function associated with the non-volatile memory array and read 1929 data from a selected portion of the non-volatile memory array only if authorized by results of the encryption/decryption function.

Referring to FIG. 19I, selected embodiments of the method 1930 of manufacturing the memory device can further include integrating 1931 encryption logic into the data security logic in combination with the non-volatile memory array on the substrate. The data security logic is operable to perform 1932 at least one encryption/decryption function associated with the non-volatile memory array that holds 1933 at least one encryption key secure from a device external to the memory device. The data security logic is further operable to read 1934 data from a selected portion of the non-volatile memory array only if enabled by the encryption key.

As illustrated in FIG. 19J, some embodiments of the method 1935 of manufacturing the memory device can further include integrating 1936 hash logic into the data security logic in combination with the non-volatile memory array on the substrate. The hash logic is operable to perform 1937 a hash function associated with the non-volatile memory array and read 1938 data from a selected portion of the non-volatile memory array only if authorized by results of the hash function.

As shown in FIG. 19K, an embodiment of the method 1939 of manufacturing the memory device can further include integrating 1940 a bus and the data security logic in combination with the non-volatile memory array on the substrate. The bus is operable to communicate 1941 access requests and information between the memory device and a device external to the memory device.

Referring to FIG. 19L, in some embodiments, the method 1942 of manufacturing the memory device can further include integrating 1943 data security logic in combination with the non-volatile memory array on the substrate. The data security logic is operable to perform 1944 the at least one data security function independently of signals external to the memory device.

In further embodiments and/or applications, as shown in FIG. 19M, the method 1945 of manufacturing the memory device can be configured to include configuring 1946 the data security logic operable to perform 1947 at least one data security function associated with the non-volatile memory array with functionality selectively distributed across the non-volatile memory array.

In various embodiments, as depicted in FIG. 19N, the method 1948 of manufacturing the memory device can further include partitioning 1949 the non-volatile memory array into a plurality of memory blocks, and partitioning 1950 the data security logic operable to perform at least one data security function associated with the non-volatile memory array into a plurality of logic blocks spatially distributed over the non-volatile memory array. One or more of the plurality of logic blocks are associated 1951 with ones of the plurality of memory blocks.

Referring to FIG. 19O, in some embodiments, the method 1952 of manufacturing the memory device can further include partitioning 1953 the non-volatile memory array into a plurality of memory blocks, partitioning 1954 the data security logic operable to perform at least one data security function associated with the non-volatile memory array into a plurality of logic blocks spatially distributed over the non-volatile memory array, and integrating 1955 data security logic in combination with the non-volatile memory array on the substrate. The data security logic is operable to receive 1956 a report on at least one operating condition of system performance at system bootstrap loading and allocate 1957 functionality of one or more of the plurality of logic blocks with one or more of the plurality of memory blocks based on the report.

As shown in FIG. 19P, in various embodiments and/or applications, the method 1958 of manufacturing the memory device can further include partitioning 1959 the non-volatile memory array into a plurality of memory blocks characterized by a plurality of different operating characteristics, and partitioning 1960 the data security logic operable to perform at least one data security function associated with the non-volatile memory array into a plurality of logic blocks spatially distributed over the non-volatile memory array. One or more of the plurality of logic blocks are associated 1961 with one or more of the plurality of memory blocks at least partly based on the operating characteristics of the plurality of memory blocks.

In various embodiments, as depicted in FIG. 19Q, the method 1962 of manufacturing the memory device can further include integrating 1963 optical silicon in combination with the data security logic and the non-volatile memory array on the substrate. The optical silicon and data security logic are operable to communicate 1964 optically, independently of a bus coupled to the memory device. The method 1962 can further include integrating 1965 data security logic in combination with the non-volatile memory array on the substrate. The data security logic is operable to receive 1966 information from the optical silicon and read 1967 data from a selected portion of the non-volatile memory array only if authorized by the received information.

Referring to FIGS. 20A through 20U and 21A through 21N, multiple schematic flow charts depict several embodiments and/or aspects of a method of operating a memory device including data security logic integrated in combination with non-volatile memory array on a substrate that supports data security and access tracking using functionality integrated into memory. The illustrative method 2000, depicted in FIG. 20A, of operating a memory device can include providing 2001 the memory device including data security logic integrated in combination with non-volatile memory array on a substrate, and operating 2002 the data security logic. Operating 2002 the data security logic can include performing 2003 at least one data security function associated with the non-volatile memory array.

Referring to FIG. 20B, in some embodiments, the method 2004 of operating the memory device can further include providing 2005 the memory device including read-once logic integrated into the data security logic in combination with non-volatile memory array on the substrate, and operating 2006 the read-once logic. Operating 2006 the read-once logic can include enforcing 2007 a read-once restriction on a selected portion of the non-volatile memory array.

In further embodiments and/or applications, as shown in FIG. 20C, the method 2008 of operating the memory device can further include providing 2005 the memory device including read-once logic integrated into the data security logic in combination with non-volatile memory array on the substrate, and operating 2009 the read-once logic. Operating 2009 the read-once logic can include reading 2010 data from a selected portion of the non-volatile memory array for usage, and destroying 2011 the data in the selected portion of the non-volatile memory array.

In various embodiments, as depicted in FIG. 20D, the method 2012 of operating the memory device can further include providing 2005 the memory device including read-once logic integrated into the data security logic in combination with non-volatile memory array on the substrate, and operating 2013 the read-once logic. Operating the read-once logic 2013 can include reading 2014 data from a selected portion of the non-volatile memory array for usage, destroying 2015 the data in the selected portion of the non-volatile memory array, and throwing 2016 an exception for subsequent reads of the selected portion of the non-volatile memory array.

Referring to FIG. 20E, in some embodiments, the method 2017 of operating the memory device can further include providing 2005 the memory device including read-once logic integrated into the data security logic in combination with non-volatile memory array on the substrate, and operating 2018 the read-once logic. Operating 2018 the read-once logic can include reading 2019 data from a selected portion of the non-volatile memory array for usage, and flagging 2020 the selected portion of the non-volatile memory array.

Figures 20F, 20G:
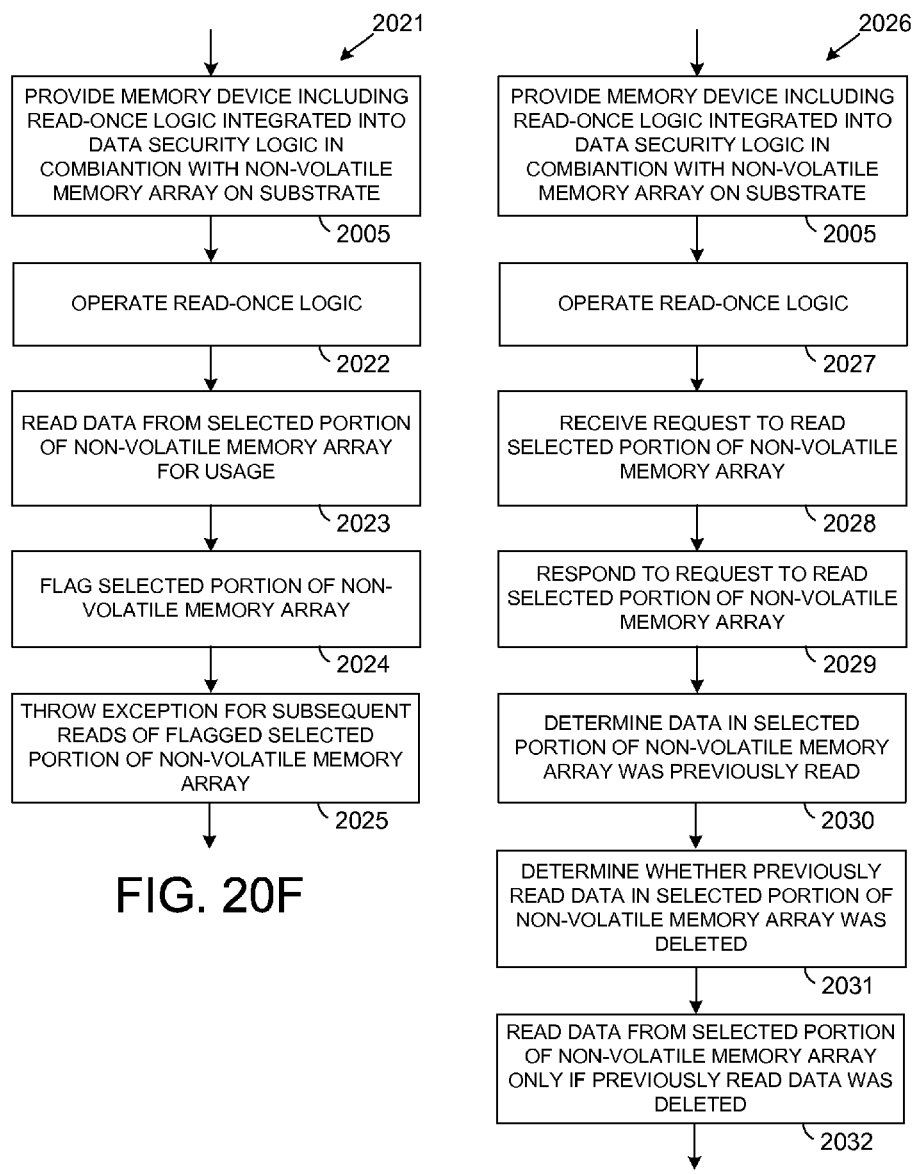
FIGS. 20A through 20U and 21A through 21N are multiple schematic flow charts depicting several embodiments and/or aspects of a method of operating a memory device including data security logic integrated in combination with non-volatile memory array on a substrate that supports data security and access tracking using functionality integrated into memory.

As shown in FIG. 20F, in various embodiments and/or applications, the method 2021 of operating the memory device can further include providing 2005 the memory device including read-once logic integrated into the data security logic in combination with non-volatile memory array on the substrate, and operating 2022 the read-once logic. Operating 2022 the read-once logic can include reading 2023 data from a selected portion of the non-volatile memory array for usage, flagging 2024 the selected portion of the non-volatile memory array, and throwing 2025 an exception for subsequent reads of the flagged selected portion of the non-volatile memory array.

In some embodiments, illustrated in FIG. 20G, the method 2026 of operating the memory device can further include providing 2005 the memory device including read-once logic integrated into the data security logic in combination with non-volatile memory array on the substrate, and operating 2027 the read-once logic. Operating 2027 the read-once logic can include receiving 2028 a request to read a selected portion of the non-volatile memory array, and responding 2029 to the request to read a selected portion of the non-volatile memory array. Responding 2029 to the request to read a selected portion of the non-volatile memory array can include determining 2030 whether data in the selected portion of the non-volatile memory array was previously read, determining 2031 whether the previously read data in the selected portion of the non-volatile memory array was deleted, and reading 2032 data from the selected portion of the non-volatile memory array only if the previously read data was deleted.

In various embodiments and/or applications, as shown in FIG. 20H, the method 2033 of operating the memory device can further include providing 2034 the memory device including counting logic integrated into the data security logic in combination with non-volatile memory array on the substrate, and operating 2035 the counting logic. Operating 2035 the counting logic can include counting 2036 a number of times data is read from a selected portion of the non-volatile memory array.

Referring to FIG. 20I, selected embodiments of the method 2037 of operating the memory device can further include providing 2034 the memory device including counting logic integrated into the data security logic in combination with non-volatile memory array on the substrate, and operating 2038 the counting logic. Operating 2038 the counting logic can include counting 2039 the number of times data is read from a selected portion of the non-volatile memory array, and throwing 2040 an exception for a count greater than one of the number of times data is read from the selected portion of the non-volatile memory array.

As illustrated in FIG. 20J, some embodiments of the method 2041 of operating the memory device can further include providing 2034 the memory device including counting logic integrated into the data security logic in combination with non-volatile memory array on the substrate, and operating 2042 the counting logic. Operating 2042 the counting logic can include counting 2043 the number of times data is read from a selected portion of the non-volatile memory array and the number of times the data is written to the selected portion of the non-volatile memory array.

As shown in FIG. 20K, an embodiment of the method 2044 of operating the memory device can further include providing 2034 the memory device including counting logic integrated into the data security logic in combination with non-volatile memory array on the substrate, and operating 2045 the counting logic. Operating 2045 the counting logic can include counting 2046 the number of times data is read from a selected portion of the non-volatile memory array and the number of times the data is written to the selected portion of the non-volatile memory array, and controlling 2047 access to the selected portion of the non-volatile memory array based on the counts.

Referring to FIG. 20L, in some embodiments, the method 2048 of operating the memory device can further include providing 2034 the memory device including counting logic integrated into the data security logic in combination with non-volatile memory array on the substrate, and operating 2049 the counting logic. Operating 2049 the counting logic can include counting 2050 the number of times data is read from a selected portion of the non-volatile memory array and the number of times the data is written to the selected portion of the non-volatile memory array, and throwing 2051 an exception based on the counts.

In further embodiments and/or applications, as shown in FIG. 20M, the method 2052 of operating the memory device can be configured to include providing 2053 the memory device including process identification logic integrated into the data security logic in combination with non-volatile memory array on the substrate, and operating 2054 the process identification logic. Operating 2054 the process identification logic can include identifying 2055 a process, determining 2056 whether the process is enabled to read data from a selected portion of the non-volatile memory array, and allowing 2057 the enabled process to read the data from the selected portion of the non-volatile memory array.

In various embodiments, as depicted in FIG. 20N, the method 2058 of operating the memory device can further include providing 2053 the memory device including process identification logic integrated into the data security logic in combination with non-volatile memory array on the substrate, and operating 2059 the process identification logic. Operating 2059 the process identification logic can include identifying 2060 a process, determining 2061 whether the process is enabled to read data from a selected portion of the non-volatile memory array, and throwing 2062 an exception if the process is not enabled to read the data from the selected portion of the non-volatile memory array.

Referring to FIG. 20O, in some embodiments, the method 2063 of operating the memory device can further include providing 2053 the memory device including process identification logic integrated into the data security logic in combination with non-volatile memory array on the substrate, and operating 2064 the process identification logic. Operating 2064 the process identification logic can include identifying 2065 a process, determining 2066 whether the process is enabled to read data from a selected portion of the non-volatile memory array, and throwing 2067 an exception if the process is not identified as enabled to read the data from the selected portion of the non-volatile memory array.

As shown in FIG. 20P, in various embodiments and/or applications, the method 2068 of operating the memory device can further include providing 2053 the memory device including process identification logic integrated into the data security logic in combination with non-volatile memory array on the substrate, and operating 2069 the process identification logic. Operating 2069 the process identification logic can include identifying 2070 a plurality of processes, determining 2071 whether the plurality of processes is enabled to communicate using a selected portion of the non-volatile memory array, and accessing 2072 the selected portion of the non-volatile memory array if enabled to communicate.

In various embodiments, as depicted in FIG. 20Q, the method 2073 of operating the memory device can further include providing 2053 the memory device including process identification logic integrated into the data security logic in combination with non-volatile memory array on the substrate, and operating 2074 the process identification logic. Operating 2074 the process identification logic can include identifying 2075 a plurality of processes, determining 2076 whether the plurality of processes is enabled to communicate using a selected portion of the non-volatile memory array, and disallowing 2077 access to the selected portion of the non-volatile memory array if not enabled to communicate.

Referring to FIG. 20R, in some embodiments, the method 2078 of operating the memory device can further include providing 2053 the memory device including process identification logic integrated into the data security logic in combination with non-volatile memory array on the substrate, and operating 2079 the process identification logic. Operating 2079 the process identification logic can include identifying 2080 a plurality of processes, determining 2081 whether the plurality of processes is enabled to communicate using a selected portion of the non-volatile memory array, and throwing 2082 an exception if not enabled to communicate.

As shown in FIG. 20S, in various embodiments and/or applications, the method 2083 of operating the memory device can further include providing 2084 the memory device including counting logic and process identification logic integrated into the data security logic in combination with non-volatile memory array on the substrate, and operating 2085 the counting logic and process identification logic in combination. Operating 2085 the counting logic and process identification logic in combination can include managing 2086 access to a selected portion of the non-volatile memory array.

In some embodiments, illustrated in FIG. 20T, the method 2087 of operating the memory device can further include providing 2084 the memory device including counting logic and process identification logic integrated into the data security logic in combination with non-volatile memory array on the substrate, and operating 2088 the counting logic and process identification logic in combination. Operating 2088 the counting logic and process identification logic in combination can include identifying 2089 a number of accesses of a selected portion of the non-volatile memory array, and identifying 2090 processes that access the selected portion of the non-volatile memory array.

In various embodiments and/or applications, as shown in FIG. 20U, the method 2091 of operating the memory device can further include providing 2084 the memory device including counting logic and process identification logic integrated into the data security logic in combination with non-volatile memory array on the substrate, and operating 2092 the counting logic and process identification logic in combination. Operating 2092 the counting logic and process identification logic in combination can include identifying 2093 a number of accesses of a selected portion of the non-volatile memory array, identifying 2094 processes that access the selected portion of the non-volatile memory array, and identifying 2095 times of accesses of the selected portion of the non-volatile memory array.

Referring to FIG. 21A, selected embodiments of the method 2100 of operating the memory device can further include providing 2101 the memory device including a protection key register and protection key logic integrated into the data security logic in combination with non-volatile memory array on the substrate, and operating 2102 the protection key register and protection key logic in combination. Operating 2102 the protection key register and protection key logic in combination can include managing 2103 access to a selected portion of the non-volatile memory array based on information in the protection key register.

In various embodiments, as depicted in FIG. 21B, the method 2104 of operating the memory device can further include providing 2101 the memory device including a protection key register and protection key logic integrated into the data security logic in combination with non-volatile memory array on the substrate, and operating 2105 the protection key register and protection key logic in combination. Operating 2105 the protection key register and protection key logic in combination can include receiving 2106 information, and writing 2107 the received information to the protection key register.

The illustrative method 2108, depicted in FIG. 21C, of operating a memory device can include providing 2101 the memory device including a protection key register and protection key logic integrated into the data security logic in combination with non-volatile memory array on the substrate, and operating 2109 the protection key register and protection key logic in combination. Operating 2109 the protection key register and protection key logic in combination can include receiving 2110 information, and reading 2111 data from a selected portion of the non-volatile memory array only if authorized by information in the protection key register.

Referring to FIG. 21D, in some embodiments, the method 2112 of operating the memory device can further include providing 2101 the memory device including a protection key register and protection key logic integrated into the data security logic in combination with non-volatile memory array on the substrate, and operating 2113 the protection key register and protection key logic in combination. Operating 2113 the protection key register and protection key logic in combination can include writing 2114 data to a selected portion of the non-volatile memory array only if authorized by information in the protection key register.

In further embodiments and/or applications, as shown in FIG. 21E, the method 2115 of operating the memory device can further include providing 2116 a plurality of non-volatile memory segments characterized by a respective plurality of non-volatile memory types in the non-volatile memory array and operating 2117 the data security logic. Operating 2117 the data security logic can include performing 2118 at least one data security function for the non-volatile memory segments selectively based on ones of the plurality of non-volatile memory types.

In various embodiments, as depicted in FIG. 21F, the method 2119 of operating the memory device can further include receiving 2120 information from at least one sensor operable to detect at least one operating condition, and operating 2121 the data security logic. Operating 2121 the data security logic can include performing 2122 at least one data security function for the non-volatile memory array selectively based on the at least one operating condition.

Referring to FIG. 21G, in some embodiments, the method 2123 of operating the memory device can further include operating 2124 the data security logic including accessing 2125 a time signal, and performing 2126 at least one data security function for the non-volatile memory array based on the time signal.

As shown in FIG. 21H, in various embodiments and/or applications, the method 2127 of operating the memory device can be configured such that operating 2124 the data security logic includes monitoring 2128 phenomena detectable at the memory device, and performing 2129 at least one data security function for the non-volatile memory array based on the monitored phenomena.

In some embodiments, illustrated in FIG. 21I, the method 2130 of operating the memory device can be executed where operating 2124 the data security logic includes accumulating and communicating 2131 information about phenomena associated with at least one entity in association with the memory device, and performing 2132 at least one data security function for the non-volatile memory array based on the monitored phenomena.

Figures 21J, 21K:
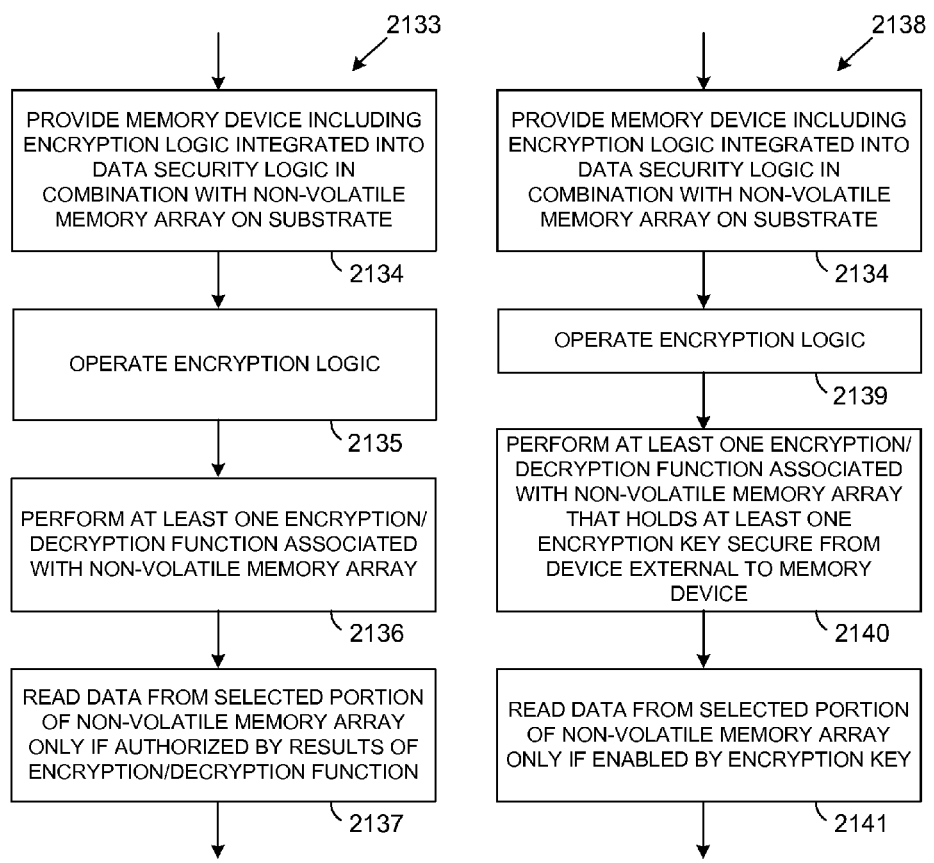

In various embodiments and/or applications, as shown in FIG. 21J, the method 2133 of operating the memory device can further include providing 2134 the memory device including encryption logic integrated into the data security logic in combination with non-volatile memory array on the substrate, and operating 2135 the encryption logic. Operating 2135 the encryption logic can include performing 2136 at least one encryption/decryption function associated with the non-volatile memory array, and reading 2137 data from a selected portion of the non-volatile memory array only if authorized by results of the encryption/decryption function.

Referring to FIG. 21K, selected embodiments of the method 2138 of operating the memory device can further include providing 2134 the memory device including encryption logic integrated into the data security logic in combination with non-volatile memory array on the substrate, and operating 2139 the encryption logic. Operating 2139 the encryption logic can include performing 2140 at least one encryption/decryption function associated with the non-volatile memory array that holds at least one encryption key secure from a device external to the memory device, and reading 2141 data from a selected portion of the non-volatile memory array only if enabled by the encryption key.

As illustrated in FIG. 21L, some embodiments of the method 2142 of operating the memory device can further include providing 2143 the memory device including hash logic integrated into the data security logic in combination with non-volatile memory array on the substrate, and operating 2144 the hash logic. Operating 2144 the hash logic can include performing 2145 a hash function associated with the non-volatile memory array, and reading 2146 data from a selected portion of the non-volatile memory array only if authorized by results of the hash function.

As shown in FIG. 21M, an embodiment of the method 2147 of operating the memory device can further include providing 2148 a bus integrated in combination with the data security logic and the non-volatile memory array on the substrate, and operating 2149 the bus. Operating 2149 the bus can include communicating 2150 access requests and information between the memory device and a device external to the memory device.

Referring to FIG. 21N, in some embodiments, the method 2151 of operating the memory device can be configured such that operating 2124 the data security logic includes performing 2152 the at least one data security function independently of signals external to the memory device.

Modules, logic, circuitry, hardware and software combinations, firmware, or so forth may be realized or implemented as one or more general-purpose processors, one or more processing cores, one or more special-purpose processors, one or more microprocessors, at least one Application-Specific Integrated Circuit (ASIC), at least one Field Programmable Gate Array (FPGA), at least one digital signal processor (DSP), some combination thereof, or so forth that is executing or is configured to execute instructions, a special-purpose program, an application, software, code, some combination thereof, or so forth as at least one special-purpose computing apparatus or specific computing component. One or more modules, logic, or circuitry, etc. may, by way of example but not limitation, be implemented using one processor or multiple processors that are configured to execute instructions (e.g., sequentially, in parallel, at least partially overlapping in a time-multiplexed fashion, at least partially overlapping across multiple cores, or a combination thereof, etc.) to perform a method or realize a particular computing machine. For example, a first module may be embodied by a given processor executing a first set of instructions at or during a first time, and a second module may be embodied by the same given processor executing a second set of instructions at or during a second time. Moreover, the first and second times may be at least partially interleaved or overlapping, such as in a multi-threading, pipelined, or predictive processing environment. As an alternative example, a first module may be embodied by a first processor executing a first set of instructions, and a second module may be embodied by a second processor executing a second set of instructions. As another alternative example, a particular module may be embodied partially by a first processor executing at least a portion of a particular set of instructions and embodied partially by a second processor executing at least a portion of the particular set of instructions. Other combinations of instructions, a program, an application, software, or code, etc. in conjunction with at least one processor or other execution machinery may be utilized to realize one or more modules, logic, or circuitry, etc. to implement any of the processing algorithms described herein.

Those having ordinary skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those having ordinary skill in the art will recognize that optical aspects of implementations will typically employ optically-oriented hardware, software, and or firmware.

In some implementations described herein, logic and similar implementations may include software or other control structures suitable to operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described above. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those having ordinary skill in the art will recognize how to obtain, configure, and optimize suitable transmission or computational elements, material supplies, actuators, or other common structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those having ordinary skill in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those having ordinary skill in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those having ordinary skill in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those having ordinary skill in the art will also appreciate that examples of electro-mechanical systems include but are not limited to a variety of consumer electronics systems, medical devices, as well as other systems such as motorized transport systems, factory automation systems, security systems, and/or communication/computing systems. Those having ordinary skill in the art will recognize that electro-mechanical as used herein is not necessarily limited to a system that has both electrical and mechanical actuation except as context may dictate otherwise.

In a general sense, those having ordinary skill in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those having ordinary skill in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those having ordinary skill in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems. Those having ordinary skill in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

Those having ordinary skill in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory). A sale of a system or method may likewise occur in a territory even if components of the system or method are located and/or used outside the territory. Further, implementation of at least part of a system for performing a method in one territory does not preclude use of the system in another territory.

One of ordinary skill in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Those having ordinary skill in the art will appreciate that a user may be representative of a human user, a robotic user (e.g., computational entity), and/or substantially any combination thereof (e.g., a user may be assisted by one or more robotic agents) unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components, and/or wirelessly interactable, and/or wirelessly interacting components, and/or logically interacting and/or logically interactable components.

In some instances, one or more components may be referred to herein as "configured to," "configurable to," "operable/operative to," "adapted/adaptable," "able to," "conformable/conformed to," etc. Those having ordinary skill in the art will recognize that "configured to" can generally encompass active-state components and/or inactive-state components and/or standby-state components, unless context requires otherwise. While particular aspects of the present subject matter described herein have been shown and described, it will be apparent to those having ordinary skill in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those having ordinary skill in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms. For example, the phrase "A or B" will be typically understood to include the possibilities of "A" or "B" or "A and B."

With respect to the appended claims, those having ordinary skill in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A memory device comprising:
   a substrate;
   a non-volatile memory array integrated on the substrate; and
   data security logic integrated with the non-volatile memory array on the substrate, the data security logic operable to perform at least one data security function associated with the non-volatile memory array, wherein:
   the data security logic operable to perform at least one data security function associated with the non-volatile memory array further includes read-once logic operable to read data from a selected portion of the non-volatile memory array for usage, flag the selected portion of the non-volatile memory array, and throw an exception for subsequent reads of the flagged selected portion of the non-volatile memory array.

2. The memory device according to claim 1 wherein:
   the data security logic operable to perform at least one data security function associated with the non-volatile memory array further includes read-once logic operable to enforce a read-once restriction on a selected portion of the non-volatile memory array.

3. The memory device according to claim 1 wherein:
   the data security logic operable to perform at least one data security function associated with the non-volatile memory array further includes read-once logic operable to read data from a selected portion of the non-volatile memory array for usage, and destroy the data in the selected portion of the non-volatile memory array.

4. The memory device according to claim 1 wherein:
   the data security logic operable to perform at least one data security function associated with the non-volatile memory array further includes read-once logic operable to read data from a selected portion of the non-volatile memory array for usage, destroy the data in the selected portion of the non-volatile memory array, and throw an exception for subsequent reads of the selected portion of the non-volatile memory array.

5. The memory device according to claim 1 wherein:
   the data security logic operable to perform at least one data security function associated with the non-volatile memory array further includes read-once logic operable to receive a request to read a selected portion of the non-volatile memory array, and respond to the request to read a selected portion of the non-volatile memory array including determining whether data in the selected portion of the non-volatile memory array was previously read, determining whether the previously read data in the selected portion of the non-volatile memory array was deleted, and reading data from the selected portion of the non-volatile memory array only if the previously read data was deleted.

6. The memory device according to claim 1 wherein:
   the data security logic operable to perform at least one data security function associated with the non-volatile memory array further includes counting logic operable to count a number of times data is read from a selected portion of the non-volatile memory array.

7. The memory device according to claim 1 wherein:
   the data security logic operable to perform at least one data security function associated with the non-volatile memory array further includes counting logic operable to count a number of times data is read from a selected portion of the non-volatile memory array and a number of times the data is written to the selected portion of the non-volatile memory array.

8. A memory device comprising:
a substrate;
a non-volatile memory array integrated on the substrate; and
data security logic integrated with the non-volatile memory array on the substrate, the data security logic operable to perform at least one data security function associated with the non-volatile memory array, wherein:
the data security logic operable to perform at least one data security function associated with the non-volatile memory array further includes counting logic operable to count a number of times data is read from a selected portion of the non-volatile memory array and a number of times the data is written to the selected portion of the non-volatile memory array, and throw an exception based on the counts.

9. The memory device according to claim 8 wherein:
the data security logic operable to perform at least one data security function associated with the non-volatile memory array further includes read-once logic operable to read data from a selected portion of the non-volatile memory array for usage, and flag the selected portion of the non-volatile memory array.

10. The memory device according to claim 8 wherein:
the data security logic operable to perform at least one data security function associated with the non-volatile memory array further includes counting logic operable to count a number of times data is read from a selected portion of the non-volatile memory array, and throw an exception for a count greater than one of the number of times data is read from the selected portion of the non-volatile memory array.

11. The memory device according to claim 8 wherein:
the data security logic operable to perform at least one data security function associated with the non-volatile memory array further includes counting logic operable to count a number of times data is read from a selected portion of the non-volatile memory array and a number of times the data is written to the selected portion of the non-volatile memory array, and control access to the selected portion of the non-volatile memory array based on the counts.

12. The memory device according to claim 8 wherein:
the data security logic operable to perform at least one data security function associated with the non-volatile memory array further includes counting logic and process identification logic operable in combination to manage a number of accesses of a selected portion of the non-volatile memory array and by what processes.

13. The memory device according to claim 8 wherein:
the data security logic operable to perform at least one data security function associated with the non-volatile memory array further includes counting logic and process identification logic operable in combination to manage a number of accesses of a selected portion of the non-volatile memory array and by what processes and at what times.

14. A memory device comprising:
a substrate;
a non-volatile memory array integrated on the substrate; and
data security logic integrated with the non-volatile memory array on the substrate, the data security logic operable to perform at least one data security function associated with the non-volatile memory array, wherein:
the data security logic operable to perform at least one data security function associated with the non-volatile memory array further includes process identification logic operable to identify a process and determine whether the process is enabled to read data from a selected portion of the non-volatile memory array and to throw an exception if the process is not enabled to read the data from the selected portion of the non-volatile memory array.

15. The memory device according to claim 14 wherein:
the data security logic operable to perform at least one data security function associated with the non-volatile memory array further includes process identification logic operable to identify a process and determine whether the process is enabled to read data from a selected portion of the non-volatile memory array and allow the enabled process to read the data from the selected portion of the non-volatile memory array.

16. The memory device according to claim 14 wherein:
the data security logic operable to perform at least one data security function associated with the non-volatile memory array further includes process identification logic operable to identify a process and determine whether the process is identified as enabled to read data from a selected portion of the non-volatile memory array and to throw an exception if the process is not identified as enabled to read the data from the selected portion of the non-volatile memory array.

17. The memory device according to claim 14 wherein:
the data security logic operable to perform at least one data security function associated with the non-volatile memory array further includes process identification logic operable to identify a plurality of processes and determine whether the plurality of processes is enabled to communicate using a selected portion of the non-volatile memory array and to access the selected portion of the non-volatile memory array if enabled to communicate.

18. The memory device according to claim 14 wherein:
the data security logic operable to perform at least one data security function associated with the non-volatile memory array further includes process identification logic operable to identify a plurality of processes and determine whether the plurality of processes is enabled to communicate using a selected portion of the non-volatile memory array and to disallow access to the selected portion of the non-volatile memory array if not enabled to communicate.

19. The memory device according to claim 14 wherein:
the data security logic operable to perform at least one data security function associated with the non-volatile memory array further includes process identification logic operable to identify a plurality of processes and determine whether the plurality of processes is enabled to communicate using a selected portion of the non-volatile memory array and to throw an exception if not enabled to communicate.

20. The memory device according to claim 14 wherein:
the data security logic operable to perform at least one data security function associated with the non-volatile memory array further includes counting logic and process identification logic operable in combination to manage access to a selected portion of the non-volatile memory array.

21. A memory device comprising:
a substrate;
a non-volatile memory array integrated on the substrate;
data security logic integrated with the non-volatile memory array on the substrate, the data security logic operable to perform at least one data security function associated with the non-volatile memory array; and a protection key register integrated with the data security logic and the non-volatile memory array on the substrate, wherein:

the data security logic operable to perform at least one data security function associated with the non-volatile memory array further includes protection key logic operable to manage access to a selected portion of the non-volatile memory array based on information in the protection key register.

22. The memory device according to claim 21 wherein:
the data security logic operable to perform at least one data security function associated with the non-volatile memory array further includes protection key logic operable to receive information and write the received information to the protection key register.

23. The memory device according to claim 21 wherein:
the data security logic operable to perform at least one data security function associated with the non-volatile memory array further includes protection key logic operable to read data from a selected portion of the non-volatile memory array only if authorized by information in the protection key register.

24. The memory device according to claim 21 wherein:
the data security logic operable to perform at least one data security function associated with the non-volatile memory array further includes protection key logic operable to write data to a selected portion of the non-volatile memory array only if authorized by information in the protection key register.

25. A memory device comprising:
a substrate;
a non-volatile memory array integrated on the substrate; and
data security logic integrated with the non-volatile memory array on the substrate, the data security logic operable to perform at least one data security function associated with the non-volatile memory array, wherein:
the non-volatile memory array further includes a plurality of non-volatile memory segments characterized by a respective plurality of non-volatile memory types; and
the data security logic operable to perform at least one data security function associated with the non-volatile memory array is operable to perform at least one data security function for the non-volatile memory segments selectively based on one or more of the plurality of non-volatile memory types.

26. The memory device according to claim 25 further comprising:
at least one sensor operable to detect at least one operating condition, wherein:
the data security logic operable to perform at least one data security function associated with the non-volatile memory array is operable to perform at least one data security function for the non-volatile memory array selectively based on the at least one operating condition.

27. The memory device according to claim 25 wherein:
the data security logic operable to perform at least one data security function associated with the non-volatile memory array is operable to access a time signal and perform at least one data security function for the non-volatile memory array based on the time signal.

28. The memory device according to claim 25 wherein:
the data security logic operable to perform at least one data security function associated with the non-volatile memory array is operable to monitor phenomena detectable at the memory device and perform at least one data security function for the non-volatile memory array based on the monitored phenomena.

29. The memory device according to claim 25 wherein:
the data security logic operable to perform at least one data security function associated with the non-volatile memory array is operable to accumulate and communicate information about phenomena associated with at least one entity in association with the memory device and perform at least one data security function for the non-volatile memory array based on the monitored phenomena.

30. The memory device according to claim 25 wherein:
the data security logic operable to perform at least one data security function associated with the non-volatile memory array further includes encryption logic operable to perform at least one encryption/decryption function associated with the non-volatile memory array and operable to read data from a selected portion of the non-volatile memory array only if authorized by results of the encryption/decryption function.

31. The memory device according to claim 25 wherein:
the data security logic operable to perform at least one data security function associated with the non-volatile memory array further includes encryption logic operable to perform at least one encryption/decryption function associated with the non-volatile memory array that holds at least one encryption key secure from a device external to the memory device and operable to read data from a selected portion of the non-volatile memory array only if enabled by the encryption key.

32. The memory device according to claim 25 wherein:
the data security logic operable to perform at least one data security function associated with the non-volatile memory array further includes hash logic operable to perform a hash function associated with the non-volatile memory array and operable to read data from a selected portion of the non-volatile memory array only if authorized by results of the hash function.

* * * * *